(12) United States Patent
Carpenter et al.

(10) Patent No.: US 11,814,460 B2
(45) Date of Patent: Nov. 14, 2023

(54) PYRIDYL HYDROXYL AMINE CATALYST COMPOUNDS AND SYSTEMS FOR OLEFIN POLYMERIZATION

(71) Applicant: ExxonMobil Chemical Patents Inc., Baytown, TX (US)

(72) Inventors: Alex E. Carpenter, Seabrook, TX (US); Danielle G. Singleton, Houston, TX (US); Tzu-Pin Lin, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 73 days.

(21) Appl. No.: 17/504,915

(22) Filed: Oct. 19, 2021

(65) Prior Publication Data

US 2022/0127387 A1    Apr. 28, 2022

Related U.S. Application Data

(60) Provisional application No. 63/104,279, filed on Oct. 22, 2020.

(51) Int. Cl.
*C08F 4/64* (2006.01)
*C07F 17/00* (2006.01)
*C08F 210/16* (2006.01)

(52) U.S. Cl.
CPC ...... *C08F 4/64189* (2013.01); *C08F 4/64048* (2013.01); *C08F 210/16* (2013.01); *C07F 17/00* (2013.01)

(58) Field of Classification Search
CPC .............. C08F 4/64048; C07F 17/00
See application file for complete search history.

(56) References Cited

U.S. PATENT DOCUMENTS

| 5,008,204 A | 4/1991 | Stehling ................ 436/85 |
| 5,041,584 A | 8/1991 | Crapo et al. ............ 556/179 |

(Continued)

FOREIGN PATENT DOCUMENTS

| CN | 101704910 | 8/2011 | ............ C08F 10/00 |
| WO | WO1993/003093 | 2/1993 | ............ C08L 23/04 |

(Continued)

OTHER PUBLICATIONS

Homma, Y.; Ishida, T. Chem. Mater. 2018, 30, 1835-1838. (Year: 2018).*

(Continued)

Primary Examiner — Rip A Lee

(57) ABSTRACT

The present disclosure provides pyridyl hydroxyl amine catalyst compounds and systems containing the compounds. The present disclosure is also directed to polymerization processes to produce polyolefin polymers from catalyst systems including one or more olefin polymerization catalysts, at least one activator, and an optional support. The compounds are represented by Formula I(a), I(b) or I(c):

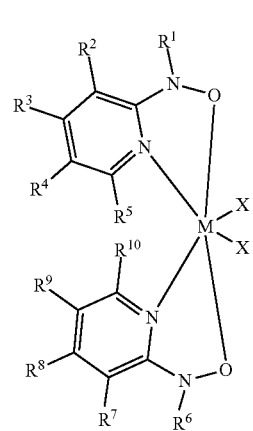

Formula I(a)

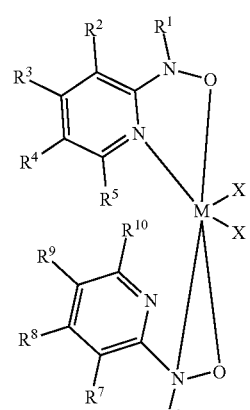

Formula I(b)

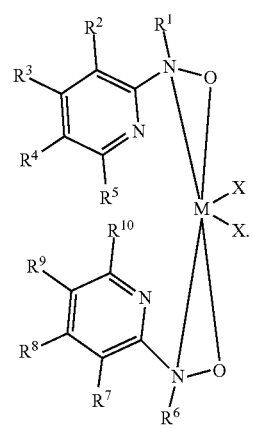

Formula I(c)

20 Claims, No Drawings

(56) References Cited

U.S. PATENT DOCUMENTS

| | | | | |
|---|---|---|---|---|
| 5,153,157 | A | 10/1992 | Hlatky et al. | 502/117 |
| 5,447,895 | A | 9/1995 | Marks et al. | 502/117 |
| 5,453,410 | A | 9/1995 | Kolthammer et al. | 502/155 |
| 5,612,271 | A | 3/1997 | Zandona | 502/117 |
| 5,942,459 | A | 8/1999 | Sugano et al. | 502/117 |
| 6,175,409 | B1 | 1/2001 | Nielsen et al. | 356/337 |
| 6,211,105 | B1 | 4/2001 | Holtcamp | 502/103 |
| 6,260,407 | B1 | 7/2001 | Petro et al. | 73/61.52 |
| 6,294,388 | B1 | 9/2001 | Petro | 436/8 |
| 6,306,658 | B1 | 10/2001 | Turner et al. | 436/37 |
| 6,406,632 | B1 | 6/2002 | Safir et al. | 210/656 |
| 6,436,292 | B1 | 8/2002 | Petro | 210/656 |
| 6,454,947 | B1 | 9/2002 | Safir et al. | 210/656 |
| 6,455,316 | B1 | 9/2002 | Turner et al. | 436/37 |
| 6,461,515 | B1 | 10/2002 | Safir et al. | 210/656 |
| 6,475,391 | B2 | 11/2002 | Safir et al. | 210/656 |
| 6,489,168 | B1 | 12/2002 | Wang et al. | 436/37 |
| 6,491,816 | B2 | 12/2002 | Petro | 210/198.2 |
| 6,491,823 | B1 | 12/2002 | Safir et al. | 210/656 |
| 6,846,771 | B2 | 1/2005 | Kristen et al. | 502/155 |
| 8,404,880 | B2 | 3/2013 | Kaji et al. | 556/179 |
| 8,658,556 | B2 | 2/2014 | Stewart | 502/202 |
| 8,975,209 | B2 | 3/2015 | Kaji et al. | 502/439 |
| 9,340,630 | B2 | 5/2016 | Kaji et al. | C08F 110/02 |

FOREIGN PATENT DOCUMENTS

| | | | | |
|---|---|---|---|---|
| WO | WO1994/007928 | 4/1994 | | C08F 10/02 |
| WO | WO1995/014044 | 5/1995 | | C08F 4/02 |
| WO | WO1998/043983 | 10/1998 | | C07F 5/02 |
| WO | WO2000/009255 | 2/2000 | | B01J 19/00 |

OTHER PUBLICATIONS

U.S. Appl. No. 63/104,288, filed Oct. 22, 2021, Carpenter, A. et al. *Chemical and Engineering News*, v.63(5), p. 27 (1985).
Agarwal, R. K. et al. (1986) "Infrared and thermal studies of 5,6-benzoquinoline N-oxide complexes of oxozirconium(IV)," *Thermochimica Acta*, v.99, pp. 363-366.
Bogart, J. et al. (2015) "A Ligand Field Series for the 4f-Block from Experimental and DFT Computed Ce(IV/III) Electrochemical Potentials," *Inorg. Chem.*, v.54(6), pp. 2830-2837.
Girolami, G. (1994) "A Simple "Back of the Envelope" Method for Estimating the Densities and Molecular Volumes of Liquids and Solids," *Jrnl. of Chem. Edu.*, v.71(11), pp. 962-964.
Homma, Y. et al. (2018) "A New S=0 ⇆ S=2 "Spin-Crossover" Scenario Found in a Nickel(II) Bis(nitroxide) System," *Chem. Mater.*, v.30(6), pp. 1835-1838.
Kanetomo, T. et al. (2015) "Single-Molecule Magnet Involving Strong Exchange Coupling in Terbium(III) Complex with 2,2'-bipyridin-6-yl tert-butyl Nitroxide," *Inorg. Chem. Front.* v.2, pp. 860-866.
Kawakami, H. et al. (2016) "A designed room-temperature triplet ligand from pyridine-2,6-diyl bis(tert-buyl Nitroxide)," *Dalton. Trans.*, v.45, pp. 1306-1309.
Khallow, K. et al. (2001) "Preparation and antibacterial evaluation of some nitrone derivative and their zirconium (IV) chloride complexes," *Bollettino Chimico Farmaceutico*, v.140(4), pp. 224-227.
Koide, K. et al. (2011) "Biradical chelating host 2,2'-bipyridine-6,6'-diyl bis(tert-butyl nitroxide) showing tunable exchange magnetic coupling," *Inorg. Chem. Commun.*, v.14(1), pp. 194-196.

Konno, T. et al. (2013) "A supramolecular switch between ground high- and low-spin states using 2,2':6',2''-terpyridine-6,6''-diyl bis(tert-butyl nitroxide)," *Chem. Commun.*, v.49, pp. 5156-5158.
Krajete, A. et al. (2004) "Iminohydroxamato Early and Late Transition Metal Halide Complexes—New Precatalysts for Aluminoxane-Cocatalyzed Olefin Insertion Polymerization," *Eur. J. Inorg. Chem.*, v.2004(8), pp. 1740-1752.
Li, H. et al. (2011) "Copolymerization of Ethylene with Polar Comonomers using Phenol-Nitrone Group IV complexes," *Polymer Preprints (American Chem. Soc. Division of Polymer Chem.)*, v.52(1) pp. 374-375.
Majumdar, et al. (1973) "Solvation equilibriums in methanol and acetonitrile of quinoline N-oxide complexes of higher valent metal oxo cations," *Journal of Inorganic and Nuclear Chemistry*, v.35(12), pp. 4296-4300.
Mittal, et al. (1983) "Complexes of 8-quinolinol N-oxide with zirconium tetrachloride," *Journal of the Institution of Chemists (India)*, v.55(1), pp. 29-32.
Murphy et al. (2003) "A Fully Integrated High-Throughput Screening Methodology for the Discovery of New Polyolefin Catalysts: Discovery of a New Class of High Temperature Single-Site Group (IV) Copolymerization Catalysts," *J. Am. Chem. Soc.*, v.125, pp. 4306-4317.
Okazawa, A. et al. (2007) "tert-Butyl 2-Pyridyl Nitroxide Available as a Paramagnetic Chelate Ligand for Strongly Exchange-Coupled Metal-Radical Compounds," *Chem. Mater.*, v.19(11), pp. 2733-2735.
Okazawa, A. et al. (2008) "Magneto-Structure Relationship in Copper(II) and Nickel(II) Complexes Chelated with Stable tert-Butyl 5-Phenyl-2-pyridyl Nitroxide and Related Radicals," *Inorg. Chem.*, v.47(19), pp. 8859-8868.
Okazawa, A. et al. (2009) "Super-superexchange coupling through a hydrogen bond in a linear copper(II) complex, [Cu(LH)(L)]•BF$_4$•2H$_2$O (LH=N-tert-butyl-N-2-pyridylhydroxylamine)," *Chem. Phys. Lett.*, v.480, pp. 198-202.
Okazawa, A. et al. (2009) "Strong intramolecular ferromagnetic couplings in nickel(II) and copper(II) complexes chelated with tert-butyl 5-methoxy-2-pyridyl Nitroxide," *Polyhedron*, v.28, pp. 1917-1921.
Okazawa, A. et al. (2010) "Ferro- and Antiferromagnetic Coupling Switch Accompanied by Twist Deformation around the Copper(II) and Nitroxide Coordination Bond," *J. Am. Chem. Soc.*, v.132(33), pp. 11516-11524.
Okazawa, A. et al. (2010) "Spin-Transition-Like Behavior on One Side in a Nitroxide-Copper(II)-Nitroxide Triad System," *Inorg. Chem.*, v.49(21), pp. 10144-10147.
Oliveira, J. Vladimir et al. (2000) "High-Pressure Phase Equilibria for Polypropylene-Hydrocarbon Systems," *Ind. Eng. Chem. Res.*, v.39, pp. 4627-4633.
Osanai, K. et al. (2006) "Strong Ferromagnetic Exchange Couplings in Copper(II) and Nickel(II) Complexes with a Paramagnetic Tridentate Chelate Ligand, 2,2'-Bipyridin-6-yl tert-Butyl Nitroxide," *J. Am. Chem. Soc.*, v.128(43), pp. 14008-14009.
Stauber, J. et al. (2011) "Coordination Properties of 2,5-Dimesitylpyridine: An Encumbering and Versatile Ligand for Transition-Metal Chemistry," *Inorg. Chem.*, v.50(15), pp. 7309-7316.
Wild, L. et al. (1982) "Determination of Branching Distributions in Polyethylene and Ethylene Copolymers," *J. Poly. Sci., Poly. Phys. Ed.*, v.20, pp. 441-455.
Zeng, W. et al. (2010) "Synthesis and Characterization of Zr Catalyst with Phenol Nitrone Ligand for Ethylene Polymerization," *Geofenzi Xuebao*, (7), pp. 952-955.
Majumdar, et al. (1969) "Quinoline N-oxide complexes of some higher valent metals," *Science and Culture*, v.35(6), pp. 271-272.

* cited by examiner

PYRIDYL HYDROXYL AMINE CATALYST COMPOUNDS AND SYSTEMS FOR OLEFIN POLYMERIZATION

CROSS REFERENCE TO RELATED APPLICATIONS

This application claims the benefit of and priority to U.S. Provisional Application No. 63/104,279 filed Oct. 22, 2020, the disclosure of which is incorporated herein by reference.

This application is related to concurrently filed U.S. Provisional Application No. 63/104,288, a provisional patent application and entitled "Monocyclopentadienyl Pyridyl Hydroxyl Amine Catalyst Compounds and Systems for Olefin Polymerization".

FIELD

The present disclosure provides pyridyl hydroxyl amine catalyst compounds and systems useful in making olefin polymers.

BACKGROUND

Olefin polymerization catalysts are of great use in industry and polyolefins are widely used commercially because of their robust physical properties. Hence, there is interest in finding new catalysts that increase commercialization of the catalysts and allow the production of polymers having improved properties.

For example, various types of polyethylenes, including high density, low density, and linear low density polyethylenes, are commercially valuable. Polyolefins, including polyethylenes may be synthesized with transition metal catalyst compounds, which are typically activated with alumoxanes or activators containing a non-coordinating anion. The use of catalyst compounds in combination with activators creates a catalyst system that may provide the ability to modulate polyolefin properties including architecture and composition, such as molecular weight, branching, comonomer incorporation, or polydispersity index. The ability to alter polyolefin properties is a long sought after goal within the field of polymer synthesis. There is a continuing need for improved polymerization catalysts.

Improvements in polymerization catalysis may arise from catalysts with high activities capable of producing polyolefins with: high molecular weights, controllable molecular weights, polydispersity indices, or comonomer incorporation. A catalyst capable of one or more of the aforementioned improvements is valuable, but even more so if a catalyst combines a number of improvements into an overall advantage over prior catalysts or catalyst systems.

Polyolefins that have high molecular weight generally have desirable mechanical properties over their lower molecular weight counterparts. However, high molecular weight polyolefins can be difficult to process and can be costly to produce. Furthermore, polyolefins, such as polyethylene, may have a comonomer, such as octene, incorporated into the polyethylene backbone. These copolymers provide varying physical properties compared to polyethylene alone and may be produced in a low pressure reactor, utilizing, for example, solution, slurry, or gas phase polymerization processes. The comonomer content of a polyolefin (e.g., wt % of comonomer incorporated into a polyolefin backbone) influences the properties of the polyolefin (and composition of the copolymers) and is influenced by the polymerization catalyst.

There is a need for new and improved catalyst compounds and catalyst systems for polyolefin polymerization that produce polyolefins with certain properties, such as controllable molecular weights, including ultra-high molecular weights, high melting point, low comonomer incorporation, or narrow or broad polydispersity index.

References of further interest include: Osanai, K. et al. (2006) "Strong Ferromagnetic Exchange Couplings in Copper(II) and Nickel(II) Complexes with a Paramagnetic Tridentate Chelate Ligand, 2,2'-Bipyridin-6-yl tert-Butyl Nitroxide" *J. Am. Chem. Soc.*, v.128(43), pp. 14008-14009; Okazawa, A. et al. (2007) "tert-Butyl 2-Pyridyl Nitroxide Available as a Paramagnetic Chelate Ligand for Strongly Exchange-Coupled Metal-Radical Compounds" *Chem. Mater.*, v.19(11), pp. 2733-2735; Okazawa, A. et al. (2008) "Magneto-Structure Relationship in Copper(II) and Nickel (II) Complexes Chelated with Stable tert-Butyl 5-Phenyl-2-pyridyl Nitroxide and Related Radicals" *Inorg. Chem.*, v.47 (19), pp. 8859-8868; Okazawa, A. et al. (2009) "Super-superexchange coupling through a hydrogen bond in a linear copper(II) complex, [Cu(LH)(L)].BF$_4$.2H$_2$O (LH=N-tert-butyl-N-2-pyridylhydroxylamine)," *Chem. Phys. Lett.*, v.480, pp. 198-202; Okazawa, A. et al. (2009) "Strong intramolecular ferromagnetic couplings in nickel(II) and copper(II) complexes chelated with tert-butyl 5-methoxy-2-pyridyl Nitroxide," *Polyhedron*, v.28, pp. 1917-1921; Okazawa, A. et al. (2010) "Ferro- and Antiferromagnetic Coupling Switch Accompanied by Twist Deformation around the Copper(II) and Nitroxide Coordination Bond," *J. Am. Chem. Soc.*, v.132(33), pp. 11516-11524; Okazawa, A. et al. (2010) "Spin-Transition-Like Behavior on One Side in a Nitroxide-Copper(II)-Nitroxide Triad System," *Inorg. Chem.*, v.49(21), pp. 10144-10147; Koide, K. et al. (2011) "Biradical chelating host 2,2'-bipyridine-6,6'-diyl bis(tert-butyl nitroxide) showing tunable exchange magnetic coupling" *Inorg. Chem. Commun.*, v.14(1), pp. 194-196; Konno, T. et al. (2013) "A supramolecular switch between ground high- and low-spin states using 2,2':6',2"-terpyridine-6,6"-diyl bis(tert-butyl nitroxide)," *Chem. Commun.*, v.49, pp. 5156-5158; Bogart, J. et al. (2015) "A Ligand Field Series for the 4f-Block from Experimental and DFT Computed Ce(IV/III) Electrochemical Potentials," *Inorg. Chem.*, v.54 (6), pp. 2830-2837; Kanetomo, T. et al. (2015) "Single-molecule magnet involving strong exchange coupling in terbium(iii) complex with 2,2'-bipyridin-6-yl tert-butyl nitroxide," *Inorg. Chem. Front.*, v.2, pp. 860-866; Kawakami, H. et al. (2016) "A designed room-temperature triplet ligand from pyridine-2,6-diyl bis(tert-butyl Nitroxide)," *Dalton. Trans.*, v.45, pp. 1306-1309; Homma, Y. et al. (2018) "A New S=0⇌S=2 "Spin-Crossover" Scenario Found in a Nickel(II) Bis(nitroxide) System," *Chem. Mater.*, v.30(6), pp. 1835-1838; Krajete, A. et al. (2004) "Iminohydroxamato Early and Late Transition Metal Halide Complexes—New Precatalysts for Aluminoxane-Cocatalyzed Olefin Insertion Polymerization," *Eur. J. Inorg. Chem.*, v.2004(8), pp. 1740-1752; Li, H. et al. (2011) "Copolymerization of Ethylene with Polar Comonomers using Phenol-Nitrone Group IV complexes", *Polymer Preprints (American Chem. Soc. Division of Polymer Chem.)*, v.52(1) pp. 374-375; Zeng, W. et al. (2010) "Synthesis and Characterization of Zr Catalyst with Phenol Nitrone Ligand for Ethylene Polymerization", *Geofenzi Xuebao*, (7), pp. 952-955; Krajate, A. et al. (2004) "Iminohydroxamato Early and Late Transition Metal Halide Complexes—New Precatalysts for Aluminoxane-Cocatalyzed Olefin Insertion Polymerization", *European Journal of Inorganic Chemistry*, v.2004(8), pp. 1740-1752; Khallow, K. et al. (2001) "Preparation and antibacterial evaluation of some nitrone derivative and their zirconium (IV) chloride complexes", *Bollettino Chimico Farmaceutico*, v.140(4), pp. 224-227; Agarwal, R. K. et al. (1986) "Infrared and thermal studies of 5,6-benzoquinoline N-oxide complexes of oxozirconium(IV)", *Thermochimica Acta*, v.99, pp. 363-366; Mittal, et al. (1983) "Complexes of 8-quinolinol N-oxide with zirconium tetrachloride" *Journal of the Institution of Chemists (India)*, v.55(1), pp. 29-32; Majumdar, et al. (1973) "Solvation equilibriums in methanol and acetonitrile of quinoline N-oxide complexes of higher valent metal oxo cations", *Journal of Inorganic and Nuclear Chemistry*, v.35(12), pp. 4296-4300; Majumdar, et al. (1969) "Quinoline N-oxide complexes of some higher valent metals", *Science and Culture*, v.35(6), pp. 271-272; U.S. Pat. No. 6,846,771; CN 101704910.

SUMMARY

The present disclosure provides compounds represented by Formula I(a), I(b) or I(c):

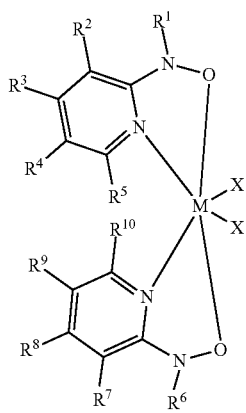

Formula I(a)

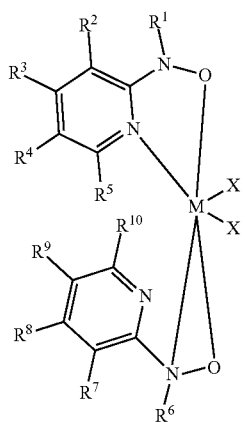

Formula I(b)

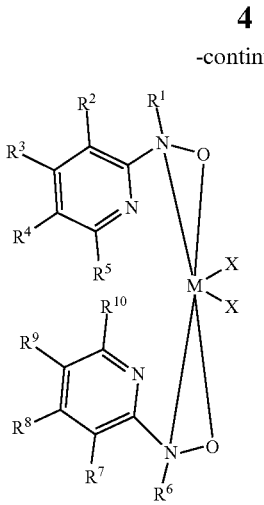

Formula I(c)

wherein:

M is a group 3, 4, 5, 6, 7, 8, 9, 10, 11, or 12 metal, such as a group 4 metal;

$R^1$ and $R^6$ are independently selected from the group consisting of hydrocarbyl and silyl groups;

$R^2$, $R^3$, $R^4$, $R^5$, $R^7$, $R^8$, $R^9$, $R^{10}$, $R^{11}$ and $R^{12}$ are independently selected from the group consisting of hydrogen, hydrocarbyl, alkoxy, silyl, amino, aryloxy, halogen and phosphino, or any two adjacent R groups are joined to form a saturated or unsaturated hydrocarbyl or heterocyclic ring, wherein the ring has 5, 6, 7, or 8 ring atoms and wherein substitutions on the ring can join to form additional rings; and each X is independently an anionic leaving group or any two adjacent X groups are joined together to form a dianionic group.

In yet another embodiment, the present disclosure provides a catalyst system comprising an activator and a catalyst compound of the present disclosure.

In still another embodiment, the present disclosure provides a catalyst system comprising an activator, a catalyst support, and a catalyst compound of the present disclosure.

In still another embodiment, the present disclosure provides a polymerization process comprising introducing one or more olefin monomers to a catalyst system comprising an activator and a catalyst compound of the present disclosure.

In still another embodiment, the present disclosure provides a polyolefin formed by a catalyst system and or method of the present disclosure.

DETAILED DESCRIPTION

The present disclosure provides pyridyl hydroxyl amine catalyst compounds and systems useful in making olefin polymerization catalysts.

In another class of embodiments, the present disclosure is directed to polymerization processes to produce polyolefin polymers from catalyst systems including one or more olefin polymerization catalysts, at least one activator, and an optional support.

For example, the present disclosure provides polymerization processes to produce a polyethylene polymer, the process including introducing a catalyst system including one or more catalyst compounds of the present disclosure, at least one activator, and an optional support, to ethylene and one or more $C_3$-$C_{10}$ alpha-olefin comonomers under polymerization conditions.

Catalysts, catalyst systems, and processes of the present disclosure can provide polyolefins with high molecular weight (e.g. Mw of 100,000 g/mol or greater), broadened PDI's (1.5-5) with comparatively low commoner incorporation (if present).

Definitions

For the purposes of the present disclosure, the numbering scheme for the Periodic Table Groups is used as described in Chemical and Engineering News, v.63(5), pg. 27 (1985). Therefore, a "group 4 metal" is an element from group 4 of the Periodic Table, e.g., Hf, Ti, or Zr.

"Catalyst Activity" is a measure of how many grams of polymer (P) are produced using a polymerization catalyst comprising W mmoles of catalyst (cat), over a period of time of T hours; and may be expressed by the following formula: P/(T×W) and expressed in units of g/mmole/hr. For calculating Catalyst Activity only the weight of the transition metal component of the catalyst is used (i.e. the activator and/or co-catalyst is omitted).

"Conversion" is the amount of monomer that is converted to polymer product, and is reported as mol % and is calculated based on the polymer yield and the amount of monomer fed into the reactor.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any suitable catalyst, such as an organometallic complex or compound that is capable of coordination polymerization addition where successive monomers are added in a monomer chain at the organometallic active center.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

A copolymer composition, such as a resin, has a "composition distribution breadth index," or "CDBI" refers to the distribution of comonomer that forms short chain branches along the copolymer backbone. When the amount of short chain branches varies among the copolymer molecules, the composition is said to have a "broad" composition distribution. When the amount of comonomer per 1,000 carbons is similar among the copolymer molecules of different chain lengths, the composition distribution is said to be "narrow." CDBI is a measure of the composition distribution of monomer within the polymer chains and is measured by the procedure described in PCT publication WO 1993/003093, published Feb. 18, 1993, specifically columns 7 and 8 as well as in Wild et al, *J. Poly. Sci., Poly. Phys. Ed.*, v.20, p. 441 (1982) and U.S. Pat. No. 5,008,204, including that fractions having a weight average molecular weight (Mw) below 15,000 g/mol are ignored when determining CDBI.

The terms "substituent," "radical," "group," and "moiety" may be used interchangeably.

As used herein, and unless otherwise specified, the term "C." means hydrocarbon(s) having n carbon atom(s) per molecule, wherein n is a positive integer. Likewise, a "$C_m$-$C_y$" group or compound refers to a group or compound comprising carbon atoms at a total number thereof from m to y. Thus, a $C_1$-$C_{50}$ alkyl group refers to an alkyl group comprising carbon atoms at a total number thereof from 1 to 50.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

An "olefin" is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" when used to refer to mer units, indicates that the mer units differ from each other by at least one atom or are different isomerically. Accordingly, the definition of copolymer, as used herein, includes terpolymers. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

The term "alpha-olefin" refers to an olefin having a terminal carbon-to-carbon double bond in the structure thereof (($R^1R^2$)—C=$CH_2$, where $R^1$ and $R^2$ can be independently hydrogen or any hydrocarbyl group; preferably $R^1$ is hydrogen and $R^2$ is an alkyl group). A "linear alpha-olefin" is an alpha-olefin defined in this paragraph wherein $R^1$ is hydrogen, and $R^2$ is hydrogen or a linear alkyl group.

For the purposes of the present disclosure, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in units of g/mol.

Unless otherwise noted all melting points (Tm) are DSC second melt.

The following abbreviations may be used herein: TNOAL is tri(n-octyl)aluminum, MAO is methylalumoxane, and RT is room temperature (and is 23° C. unless otherwise indicated).

A "catalyst system" is a combination of at least one catalyst compound, at least one activator, an optional co-activator, and an optional support material. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this present disclosure and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein embrace both neutral and ionic forms of the catalyst compounds and activators.

In the description herein, a catalyst compound may be described as a catalyst precursor, a pre-catalyst compound, catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Examples of neutral donor ligands include a neutral Lewis base, such as, for example, amines, alcohols, ethers, ketones, aldehydes, esters, sulfides or phosphines, which can be bonded with a metal center or can still be contained in the complex as residual solvent from the preparation of the metal complexes.

The terms "activator" and "cocatalyst" are also used interchangeably.

A scavenger is a compound that may be added to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator can be pre-mixed with the transition metal compound to form an alkylated transition metal compound.

Non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any suitable metal or metalloid that can form a compatible, weakly coordinating complex may be used or contained in the non-coordinating anion. Suitable metals include, aluminum, gold, and platinum. Suitable metalloids include, boron, aluminum, phosphorus, and silicon.

Unless otherwise indicated, (e.g., the definition of "substituted hydrocarbyl", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*_3$, $-GeR^*_3$, $-SnR^*_3$, $-PbR^*_3$, or $-(CH_2)_\alpha-SiR^*_3$, where a is 1 to 10 and each R* is independently a hydrocarbyl or halocarbyl radical, and two or more R* may join together to form a substituted or unsubstituted completely saturated, partially unsaturated, or aromatic cyclic, heterocyclic, or polycyclic ring structure), or where at least one heteroatom has been inserted within a hydrocarbyl ring.

The terms "alkoxy" and "alkoxide" and aryloxy" and "aryloxide" mean an alkyl or aryl group bound to an oxygen atom, such as an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, or phenoxyl.

The terms "hydrocarbyl radical," "hydrocarbyl group," or "hydrocarbyl" may be used interchangeably and are defined to mean a group consisting of hydrogen and carbon atoms only. Suitable hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, aryl groups, such as phenyl, benzyl, naphthyl.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*_3$, $-GeR^*_3$, $-SnR^*_3$, $-PbR^*_3$, $-(CH_2)_\alpha-SiR^*_3$, where a is 1 to 10 and each R* is independently a hydrocarbyl or halocarbyl radical, and two or more R* may join together to form a substituted or unsubstituted completely saturated, partially unsaturated, or aromatic cyclic, heterocyclic, or polycyclic ring structure), or where at least one heteroatom has been inserted within a hydrocarbyl ring.

The terms "alkyl radical," and "alkyl" are used interchangeably throughout this disclosure. For purposes of this disclosure, "alkyl radical" is defined to be a saturated hydrocarbon radical that may be linear, branched, or cyclic. Examples of such radicals can include $C_1$-$C_{100}$ saturated hydrocarbon radicals ($C_1$-$C_{100}$ alkyls), such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as $-NR^*_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, including their substituted analogues.

As used herein, and unless otherwise specified, the term "aromatic" refers to unsaturated cyclic hydrocarbons having a delocalized conjugated π system. Typical aromatics comprise 5 to 20 carbon atoms (aromatic C$_5$-C$_{20}$ hydrocarbon), particularly from 5 to 12 carbon atoms (aromatic C$_5$-C$_{12}$ hydrocarbon), and particularly from 5 to 10 carbon atoms (aromatic C$_5$-C$_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof.

The term "aryl" or "aryl group" means an aromatic ring, such as phenyl, indenyl, anthracenyl, phenanthracenyl, pyrenyl. Likewise, heteroaryl means an aryl group where a ring carbon atom (or two or three ring carbon atoms) has been replaced with a heteroatom, such as N, O, or S.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has five ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and N,N-dimethyl-4-aminophenyl is a heteroatom-substituted ring.

The term "continuous" means a system that operates without interruption or cessation. For example, a continuous process to produce a polymer would be one where the reactants are continually introduced into one or more reactors and polymer product is continually withdrawn until the polymerization is stopped.

A solution polymerization means a polymerization process in which the polymer is dissolved in a liquid polymerization medium, such as an inert solvent or monomer(s) or their blends. A solution polymerization is homogeneous. A homogeneous polymerization is one where the polymer product is dissolved in the polymerization medium. Suitable systems may not turbid as described in Oliveira, J. Vladimir et al. (2000) *Ind. Eng. Chem. Res.*, v.29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

Unless otherwise indicated, as used herein, "high molecular weight" is defined as a number average molecular weight (Mn) value of 100,000 g/mol or more. "Ultra-high molecular weight" is defined as a number average molecular weight (Mn) value of 1,000,000 g/mol or more. "Low molecular weight" is defined as an Mn value of less than 100,000 g/mol.

Transition Metal Complexes

In at least one embodiment, the present disclosure relates to pyridyl hydroxyl amine transition metal complexes.

In at least one embodiment, a catalyst compound, and catalyst systems including such compounds, is represented by Formula I(a), I(b) or I(c):

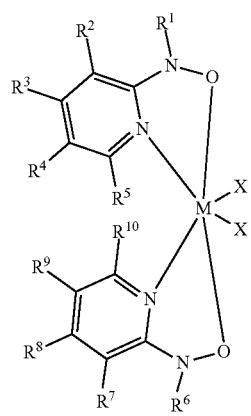

Formula I(a)

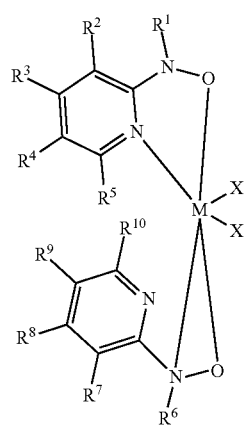

Formula I(b)

Formula I(c)

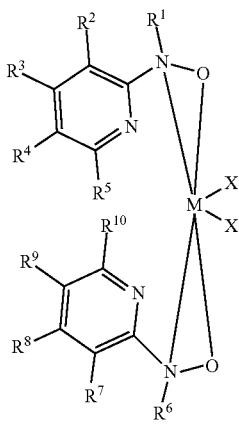

wherein:

M is a group 3, 4, 5, 6, 7, 8, 9, 10, 11, or 12 metal, such as a group 4 metal;

$R^1$ and $R^6$ are independently selected from the group consisting of hydrocarbyl, substituted hydrocarbyl, silyl, and substituted silyl groups;

$R^2$, $R^3$, $R^4$, $R^5$, $R^7$, $R^8$, $R^9$, $R^{10}$, $R^{11}$ and $R^{12}$ are independently selected from the group consisting of hydrogen, hydrocarbyl, substituted hydrocarbyl, alkoxy, silyl, amino, aryloxy, halogen and phosphino; wherein any two adjacent R groups may be joined to form a saturated or unsaturated hydrocarbyl, substituted hydrocarbyl, or heterocyclic ring, wherein the ring has 5, 6, 7, or 8 ring atoms and wherein substitutions on the ring can join to form additional rings; and each X is independently an anionic leaving group; wherein any two adjacent X groups may be joined together to form a dianionic group.

In at least some embodiments, M of Formula I(a), I(b) or I(c) is Ti, Zr, or Hf.

In at least some embodiments, $R^1$ and $R^6$ of Formula I(a), I(b) or I(c) are independently selected from the group consisting of alkyl, cycloalkyl and aryl.

In some embodiments, $R^1$ and $R^6$ of Formula I(a), I(b) or I(c) are independently selected from the group consisting of alkyl and aryl, which may or may not be substituted.

In some embodiments, $R^1$ and $R^6$ of Formula I(a), I(b) or I(c) are independently selected from the group consisting of t-butyl, 3,5-dimethylphenyl, 2,3,4,5,6-pentamethylphenyl, and 2,4,6-triisopropylphenyl.

In some embodiments, $R^2$, $R^3$, $R^4$, $R^5$, $R^7$, $R^8$, $R^9$, and $R^{11}$ of Formula I(a), I(b) or I(c) are independently selected from the group consisting of hydrogen, alkyl, aryl and alkoxy.

Examples of alkyl groups include methyl, ethyl, n-propyl, isopropyl, n-butyl, isobutyl, sec-butyl, tert-butyl, n-pentyl, isopentyl, sec-pentyl, neo-pentyl, 1,2-dimethylpropyl, iso-amyl, n-hexyl, isohexyl, sec-hexyl, n-heptyl, isoheptyl n-octyl, n-decyl, n-dodecyl and n-octadecyl; preferably $C_1$-$C_{12}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl or n-decyl, such as $C_1$-$C_4$-alkyl such as methyl, ethyl, n-propyl, isopropyl, n-butyl, isobutyl, sec-butyl and tert-butyl. Examples of aryl groups include 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, phenyl, 1-naphthyl, 2-naphthyl, t-butyl, 3,5-dimethylphenyl, 2,3,4,5,6-pentamethylphenyl, and 2,4,6-triisopropylphenyl. Examples of alkoxy groups include methoxy, ethoxy, n-propoxy, isopropoxy, n-butoxy, isobutoxy, sec-butoxy, tert-butoxy, n-pentoxy, isopentoxy, n-hexoxy and isohexoxy, particularly preferably methoxy, ethoxy, n-propoxy and n-butoxy.

In at least one embodiment, at least one of $R^2$, $R^3$, $R^4$, $R^5$, $R^7$, $R^8$, $R^9$, and $R^{10}$ of Formula I(a), I(b) or I(c) is independently selected from the group consisting of hydrocarbyl, alkoxy, silyl, amino, aryloxy, halogen, and phosphino, or any two adjacent R groups may be joined to form a saturated or unsaturated hydrocarbyl or heterocyclic ring, wherein the ring has 5, 6, 7, or 8 ring atoms and wherein substitutions on the ring can join to form additional rings.

In some embodiments, $R^2$, $R^3$, $R^4$, $R^5$, $R^7$, $R^8$, $R^9$, and $R^{10}$ of Formula I(a), I(b) or I(c) are independently selected from the group consisting of hydrogen, methyl, t-butyl, phenyl, 1-methylphenyl, t-butoxy, 3,5-dimethylphenyl, 2,3,4,5,6-pentamethylphenyl, and 2,4,6-triisopropylphenyl.

In some embodiments, each X of Formula I(a), I(b) or I(c) can be independently selected from methyl, ethyl, propyl, butyl, pentyl, hexyl, heptyl, octyl, nonyl, decyl, undecyl, dodecyl, phenyl, substituted phenyl, biphenyl or an isomer thereof, including perfluoropropyl, perfluorobutyl, perfluoroethyl, perfluoromethyl, and substituted hydrocarbyl radicals and all isomers of substituted hydrocarbyl radicals including trimethylsilylpropyl, trimethylsilylmethyl, trimethylsilylethyl, and phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl.

In some embodiments, each X is independently selected from methyl, ethyl benzyl, bromo or chloro.

In at least one embodiment, each X is benzyl or chloro.

In at least one embodiment, the catalyst compound represented by Formula I(a) is selected from the group consisting of:

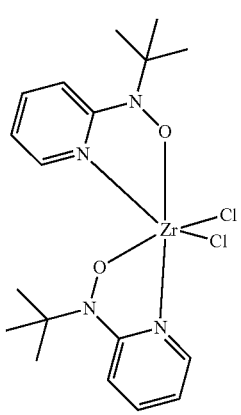

1

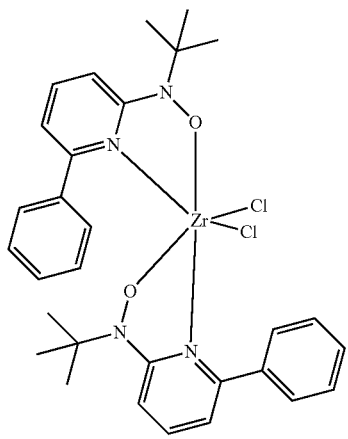
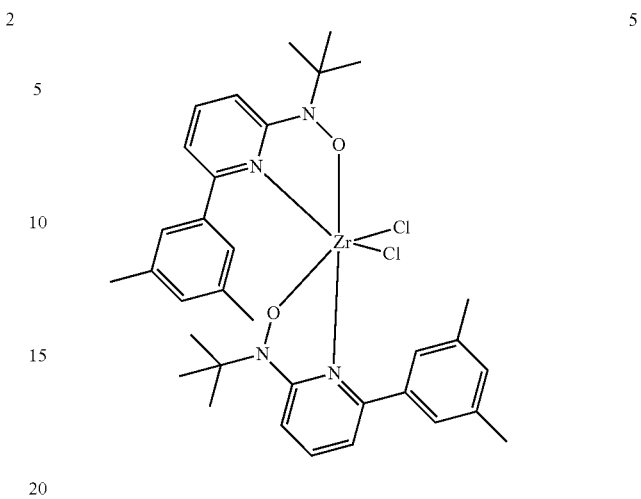
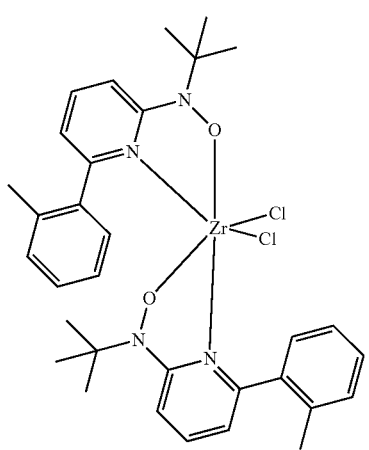
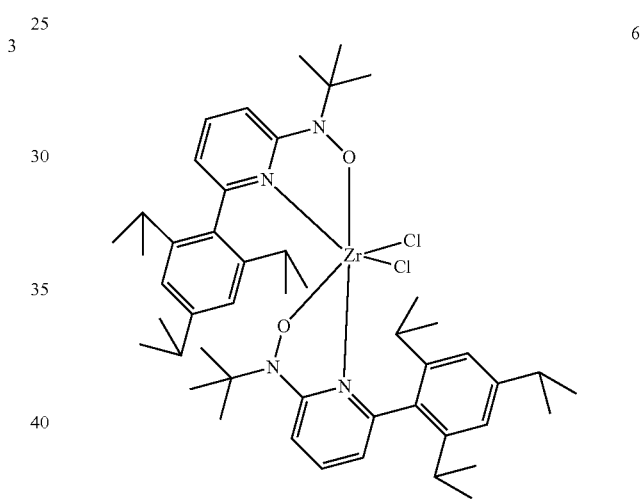
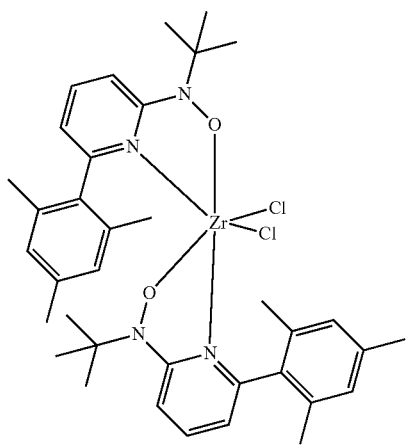
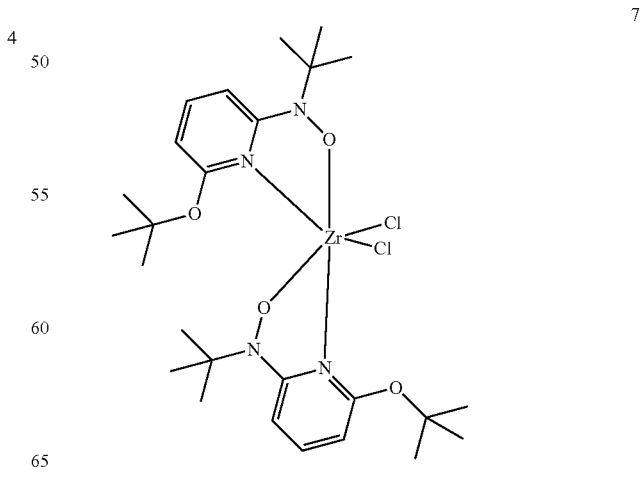

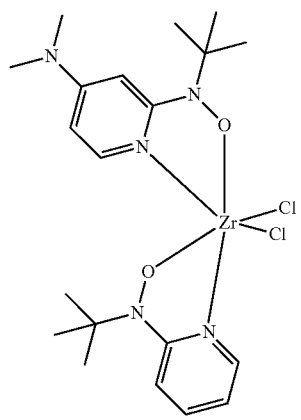
7
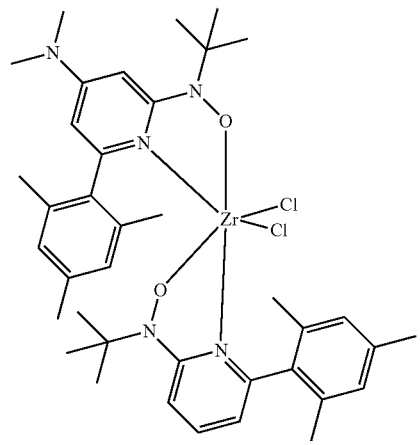
8
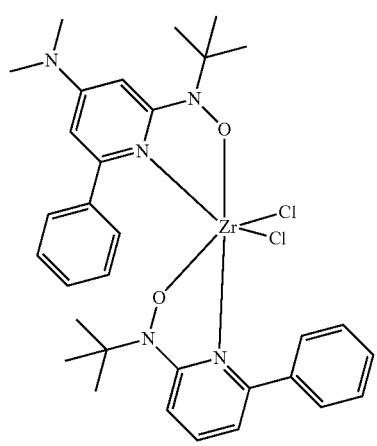
9
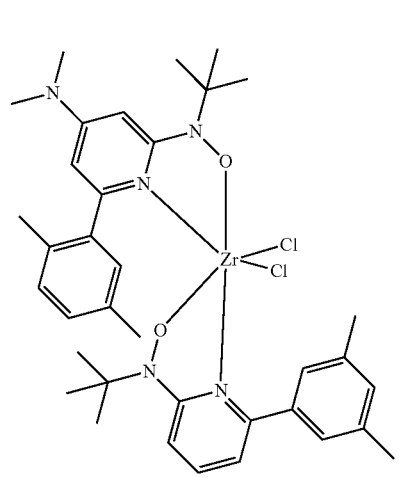
11
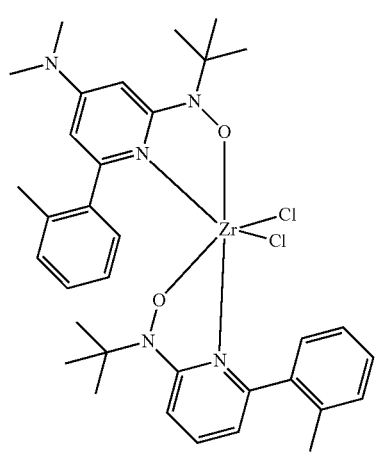
10
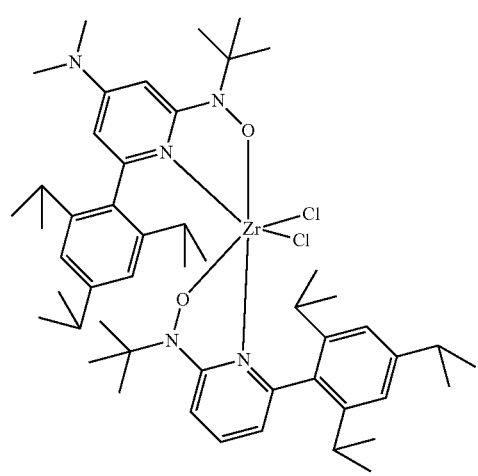
12
13

14
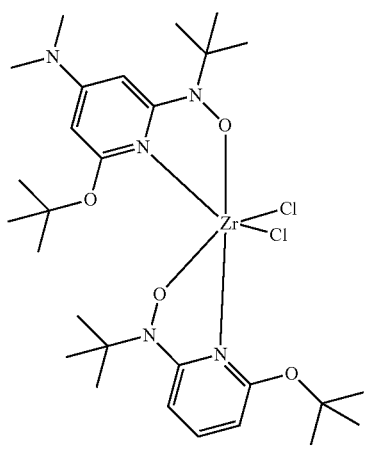
15
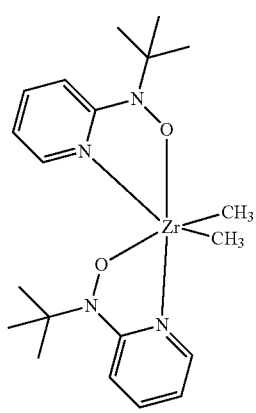
16
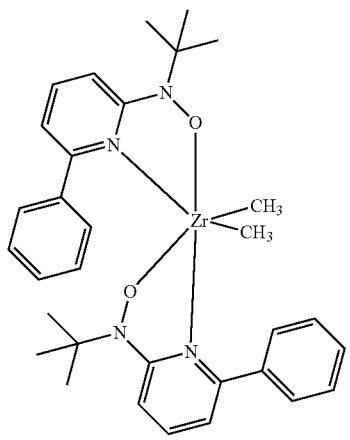
17
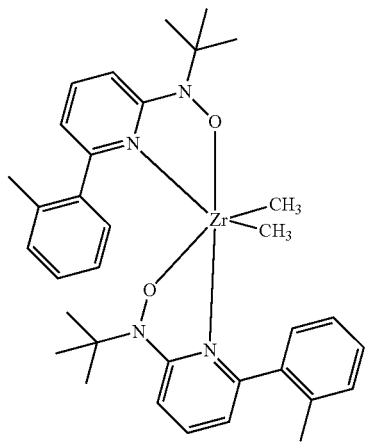
18
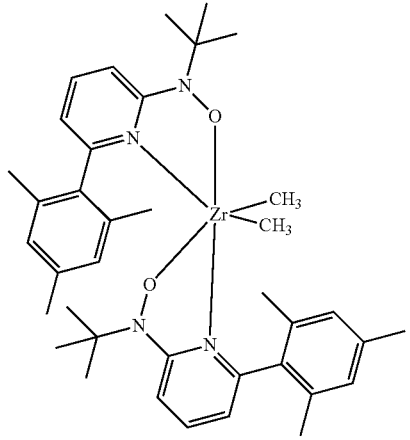
19
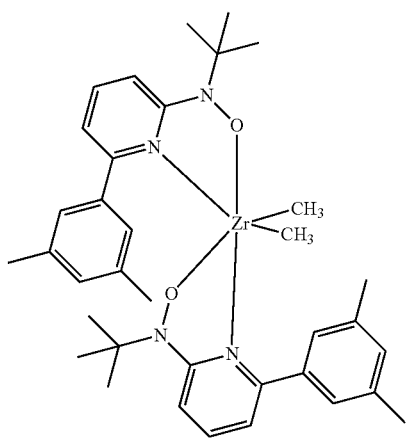

20
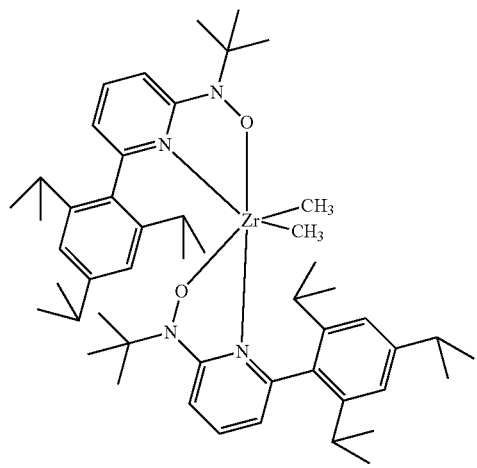
21
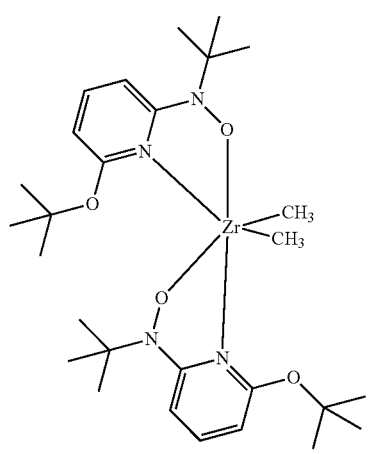
22
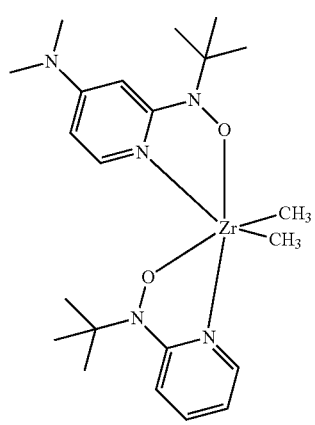
23
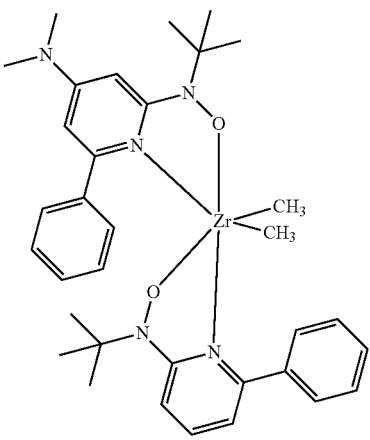
24
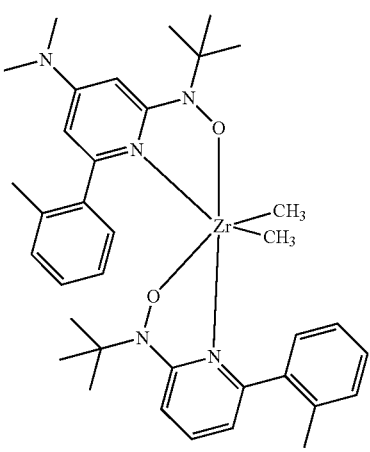
25
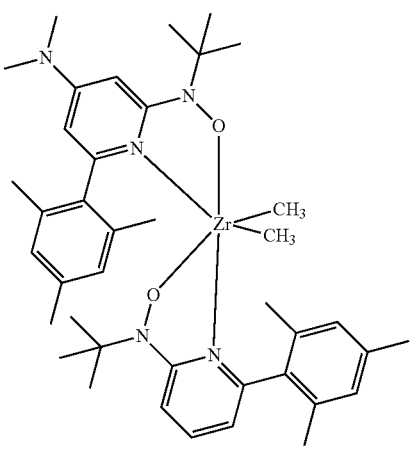

-continued
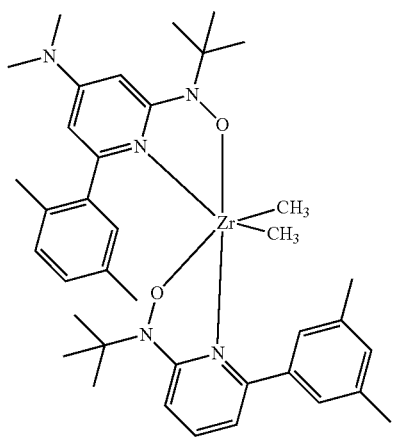
26
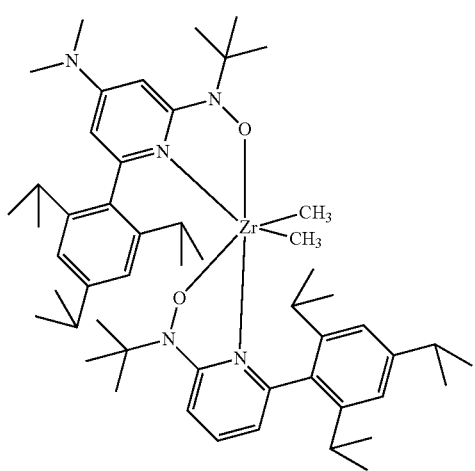
27
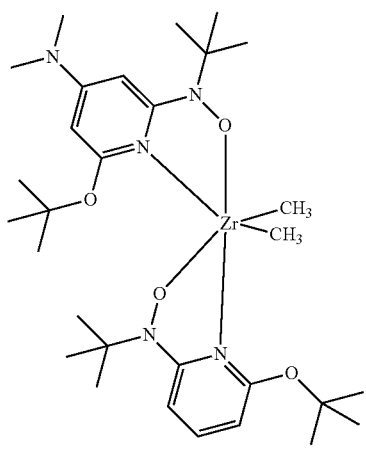
28
In at least one embodiment, the catalyst compound represented by Formula I(a) is selected from the group consisting of:
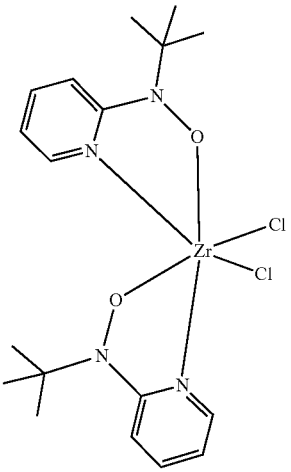
1
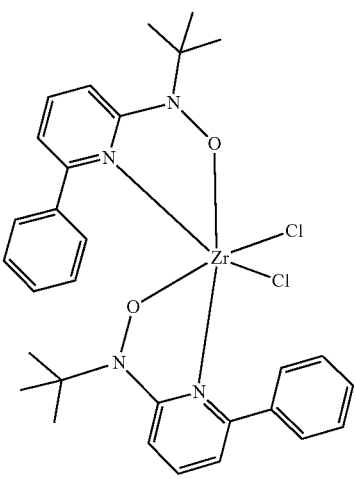
2
In at least one embodiment, the catalyst compound represented by Formula I(b) is selected from the group consisting of:
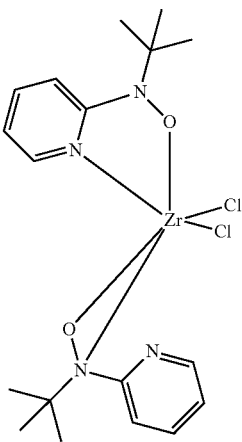
29

30
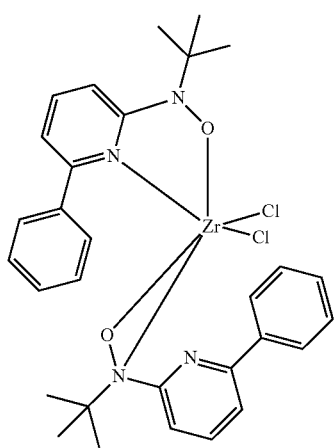
31
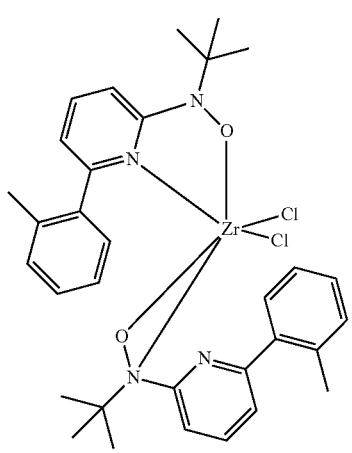
32
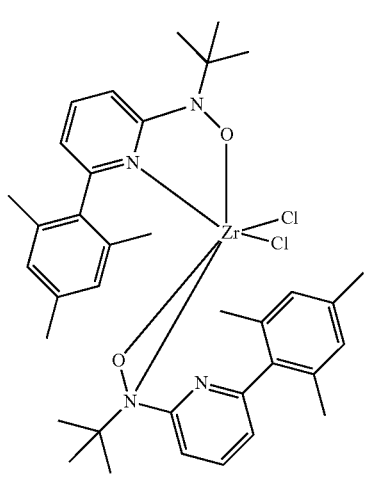
33
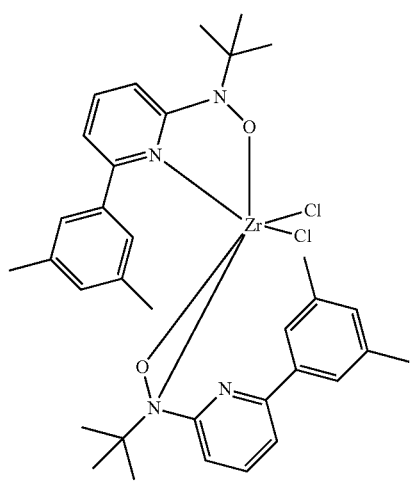
34
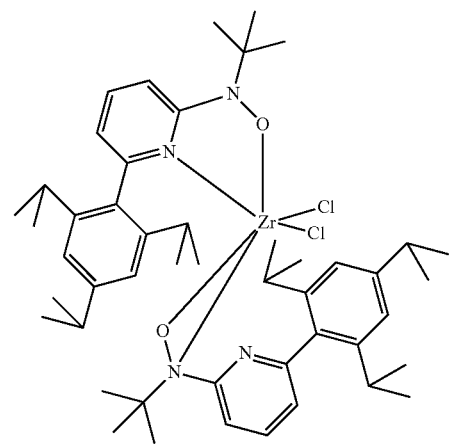
35
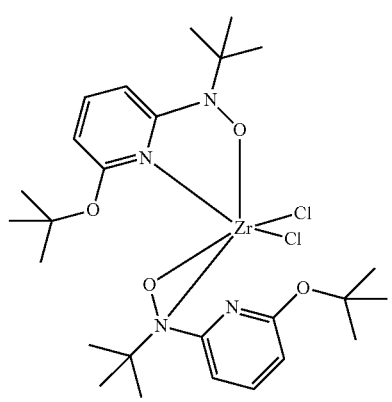

36
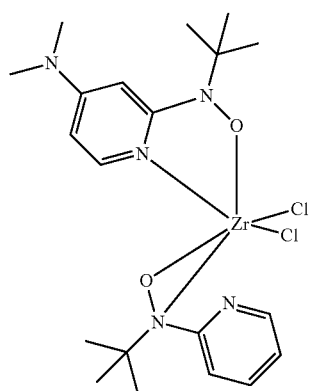
37
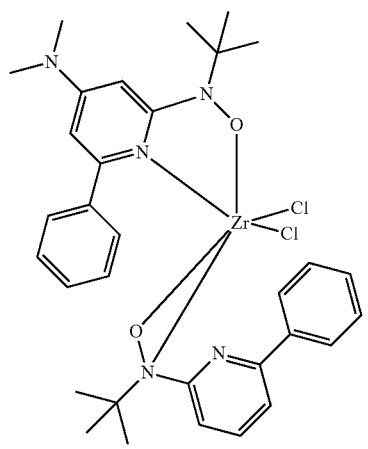
38
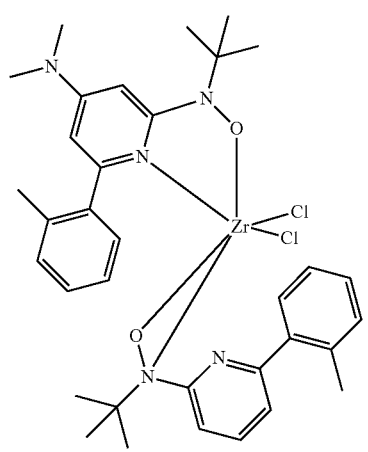
39
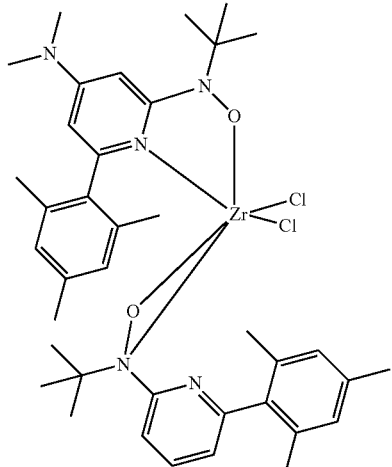
40
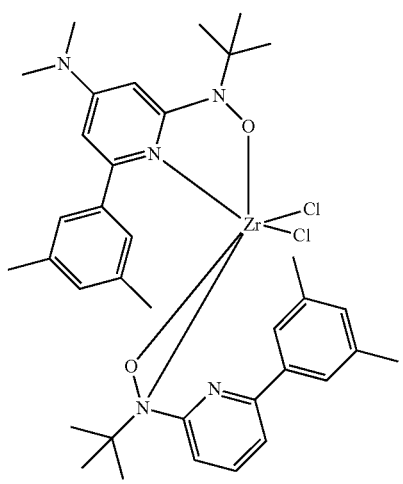
41
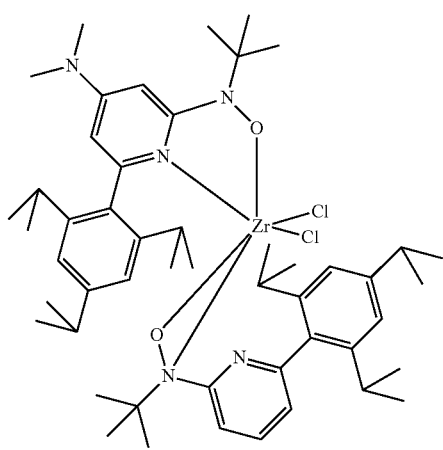

42
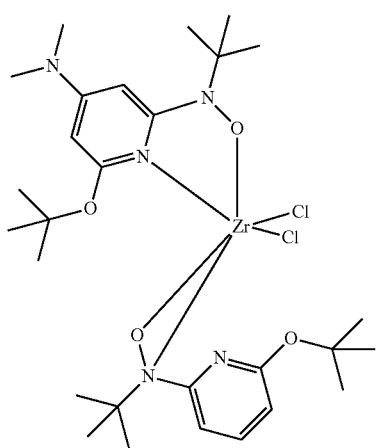
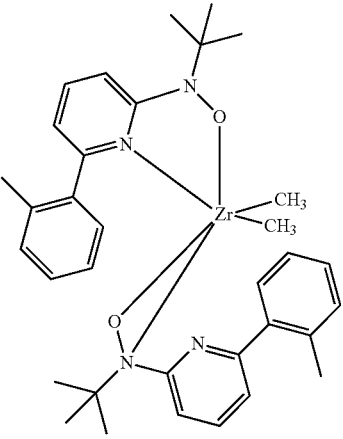
45
43
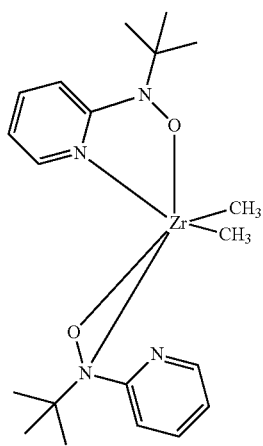
46
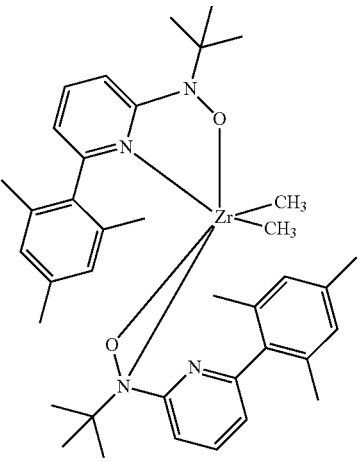
44
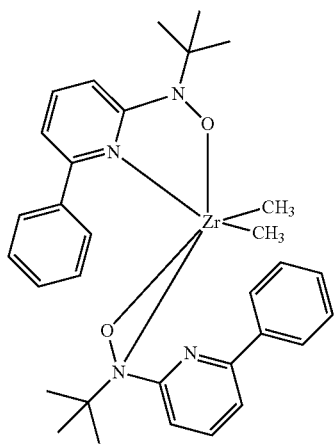
47
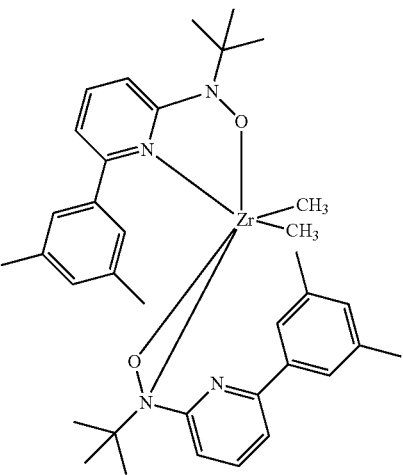

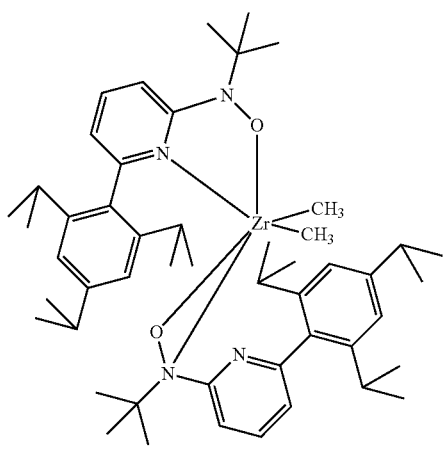
48
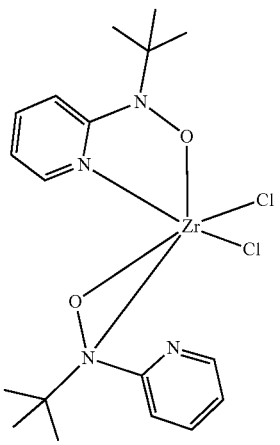
29
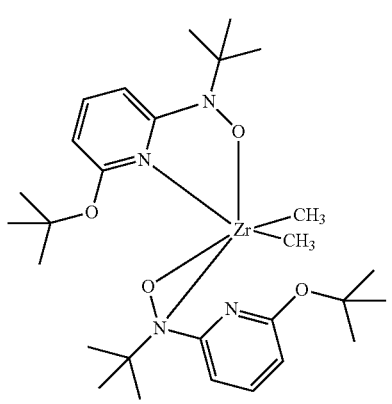
49
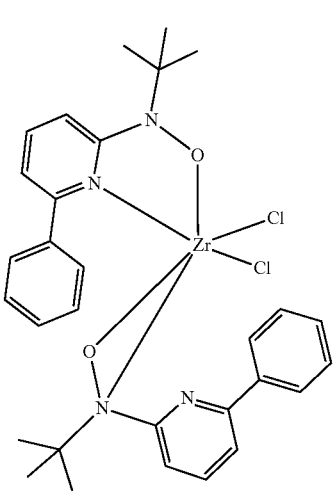
30
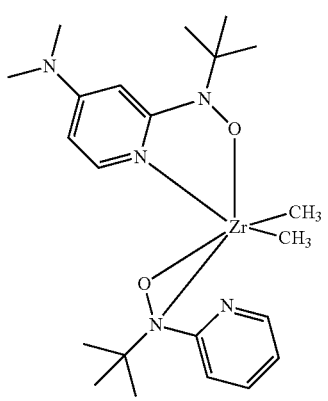
In at least one embodiment, the catalyst compound represented by Formula I(b) is selected from the group consisting of:
In at least one embodiment, the catalyst compound represented by Formula I(c) is selected from the group consisting of:
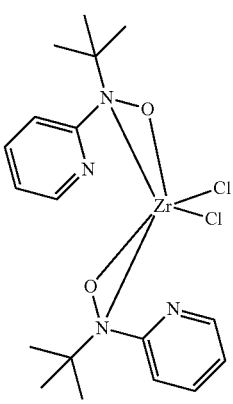
51

-continued
52
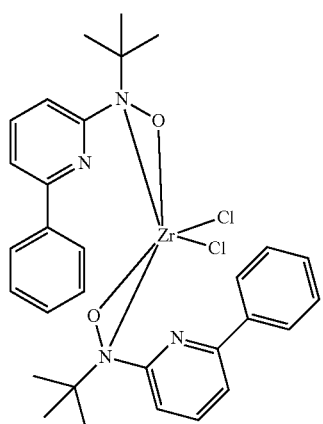
53
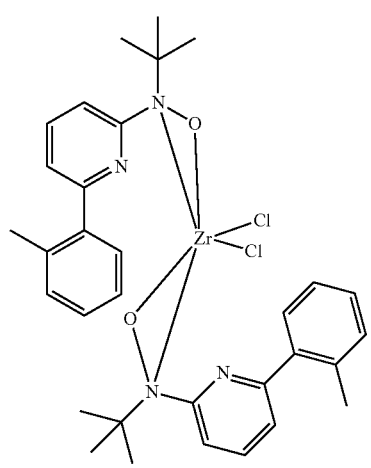
54
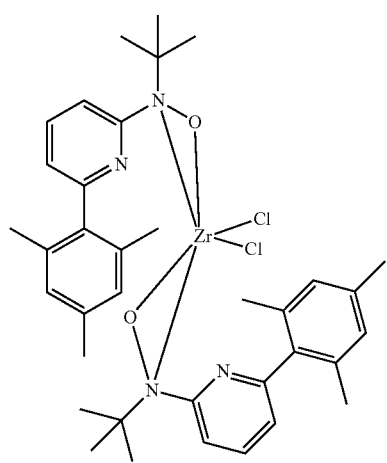
-continued
55
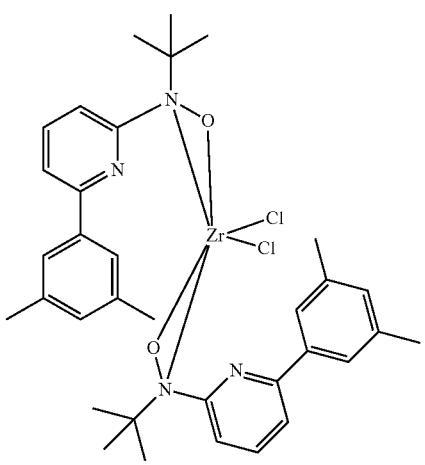
56
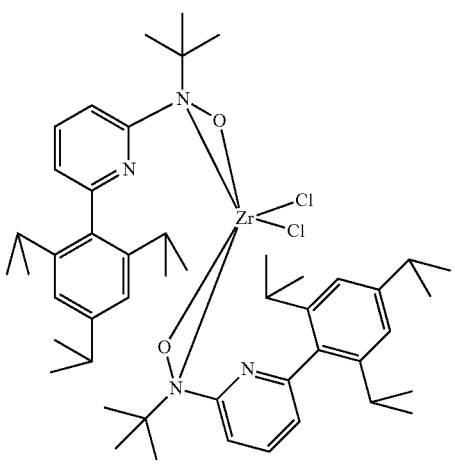
57
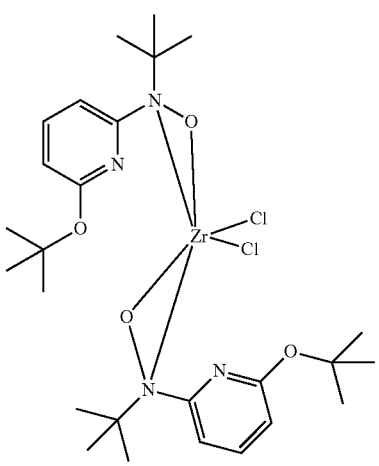

-continued
58
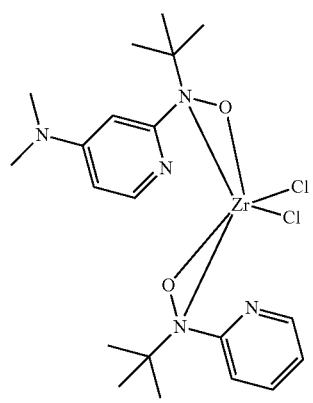
59
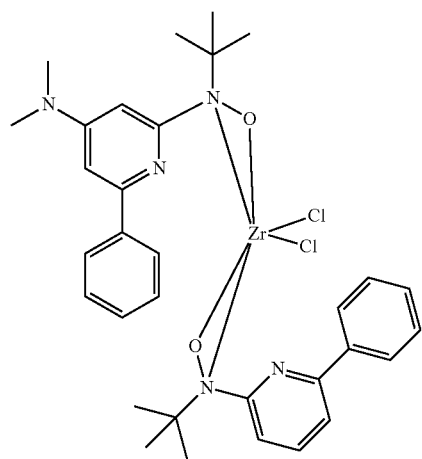
60
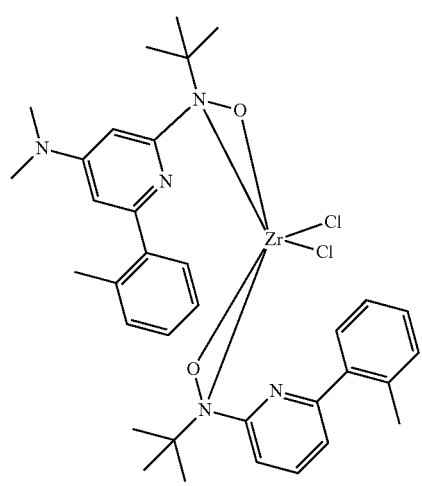
-continued
61
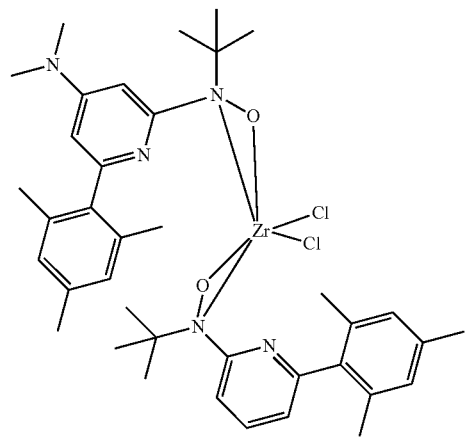
62
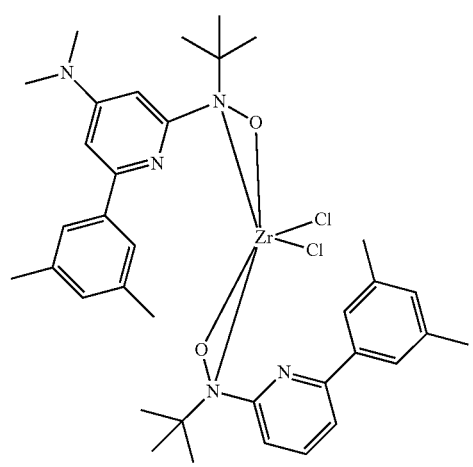
63
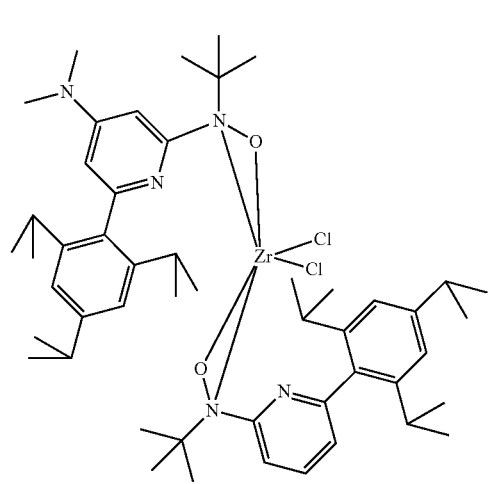

64
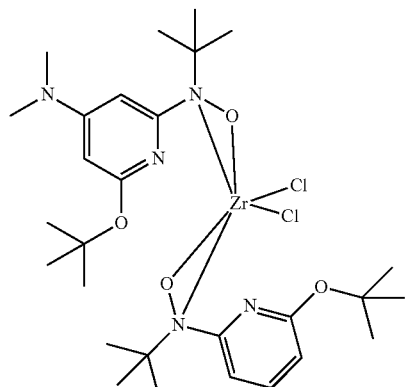
65
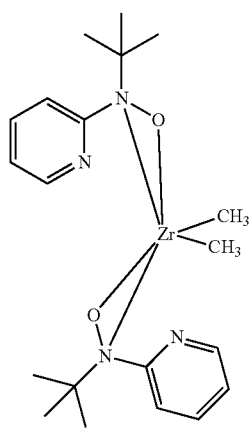
66
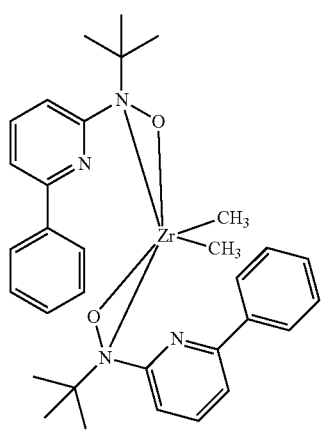
67
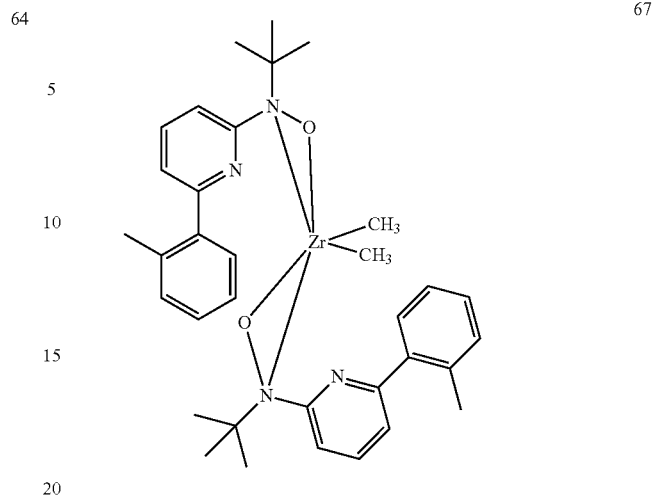
68
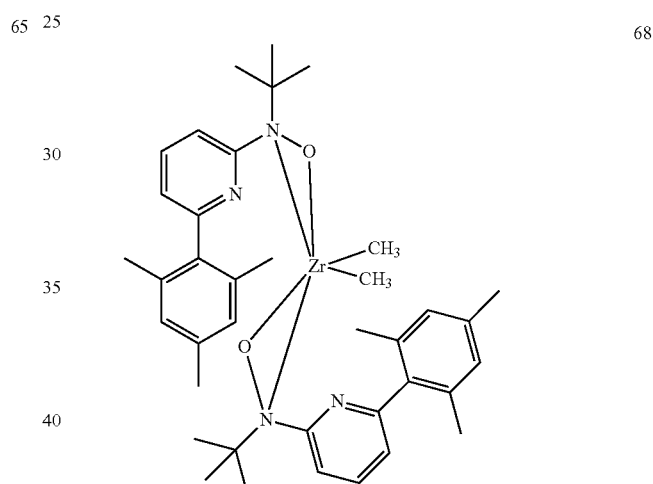
69
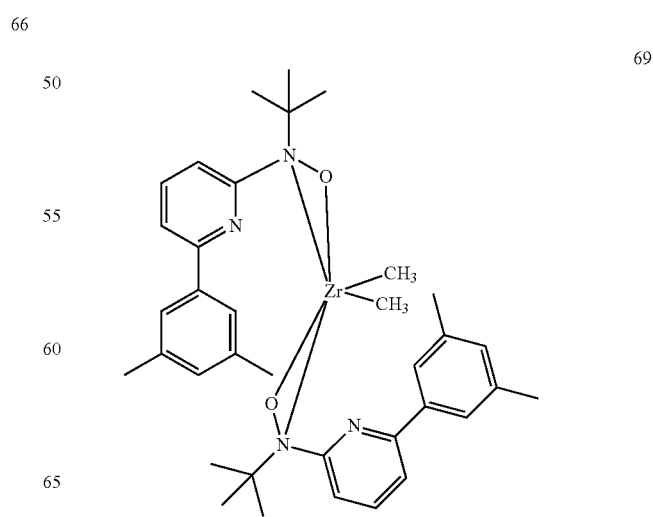

70
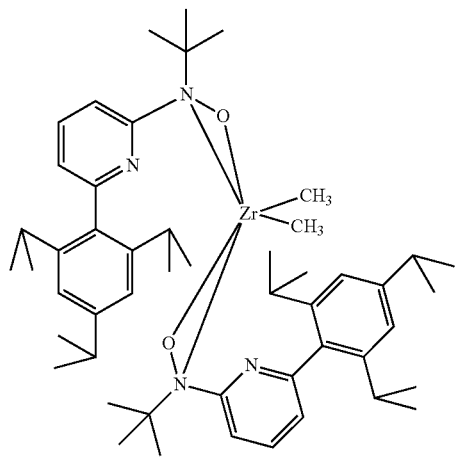
71
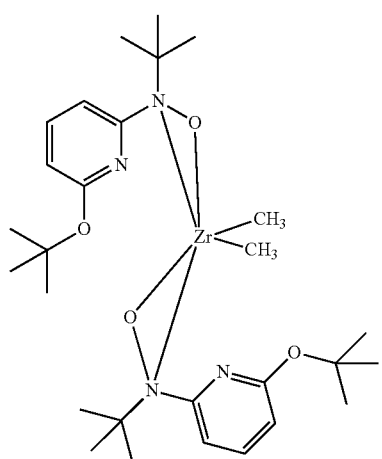
72
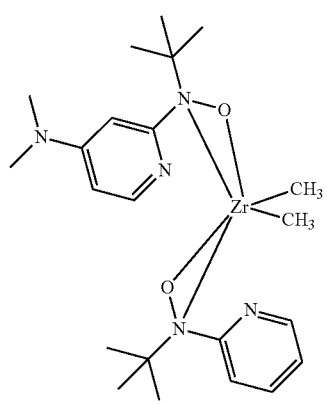
73
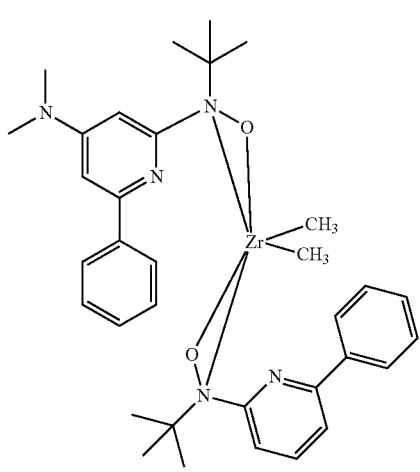
74
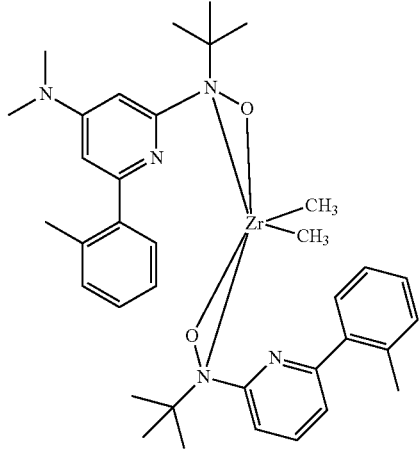
75
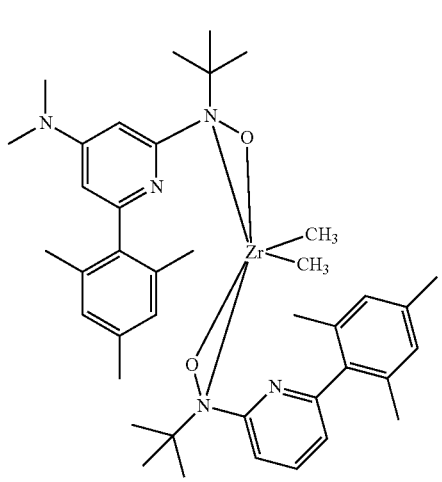

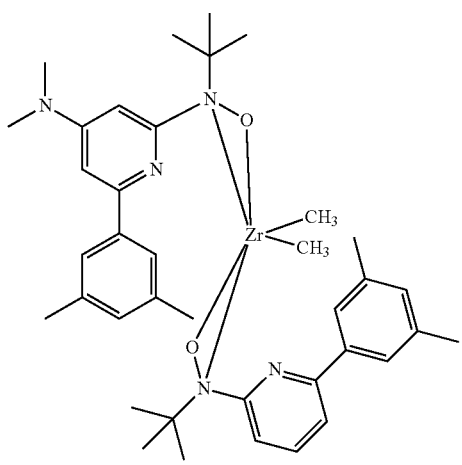

76

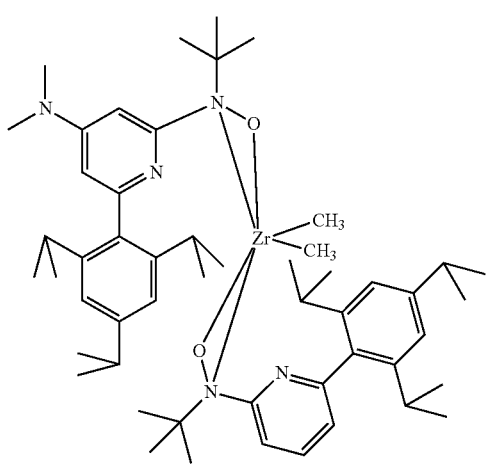

77

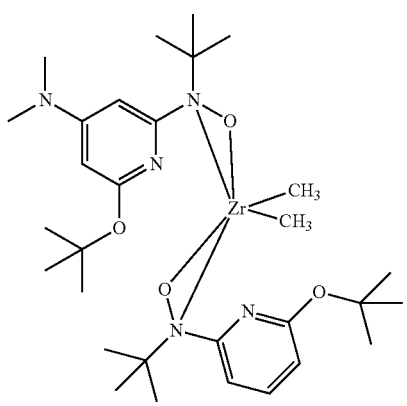

78

In at least one embodiment, the catalyst compound represented by Formula I(c) is selected from the group consisting of:

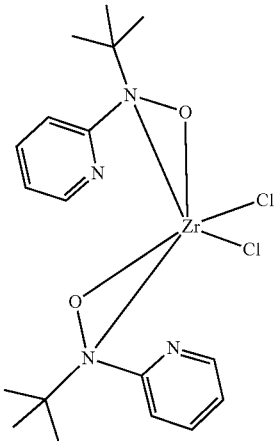

51

52

Methods to Prepare the Catalyst Compounds.

Catalyst compounds may be prepared by salt metathesis reactions. For these preparations, pyridyl hydroxyl aminato salts are combined with transition metal precursors. In these reactions the metalation reaction affords a pyridyl hydroxyl aminato adduct to a transition metal with loss of a salt. Alternatively, pyridyl hydroxyl amines may be combined with transition metal precursor containing anionic ligands, such as alkoxides, benzyl groups, or amides. In these preparations a pyridyl hydroxyl aminato adduct to a transition metal is obtained with loss of a neutrally charged ligand such as an alcohol, tolyl group or amine.

Activators

The terms "cocatalyst" and "activator" are used herein interchangeably and are defined to be a compound which can activate one of the catalyst compounds described above by converting the neutral catalyst compound to a catalytically active catalyst compound cation.

After the complexes described above have been synthesized, catalyst systems may be formed by combining them with activators in any suitable manner including by supporting them for use in slurry or gas phase polymerization. The catalyst systems may also be added to or generated in solution polymerization or bulk polymerization (in the monomer). Suitable catalyst systems may include a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Activators can include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

In at least one embodiment, the catalyst system includes an activator and the catalyst compound of Formula I(a), Formula I(b) and/or Formula I(c).

In at least one embodiment, the catalyst system further includes a support material.

In at least one embodiment, the catalyst system includes a support material selected from $Al_2O_3$, $ZrO_2$, $SiO_2$, $SiO_2/Al_2O_3$, $SiO_2/TiO_2$, silica clay, silicon oxide/clay, or mixtures thereof.

In at least one embodiment, the catalyst system contains an activator that includes an alkylalumoxane.

Alumoxane Activators

In one embodiment, alumoxane activators are utilized as an activator in the catalyst system. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), in at least one embodiment, select the maximum amount of activator at up to a 5000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane is present at zero mole %, alternately the alumoxane is present at a molar ratio of aluminum to catalyst compound transition metal less than 500:1, such as less than 300:1, such as less than 100:1, such as less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. A metal or metalloid that can form a compatible, weakly coordinating complex may be used or contained in the non-coordinating anion. Suitable metals include, aluminum, gold, and platinum. Suitable metalloids include, boron, aluminum, phosphorus, and silicon.

"Compatible" non-coordinating anions can be those which are not degraded to neutrality when the initially formed complex decomposes. Further, the anion might not transfer an anionic substituent or fragment to the cation so as to cause it to form a neutral transition metal compound and a neutral by-product from the anion. Non-coordinating anions can be those that are compatible, stabilize the transition metal cation in the sense of balancing its ionic charge at +1, and yet retain sufficient lability to permit displacement during polymerization.

It is within the scope of the present disclosure to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator. In at least one embodiment, boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums. $Z_d^+$ can be triphenyl carbonium. Reducible Lewis acids can be a triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

Alternately $(Z)_d^+$ is represented by the formula:

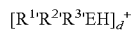

wherein: E is nitrogen or phosphorous; d is 1, 2 or 3; $R^{1\prime}$, $R^{2\prime}$, and $R^{3\prime}$ are independently hydrogen or a $C_1$ to $C_{50}$ hydrocarbyl group optionally substituted with one or more alkoxy groups, silyl groups, a halogen atoms, or halogen containing groups, wherein $R^{1\prime}$, $R^{2\prime}$, and $R^{3\prime}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Alternately E is nitrogen; $R^{1\prime}$ is hydrogen, and $R^{2\prime}$, and $R^{3\prime}$ are independently a $C_6$-$C_{40}$ hydrocarbyl group optionally substituted with one or more alkoxy groups, silyl groups, a halogen atoms, or halogen containing groups, wherein $R^{2\prime}$, and $R^{3\prime}$ together comprise 14 or more carbon atoms.

Alternately E is nitrogen; $R^{1\prime}$ is hydrogen, and $R^{2\prime}$ is a $C_6$-$C_{40}$ hydrocarbyl group optionally substituted with one or more alkoxy groups, silyl groups, a halogen atoms, or halogen containing groups, and $R^{3\prime}$ is a substituted phenyl group, wherein $R^{2\prime}$, and $R^{3\prime}$ together comprise 14 or more carbon atoms.

The anion component $A^{d-}$ includes those having the formula $[M^{k+}G_n]^{d-}$ where k is 1, 2, or 3; n is 1, 2, 3, 4, 5, or 6 (such as 1, 2, 3, or 4); n–k=d; M is an element selected from Group 13 of the Periodic Table of the Elements, such as boron or aluminum, and G is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said G having up to 20 carbon atoms with the proviso that in not more than 1 occurrence is G a halide. Each G can be a fluorinated hydrocarbyl group having 1 to 20 carbon atoms, such as each G is a fluorinated aryl group, and such as each G is a pentafluoryl aryl group. Examples of suitable $A^{d-}$ also include diboron compounds as disclosed in U.S. Pat. No. 5,447,895, which is fully incorporated by reference.

Illustrative examples of boron compounds which may be used as an activating cocatalyst are the compounds described as (and particularly those specifically listed as) activators in U.S. Pat. No. 8,658,556, which is incorporated by reference herein.

The ionic stoichiometric activator $Z_d^+$ ($A^{d-}$) can be one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

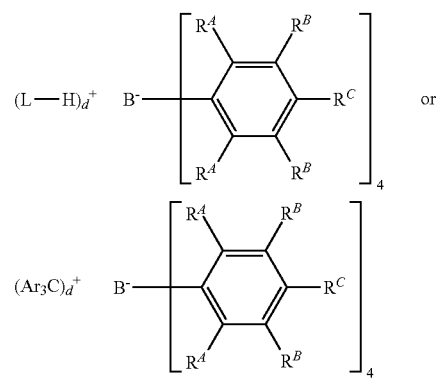

wherein:
each $R^A$ is independently a halide, such as a fluoride;
Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);
each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);
L is a Lewis base; (L-H)$^+$ is a Bronsted acid; d is 1, 2, or 3;
where the anion has a molecular weight of greater than 1,020 g/mol; and
where at least three of the substituents on the B atom each have a molecular volume of greater than 250 cubic A, alternately greater than 300 cubic A, or alternately greater than 500 cubic A. For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Jrnl. of Chem. Edu., v.71(11), November 1994, pp. 962-964. Molecular volume (MV), in units of cubic A, is calculated using the formula: MV=8.3$V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of useful bulky activators please see U.S. Pat. No. 8,658,556, which is incorporated by reference herein.

In another embodiment, one or more of the NCA activators is chosen from the activators described in U.S. Pat. No. 6,211,105.

Exemplary activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4$$^-$], [Me$_3$NH+][B(C$_6$F$_5$)$_4$$^-$], 1-(4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In at least one embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate (where alkyl is methyl, ethyl, propyl, n-butyl, sec-butyl, or t-butyl).

Suitable activator-to-catalyst ratio, e.g., all NCA activators-to-catalyst ratio may be about a 1:1 molar ratio. Alternate ranges include from 0.1:1 to 100:1, alternately from 0.5:1 to 200:1, alternately from 1:1 to 500:1, alternately from 1:1 to 1000:1. A useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be alkylalumoxanes, a compound represented by the formula AlR$_3$, ZnR$_2$ (where each R is, independently, a C$_1$-C$_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may include an inert support material. The supported material can be a porous support material, for example, talc, and inorganic oxides. Other support materials include zeolites, clays, organoclays, or other organic or inorganic support materials, or mixtures thereof.

The support material can be an inorganic oxide in a finely divided form. Suitable inorganic oxide materials for use in catalyst systems include Groups 2, 4, 13, and 14 metal oxides, such as silica, alumina, and mixtures thereof. Other inorganic oxides that may be employed either alone or in combination with the silica, or alumina are magnesia, titania, or zirconia. Other suitable support materials, however, can be employed, for example, finely divided functionalized polyolefins, such as finely divided polyethylene. Useful supports include magnesia, titania, zirconia, montmorillonite, phyllosilicate, zeolites, talc, or clays. Also, combinations of these support materials may be used, for example, silica-chromium, silica-alumina, or silica-titania. Support materials include Al$_2$O$_3$, ZrO$_2$, SiO$_2$, and combinations thereof, such as SiO$_2$, Al$_2$O$_3$, or SiO$_2$/Al$_2$O$_3$.

The support material, such as an inorganic oxide, can have a surface area of from about 10 m$^2$/g to about 700 m$^2$/g, pore volume of from about 0.1 cm$^3$/g to about 4 cm$^3$/g and average particle size of from about 5 μm to about 500 μm. The surface area of the support material can be of from about 50 m$^2$/g to about 500 m$^2$/g, pore volume of from about 0.5 cm$^3$/g to about 3.5 cm$^3$/g and average particle size of from about 10 μm to about 200 μm. For example, the surface area of the support material is from about 100 m$^2$/g to about 400 m$^2$/g, pore volume from about 0.8 cm$^3$/g to about 3 cm$^3$/g and average particle size is from about 5 μm to about 100 μm. The average pore size of the support material useful in the present disclosure is from 10 Å to 1000 Å, such as 50 Å to about 500 Å, and such as 75 Å to about 350 Å. In at least one embodiment, the support material is a high surface area, amorphous silica (surface area=300 m$^2$/gm; pore volume of 1.65 cm$^3$/gm). Silicas can be marketed under the tradenames of DAVISON 952 or DAVISON 955 by the Davison Chemical Division of W.R. Grace and Company. In other embodiments DAVISON 948 is used. Alternatively, a silica can be ES-70™ silica (PQ Corporation, Malvern, Pa.) that has been calcined at 875° C.

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time from about 0.5 hours to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the support material is first contacted with the catalyst compound for a period of time of from about 0.5 hours to about 24 hours, from about 2 hours to about 16 hours, or from about 4 hours to about 8 hours. The slurry of the supported catalyst compound is then contacted with the activator solution.

The mixture of the catalyst compound, activator and support is heated to about 0° C. to about 70° C., such as about 23° C. to about 60° C., such as at room temperature. Contact times may be from about 0.5 hours to about 24 hours, from about 2 hours to about 16 hours, or from about 4 hours to about 8 hours.

Suitable non-polar solvents are materials in which all of the reactants used herein, i.e., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In at least one embodiment, the support material includes a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or combination(s) thereof.

The electron-withdrawing component used to treat the support material can be a component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or combination(s) thereof, in at least one embodiment. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can include, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, these activator-supports can optionally be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, $H^+$, $[H(OEt_2)_2]^+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, such as a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

The present disclosure relates to polymerization processes where monomer (such as propylene), and optionally comonomer, are contacted with a catalyst system comprising an activator and at least one catalyst compound, as described above. The catalyst compound and activator may be combined in any order, and are combined prior to contacting with the monomer.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced at up to 10 wt %, such as at 0.00001 wt % to 1 wt %, such as 0.002 wt % to 0.5 wt %, such as 0.003 wt % to 0.2 wt %, based upon the total weight of the composition. In at least one embodiment, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

Diolefin monomers include any suitable hydrocarbon structure, such as $C_4$ to $C_{30}$, having at least two unsaturated bonds, where at least two of the unsaturated bonds are readily incorporated into a polymer by either a stereospecific or a non-stereospecific catalyst(s). The diolefin monomers can be selected from alpha, omega-diene monomers (i.e., di-vinyl monomers). The diolefin monomers can be linear di-vinyl monomers, such as those containing from 4 to 30 carbon atoms. Dienes can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, for example dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes can include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. (A homogeneous polymerization process is a process where at least 90 wt % of the product is soluble in the reaction media.) A bulk homogeneous process can be used. (A bulk process is a process where monomer concentration in all feeds to the reactor is 70 volume % or more.) Alternately, no solvent or diluent is present or added in the reaction medium, (except for the small amounts used as the carrier for the catalyst system or other additives, or amounts found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and/or pressure suitable to obtain the desired ethylene polymers. Suitable temperatures and/or pressures include a temperature of from about 0° C. to about 300° C., such as about 20° C. to about 200° C., such as about 35° C. to about 150° C., such as from about 40° C. to about 120° C., such as from about 45° C. to about 80° C.; and at a pressure of from about 0.35 MPa to about 10 MPa, such as from about 0.45 MPa to about 6 MPa, such as from about 0.5 MPa to about 4 MPa, such as from about 0.55 MPa to about 3 MPa, such as from about 0.60 MPa to about 2 MPa, such as from about 0.65 MPa to about 1 MPa (such as from about 0.95 psig to about 145 psig).

In a suitable polymerization, the run time of the reaction is up to 300 minutes, such as from about 5 minutes to 250 minutes, such as from about 10 minutes to 120 minutes, such as from about 20 minutes to 90 minutes, such as from about 30 minutes to 60 minutes.

In at least one embodiment, hydrogen is present in the polymerization reactor at a partial pressure of from 0.001 psig to 50 psig (0.007 to 345 kPa), such as from 0.01 psig to 25 psig (0.07 kPa to 172 kPa), such as 0.1 psig to 10 psig (0.7 kPa to 70 kPa).

In at least one embodiment, the activity of the catalyst is about 150 g/mmol/hr or higher, such as from about 150 g/mmol/hr to about 1,500 g/mmol/hr, such as from about 200 g/mmol/hr to about 1,200 g/mmol/hr, such as from about 300 g/mmol/hr to about 1,000 g/mmol/hr, such as from about 500 g/mmol/hr to about 1,000 g/mmol/hr.

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 45 to 80° C.); 2) is conducted at a pressure of atmospheric pressure to 10 MPa (such as 0.35 to 10 MPa, such as from 0.45 to 6 MPa, such as from 0.5 to 4 MPa, such as from 0.65 to 1 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents), such as isohexane; 4) where the catalyst system used in the polymerization includes less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) the activity of the catalyst compound is at least 200 g/mmol/hr (such as at least 250 g/mmol/hr, such as at least 300 g/mmol/hr); 7) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 8) optionally, hydrogen is present in the polymerization reactor at a partial pressure of 0.001 to 50 psig (0.007 to 345 kPa) (such as from 0.01 to 25 psig (0.07 to 172 kPa), such as 0.1 to 10 psig (0.7 to 70 kPa)). In at least one embodiment, the catalyst system used in the polymerization includes no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, such as one or more scavengers, promoters, modifiers, chain transfer agents (such as diethyl zinc), reducing agents, oxidizing agents, hydrogen, aluminum alkyls, or silanes.

Chain transfer agents include alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl, octyl or an isomer thereof), or a combination thereof, such as diethyl zinc, methylalumoxane, trimethylaluminum, triisobutylaluminum, trioctylaluminum, or a combination thereof.

Solution Polymerization

A solution polymerization is a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are not turbid as described in Oliveira, J. Vladimir et al. (2000) *Ind. Eng, Chem. Res.*, v.29, pg. 4627. Solution polymerization may involve polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. Suitable processes can operate at temperatures from about 0° C. to about 250° C., such as from about 50° C. to about 170° C., such as from about 80° C. to about 150° C., such as from about 100° C. to about 140° C., and or at pressures of about 0.1 MPa or more, such as 2 MPa or more. The upper pressure limit is not critically constrained but can be about 200 MPa or less, such as 120 MPa or less, such as 30 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

A process described herein can be a solution polymerization process that may be performed in a batchwise fashion (e.g., batch; semi-batch) or in a continuous process. Suitable reactors may include tank, loop, and tube designs. In at least one embodiment, the process is performed in a continuous fashion and dual loop reactors in a series configuration are used. In at least one embodiment, the process is performed in a continuous fashion and dual continuous stirred-tank reactors (CSTRs) in a series configuration are used. Furthermore, the process can be performed in a continuous fashion and a tube reactor can be used. In another embodiment, the process is performed in a continuous fashion and one loop reactor and one CSTR are used in a series configuration. The process can also be performed in a batchwise fashion and a single stirred tank reactor can be used.

Polyolefin Products

This present disclosure relates to compositions of matter produced by the methods described.

In at least one embodiment, a process described produces $C_2$ to $C_{20}$ olefin homopolymers or copolymers, such as ethylene-octene, ethylene-propylene and/or propylene-alpha-olefin (such as $C_2$ or $C_4$ to $C_{20}$) copolymers (such as propylene-hexene copolymers or propylene-octene copolymers) having low comonomer incorporation (such as $C_6$ wt %) and/or broad (e.g., greater than 1.5) molecular weight distribution (Mw/Mn).

In at least one embodiment, the process for the production of an ethylene alpha-olefin copolymer includes: polymerizing ethylene and at least one $C_3$-$C_{20}$ alpha-olefin by contacting the ethylene and the at least one $C_3$-$C_{20}$ alpha-olefin with a catalyst system as described above in at least one solution polymerization reactor at a reactor pressure of from 2 MPa to 200 MPa and a reactor temperature of from 10° C. to 250° C. to form an ethylene alpha-olefin copolymer.

In at least one embodiment, the polymer (such as an ethylene alpha-olefin copolymer) with an Mw value of 500,000 g/mol or greater. In at least one embodiment, the polymer has an Mw value from 500,000 g/mol to 8,000,000 g/mol, such as from 1,000,000 g/mol to 8,000,000 g/mol, such as from 1,500,000 g/mol to 3,000,000 g/mol, alternatively from 5,000,000 g/mol to 6,000,000 g/mol.

In at least one embodiment, the polymer (such as an ethylene alpha-olefin copolymer) with a Mn value of 100,000 g/mol or greater. In at least one embodiment, the polymer has an Mn value from 100,000 g/mol to 3,000,000 g/mol, such as from 300,000 g/mol to 700,000 g/mol, alternatively from 2,000,000 g/mol to 3,000,000 g/mol, alternatively from 1,000,000 g/mol to 1,800,000 g/mol, such as 1,000,000 g/mol to 1,300,000 g/mol.

In at least one embodiment, the polymer (such as an ethylene alpha-olefin copolymer) with a Mz value of 3,000,000 g/mol or greater. In at least one embodiment, the polymer has an Mz value from 3,000,000 g/mol to 8,000,000 g/mol, such as from 5,000,000 g/mol to 8,000,000 g/mol, such as from 5,000,000 g/mol to 6,000,000 g/mol, alternatively from 6,000,000 g/mol to 7,000,000 g/mol.

In at least one embodiment, the polymer has an Mw/Mn value of 10 or less, such as 5 or less, such as from 1 to 6, alternatively from 1.5 to 5, alternatively from 2 to 4, such as from 2 to 3.

In at least one embodiment, the polymer has a comonomer content of from 1 wt % to 8 wt %, such as from 2 wt % to 6 wt %, such as from 2 wt % to 4 wt %.

In at least one embodiment, a polymer produced has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In some embodiments, the polymer has a melting temperature (Tm) of 120° C. to 140° C., such as 130° C. to 140° C., such as 134° C. to 137° C., alternatively 122° C. to 128° C. as determined by differential scanning calorimetry.

Differential Scanning Calorimetry (DSC)

Melting Temperature, Tm, is measured by differential scanning calorimetry ("DSC") using a DSCQ200 unit. The sample is first equilibrated at 25° C. and subsequently heated to 220° C. using a heating rate of 10° C./min (first heat). The sample is held at 220° C. for 3 min. The sample is subsequently cooled down to −100° C. with a constant cooling rate of 10° C./min (first cool). The sample is equilibrated at −100° C. before being heated to 220° C. at a constant heating rate of 10° C./min. (second heat). The exothermic peak of crystallization (first cool) is analyzed using the TA Universal Analysis software and the corresponding to 10° C./min. cooling rate is determined. The endothermic peak of melting (second heat) is also analyzed using the TA Universal Analysis software and the peak melting temperature (Tm) corresponding to 10° C./min. heating rate is determined. In the event of conflict between the above DSC Procedure and the Rapid-DSC procedure below, the above DSC procedure is used.

Gel Permeation Chromotography (GPC 4-D)

Unless otherwise indicated, the distribution and the moments of molecular weight (Mw, Mn, Mz, Mw/Mn, etc.), the comonomer content and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 $cm^{-1}$ to about 3,000 $cm^{-1}$ (representing saturated C—H stretching vibration), an 18-angle light scattering detector and a viscometer. Three Agilent PLgel 10-μm Mixed-B LS columns are used to provide polymer separation. Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 μL. The whole system including transfer lines, columns, and detectors can be contained in an oven maintained at ~145° C. A given amount of sample can be weighed and sealed in a standard vial with ~10 μL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IR5 broadband signal, I, using the equation: $c=\alpha I$, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1} \log M_{PS}$$

where the variables with subscript "PS" stand for polystyrene while those without a subscript are for the test samples. In this method, $\alpha_{PS}=0.67$ and $K_{PS}=0.000175$, $\alpha$ and K for other materials are as calculated by GPC ONE™ 2019f software (Polymer Characterization, S.A., Valencia, Spain). Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3/1000$ TC) as a function of molecular weight. The short-chain branch (SCB) content per 1000 TC (SCB/1000 TC) is then computed as a function of molecular weight by applying a chain-end correction to the $CH_3/1000$ TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

w2=f*SCB/1000 TC.

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000 TC as a function of molecular weight, is applied to obtain the bulk CH3/1000 TC. A bulk methyl chain ends per 1000 TC (bulk CH3end/1000 TC) is obtained by weight-averaging the chain-end correction over the molecular-weight range. Then w2b=f*bulk CH3/1000 TC bulk SCB/1000 TC=bulk CH3/1000 TC−bulk CH3end/1000 TC and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, (dn/dc) is the refractive index increment for the system, n=1.500 for TCB at 145° C., and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[])$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and α for the reference linear polymers are calculated by GPC ONE™ 2019f software (Polymer Characterization, S.A., Valencia, Spain). Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

In at least one embodiment the polymer produced has a composition distribution breadth index (CDBI) of 50% or more, such as 60% or more, such as 70% or more. CDBI is a measure of the composition distribution of monomer within the polymer chains and is measured by the procedure described in PCT publication WO 1993/003093, published Feb. 18, 1993, specifically columns 7 and 8 as well as in Wild et al, *J. Poly. Sci., Poly. Phys. Ed.*, v.20, p. 441 (1982)

and U.S. Pat. No. 5,008,204, including that fractions having a weight average molecular weight (Mw) below 15,000 g/mol are ignored when determining CDBI.

Blends

In another embodiment, the polymer (such as the polyethylene or polypropylene) produced is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 wt % to 90 wt %, such as at least 50 wt % to 90 wt %, such as at least 60 to 90 wt %, such as at least 70 wt % to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

Polymers of the present disclosure, such as the foregoing polyethylenes or blends thereof, may be used in a variety of end-use applications. Such applications include, for example, mono- or multi-layer blown, extruded, and/or shrink films. These films may be formed by any suitable extrusion or coextrusion technique, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. The films can be oriented in the Machine Direction (MD) at a ratio of up to 15, such as from 5 to 7, and in the Transverse Direction (TD) at a ratio of up to 15, such as from 7 to 9. However, in another embodiment, the film is oriented to the same extent in both the MD and TD directions.

The films may vary in thickness depending on the intended application; however, films of a thickness from 1 µm to 50 µm are usually suitable. Films intended for packaging are usually from 10 µm to 50 µm thick. The thickness of the sealing layer may be from 0.2 µm to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

This invention further relates to:

1. A catalyst compound represented by Formula I(a), I(b) or I(c):

Formula I(a)

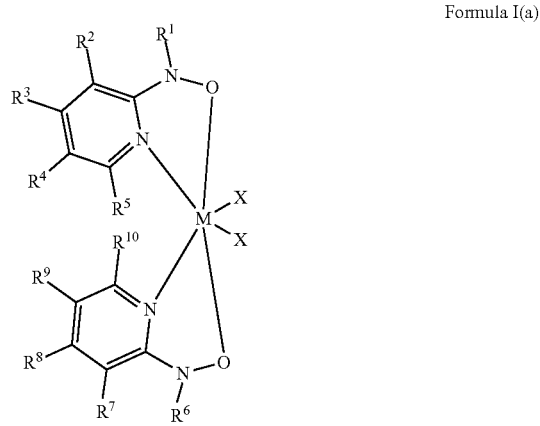

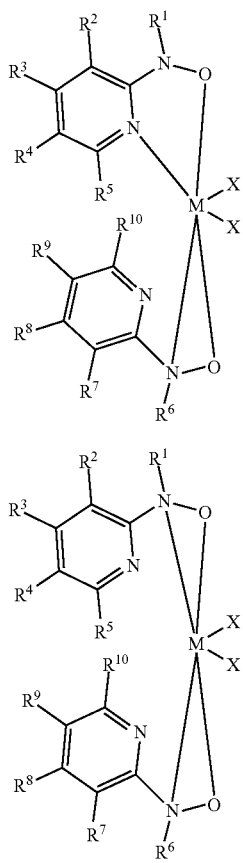

Formula I(b)

Formula I(c)

wherein:
M is a group 3, 4, 5, 6, 7, 8, 9, 10, 11, or 12 metal, such as a group 4 metal;
$R^1$ and $R^6$ are independently selected from the group consisting of hydrocarbyl and silyl groups;
$R^2$, $R^3$, $R^4$, $R^5$, $R^7$, $R^8$, $R^9$, $R^{10}$, $R^{11}$ and $R^{12}$ are independently selected from the group consisting of hydrogen, hydrocarbyl, alkoxy, silyl, amino, aryloxy, halogen and phosphino; wherein any two adjacent R groups may be joined to form a saturated or unsaturated hydrocarbyl or heterocyclic ring, wherein the ring has 5, 6, 7, or 8 ring atoms and wherein substitutions on the ring can join to form additional rings; and
each X is independently an anionic leaving group; wherein any two adjacent X groups may be joined together to form a dianionic group.

2. The catalyst compound of paragraph 1, wherein M of Formula I(a), I(b) or I(c) is Ti, Zr, or Hf.

3. The catalyst compound of paragraph 1 or 2, wherein $R^1$ and $R^6$ of Formula I(a), I(b) or I(c) are independently selected from the group consisting of alkyl, cycloalkyl and aryl.

4. The catalyst compound of any of paragraphs 1 to 3, wherein $R^1$ and $R^6$ of Formula I(a), I(b) or I(c) are independently selected from the group consisting of alkyl and aryl.

5. The catalyst compound of any of paragraphs 1 to 4, wherein $R^1$ and $R^6$ of Formula I(a), I(b) or I(c) are independently selected from the group consisting of t-butyl, 3,5-dimethylphenyl, 2,3,4,5,6-pentamethylphenyl, and 2,4,6-triisopropylphenyl.

6. The catalyst compound of any of paragraphs 1 to 5, wherein $R^2$, $R^3$, $R^4$, $R^5$, $R^7$, $R^8$, $R^9$, and $R^{10}$ of Formula I(a), I(b) or I(c) are independently selected from the group consisting of hydrogen, alkyl, aryl, cycloalkyl, alkoxy and cycloalkoxy.

7. The catalyst compound of any of paragraphs 1 to 6, wherein $R^2$, $R^3$, $R^4$, $R^5$, $R^7$, $R^8$, $R^9$, and $R^{10}$ of Formula I(a), I(b) or I(c) are independently selected from the group consisting of hydrogen, methyl, t-butyl, phenyl, 1-methylphenyl, t-butoxy, 3,5-dimethylphenyl, 2,3,4,5,6-pentamethylphenyl and 2,4,6-triisopropylphenyl.

8. The catalyst compound of paragraph 1, wherein the catalyst compound is selected from the group consisting of the structures 1 to 78 shown in the Transition Metal Complexes section above.

9. A catalyst system comprising an activator and a catalyst compound of any of paragraphs 1-8.

10. The catalyst system of paragraph 9, further comprising a support material optionally selected from $Al_2O_3$, $ZrO_2$, $SiO_2$, $SiO_2/Al_2O_3$, $SiO_2/TiO_2$, silica clay, silicon oxide/clay, or mixtures thereof.

11. The catalyst system of paragraph 9 or 10, wherein the activator comprises an alkylalumoxane or a non-coordinating anion.

12. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of any of paragraphs 9 to 11 in at least one polymerization reactor at a reactor pressure of from 2 MPa to 200 MPa and a reactor temperature of from 10° C. to 250° C. to form an ethylene alpha-olefin copolymer.

13. The process of paragraph 12, wherein the ethylene alpha-olefin copolymer has an Mw value of 1,000,000 g/mol or greater, such as from 1,000,000 g/mol to 8,000,000 g/mol.

14. The process of paragraph 12 or 13, wherein the ethylene alpha-olefin copolymer has an Mw/Mn value of 4 or less, such as from 1 to 2.

15. The process of any of paragraphs 12 to 14, wherein the ethylene alpha-olefin copolymer has a comonomer content of from 1 wt % to 8 wt %.

EXAMPLES

General considerations: All reagents were purchased from commercial vendors (such as Aldrich and Strem). Solvents were sparged with $N^2$ and dried over 3 Å molecular sieves. All chemical manipulations were performed in a nitrogen environment unless otherwise stated. Flash column chromatography was carried out with Sigma Aldrich Silica gel 60 Å (70-230 Mesh) using solvent systems specified.

Unless otherwise stated, materials were handled using standard glovebox and Schlenk techniques. All potentially air-sensitive materials were manipulated under dry dinitrogen. Reagent grade starting materials were purchased from commercial venders and used as received or purified according to standard procedures. Anhydrous solvents were purchased from commercial sources and stored over activated 3 Å molecular sieves following standard procedures for drying and degassing. NMR data were recorded on Bruker 400 MHz and 500 MHz NMR Spectrometers. $^1H$ and $^{13}C\{^1H\}$ chemical shifts are reported in ppm relative to $SiMe_4$ ($^1H$ and $^{13}C\{^1H\}$ δ=0.0 ppm) using residual protio resonances.

ATR-FTIR data were recorded on a Bruker Alpha IR instrument using a single-bounce Diamond ATR crystal. Solution FTIR data were recorded on a Bruker Tensor 27 IR instrument using an air-free solution cell equipped with KBr windows.

Synthesis of the Pyridyl Hydroxyl Amino Compounds

Hydroxyl amino compounds were prepared conveniently by a one-pot protocol.

Alternatively, a two-step procedure can be utilized. The two-step protocol generates the desired product by protonation of a lithium hydroxy aminato salt which is isolated as intermediate. The one-pot protocol is generally higher yielding and more expedient. The two-step protocol provides an anhydrous route to the desired product and can be advantageous when the air-stability or the intermediacy of aminoxyl intermediates is expected to be of concern. The lithium hydroxyl aminato moieties are isolated optionally.

Example 1

Synthesis of N-(tert-butyl)-N-(6-phenylpyridin-2-yl)hydroxylamine

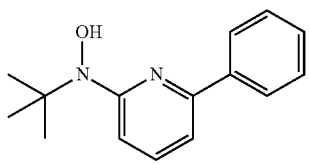 [SMILES: CC(C)(C)N(O)c1cccc(-c2ccccc2)n1]

In a 100 mL flask equipped with PTFE-coated magnetic stir bar, a THF (75 mL) solution of 2-bromopyridine (1.00 g, 4.27 mmol) was cooled to −30° C. To this mixture a 2.7 M hexane solution of n-butyl lithium (1.6 mL, 1.00 equiv) was added via syringe. The resulting mixture was allowed to react for 2 hours at −30° C. A −30° C. THF solution (15 mL) of 2-methyl-nitrosopropane dimer (0.375 g, 2.15 mmol, 0.504 equiv.) was added in one-portion and the mixture allowed to react 1 hour. The solution was then warmed to room-temperature (20-25° C.) and concentrated to a solid residue under reduced pressure. The resulting solid suspended in pentane (10 mL) and re-concentrated to a solid. This was repeated 3×. The mixture was then suspending in a 50/50 (v/v) solution of pentane in Et$_2$O and cooled to −45° C. where it was cold-filtered to afford the lithium hydroxyl aminato intermediate as a colorless solid. Yield: 0.230 g, 0.927 mmol, 21.7%. $^1$H NMR (400.1 MHz, benzene-d$_6$, 20° C.): δ=8.12 (d, 2H, J=8 Hz, o-Ph), 7.35 (app t, 2H, m-Ph, J 8 Hz, J 8 Hz), 7.18 (t, 1H, p-Ph), 6.92 (m, 1H, p-Py), 6.70 (m, 1H, m-Py), 6.58 (d, 1H, m-Py), 1.10 (s, 9H, t-Bu) ppm.

In a flask equipped with PTFE-coated stirbar, the lithium salt (0.220 g, 0.886 mmol) was dissolved in benzene (10 mL) and combined with a benzene suspension (10 mL) of trimethylammonium chloride. The resulting mixture was allowed to react 1 hour. It was then concentrated to a solid residue. The residue was re-dissolved in benzene and filtered through Celite. The filtrate was concentrated to a colorless solid under reduced pressure to afford the desired product. Yield: 0.110 g, 0.454 mmol. 51.2%. $^1$H NMR (400.1 MHz, benzene-d$_6$, 20° C.): δ=7.96 (d, 2H, J=8 Hz, o-Ph), 7.73 (s, 1H, NOH), 7.25-7.21 (m, 2H, Ph), 7.17-7.13 (m, 2H, Py), 7.06-7.01 (m, 2H), 1.35 (s, 9H t-Bu) ppm. $^{13}$C{$^1$H} NMR (120.2 MHz, benzene-d$_6$, 20° C.): δ=162.8, 154.6, 139.5, 137.7, 129.1, 129.0, 127.2, 115.0 (two peaks), 72.2, 27.1 ppm. ATR-IR (powder): ν$_{OH}$=3206 (b.s), also 3084 (s), 2982 (s), 2962 (m), 2931 (m), 2869 (m), 1567 (vs), 1440 (vs), 1359 (m), 1262 (w), 1210 (s), 1179 (w), 1162 (w), 1026 (w), 960 (w), 933 (w), 826 (s), 746 (s), 698 (s), 621 (w), 561 (w), 525 (w) cm$^{-1}$. Supplemental spectroscopic data: $^1$H NMR (400.1 MHz, chloroform-d$_3$, 20° C.): δ=7.97 (d, 2H, J=8 Hz, o-Ph), 7.95 (s 1H, NOH), 7.67 (t, 1H, J=8 Hz, p-Py), 7.49-7.40 (m, 4H), 7.07 (d, 1H, Py), 1.31 (s, 9H, t-Bu) ppm. $^{13}$C{$^1$H} NMR (120.2 MHz, chloroform-d$_3$, 20° C.): δ=161.1, 154.3, 138.7, 137.7, 129.2, 128.8, 126.9, 116.0, 115.98, 62.1, 26.8 ppm.

Example 2

Synthesis of N-(tert-butyl)-N-(6-(o-tolyl)pyridin-2-yl)hydroxylamine

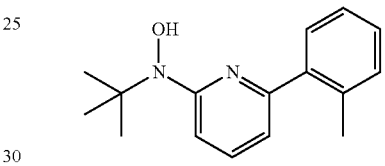

In a 100 mL flask equipped with PTFE coated magnetic stirbar, a hexane solution of n-butyl lithium solution (3.40 mL, 8.81 mmol, 2.59 M, 1.1 equiv.) was added slowly dropwise over 15 minutes to a −40° C. THF (60 mL) solution of 2-bromo-6-(o-tolyl)pyridine (2.00 g, 8.06 mmol). The reaction was then allowed to stir at −40° C. for 45 minutes. Then a −40° C., THF (20 mL) solution of 2-methyl-2-nitrosopropane dimer (2.80 g, 17.6 mmol, 2 equiv.) is added in one portion. This mixture was stirred until the reaction showed a color change from red/orange to dark green (approx. 2 hours). The reaction mixture was then concentrated under vacuum (~200 mTorr) to a yellow-colored residue. This residue was removed from the glove box and partitioned between in 100 mL of dichloromethane and 100 mL of DI water. The organics were washed (3×) with deionized water (50 mL) and then dried over magnesium sulfate. The solution was filtered and the filtrate concentrated under reduced pressure to give dark red solids. These solids were dissolved in a minimal volume of pentane (~10 mL) and placed in the freezer at −40° C. recrystallize. Two crops of colorless crystals were obtained from the mother liquor. Yield: 1.20 g, 4.68 mmol, 58.1%. $^1$H NMR (400.1 MHz, benzene-d$_6$, 20° C.): δ=7.69 (s, 1H, NOH), 7.36 (dd, 1H, J=7 Hz, 2 Hz), 7.13-7.03 (m, 4H), 6.83 (d, J=7 Hz, 1H), 6.73 (d, 1H, J=8 Hz), 2.29 (s, 3H, o-Tol), 1.29 (s, 9H, t-Bu) ppm. $^{13}$C{$^1$H} NMR (120.2 MHz, benzene-d$_6$, 20° C.): δ=161.5, 157.4, 140.5, 136.9, 136.1, 131.2, 130.1, 128.5 126.2, 118.8, 114.8, 62.0 (t-Bu), 27.1 (t-Bu), 20.7 (o-tol CH$_3$) ppm.

Example 3

Synthesis of N-(tert-butyl)-N-(6-mesitylpyridin-2-yl)hydroxylamine

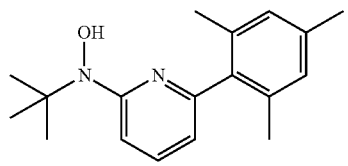 [SMILES: Cc1cc(C)c(-c2cccc(N(O)C(C)(C)C)n2)c(C)c1]

In a 100 mL flask equipped with PTFE-coated magnetic stir bar, a THF (50 mL) solution 2-bromo-6-mesityl-pyridine (1.50 g, 5.43 mmol) was cooled to −30° C. To this mixture a 2.7 M hexane solution of n-butyl lithium (2.1 mL, 0.815 mmol, 1 equiv.) was added via syringe over 15 minutes. The resulting mixture was allowed to react for at −30° C. for 2 hours where the solution gradually turned from colorless to dark red. A −30° C. THF solution (15 mL) of 2-methyl-nitrosopropane dimer (0.421 g, 2.42 mmol, 0.55 equiv.) was added in one-portion and the mixture allowed to react 1 hour. The solution was then warmed to room-temperature (20-25° C.) and concentrated to a solid residue under reduced pressure. The resulting solids were suspended in pentane (~50 mL) stirred for 30 minutes and then filtered. This particular pyridyl hydroxyaminato salt exhibits high solubility in pentane. The pentane filtrate concentrated to a solid and the used without further purification.

In a flask equipped with PTFE-coated stirbar, the lithium hydroxyaminato salt (5.43 mmol) was combined with benzene (100 mL) and trimethylammonium chloride (0.500 g, 5.43 mmol, 1 equiv.) and allowed to react for 16 hours. It was then concentrated to a solid tan-colored residue. The residue was re-dissolved in pentane (100 mL) and filtered through Celite. The filtrate was concentrated to a volume of −20 mL and allowed to stand at −35° C. for 2 hours. While still cold, mixture was then filtered. The colorless solids were washed with additional portions of cold pentane (3×2 mL). The solids were then dried under reduced pressure. Yield: 0.200 g, 0.74 mmol, 13.6%. $^1$H NMR (400.1 MHz, benzene-d$_6$, 20° C.): δ=7.83 (s, 1H, NOH), 7.08 (t, 1H, J=8 Hz, p-Py), 6.86 (d, 1H, J=8 Hz, m-Py), 6.82 (s, 2H, m-Mes), 6.55 (d, 1H, m-Py), 2.18 (s, 3H, p-Mes), 2.04 (s, 6H, o-Mes), 1.29 (s, 9H, t-Bu) ppm. $^{13}$C{$^1$H} NMR (120.2 MHz, benzene-d$_6$, 20° C.): δ=162.1, 157.3, 138.1, 137.4, 136.9, 135.8, 128.7, 119.6, 114.8, 62.0 (t-Bu), 27.1 (t-Bu), 21.1 (p-Mes), 20.4 (o-Mes) ppm.

Example 4

Synthesis of N-(tert-butyl)-N-(6-(3,5-dimethylphenyl)pyridin-2-yl)hydroxylamine

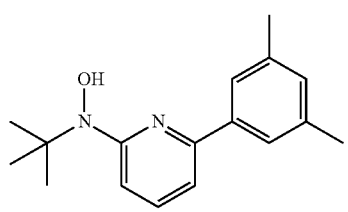 [SMILES: Cc1cc(C)cc(-c2cccc(N(O)C(C)(C)C)n2)c1]

In a 250 mL flask equipped with PTFE-coated magnetic stir bar, a THF (130 mL) solution 2-bromo-6-(3,5-dimethylphenyl)-pyridine (3.00 g, 11.44 mmol) was cooled to −30° C. DME (5 mL) was added. To this mixture a 2.7 M hexane solution of n-butyl lithium (4.3 mL, 11.44 mmol, 1 equiv.) was added via syringe over 15 minutes. The resulting mixture was allowed to react at −30° C. for 2 hours where the solution gradually turned from colorless to dark red. A −30° C. THF solution (15 mL) of 2-methyl-2-nitrosopropane dimer (1.20 g, 6.89 mmol, 0.60 equiv.) was added in one-portion and the mixture allowed to react 1 hour. The solution was then warmed to room-temperature (20-25° C.) and concentrated to a solid residue under reduced pressure. The resulting solids were suspended in pentane (~50 mL) stirred for 30 minutes and then filtered to afford product as a yellow filter cake which was dried under reduced pressure. Yield: 1.8 g, 6.5 mmol, 59.9%. $^1$H NMR (400 Mhz, THF-d$_8$, 20° C.) δ=7.64 (s, 2H, o-Ar), 7.17 (dd, 1H, p-Ph), 6.93 (s, 1H, p-Ar), 6.69 d (d, 1H, m-Py), (d 1H, 6.51 m-Py), 2.38 (s, 6H, m-Ar—CH$_3$), 1.42 (s, 9H, t-Bu) ppm.

In a flask equipped with PTFE-coated stir bar, the lithium hydroxyaminato salt (1.30 g, 4.71 mmol) was combined with benzene (100 mL) and trimethylammonium chloride (0.600 g, 4.71 mmol, 1 equiv) and allowed to react for 16 hours. The solution was then filtered through Celite. The filtrate was concentrated solid residue where it was then dissolved in pentane (100 mL) and filtered. The resulting filtrate was concentrated to a solid. The solid was washed with portions of cold (−30° C.) pentane (2-4 washes) and dried under reduced pressure. Yield: 0.630 g, 2.33 mmol 49.5%. $^1$H NMR (400.1 MHz, benzene-d$_6$, 20° C.) δ=7.66 (s, 2H, o-Ar), 7.54 (br s, 1H, NOH), 7.12 (m, 1H, p-Py), 7.06 (d, 1H, J=8 Hz, m-Py), 6.91 (d, 1H, J=8 Hz, m-Py), 6.85 (s, 1H, p-Ar), 2.18 (s, 6H, m-Ar—CH$_3$), 1.36 (s, 9H, t-Bu) ppm. $^{13}$C{$^1$H} NMR (120.2 MHz, benzene-d$_6$, 20° C.): δ=162.7, 155.1, 139.6, 138.2, 137.6, 130.9, 125.3, 115.3, 114.97, 62.0 (t-Bu), 27.2 (t-Bu), 21.5 (Ar-Me) ppm.

Example 5

Synthesis of N-(tert-butyl)-N-(6-(2,4,6-triisopropylphenyl)pyridin-2-yl)hydroxylamine

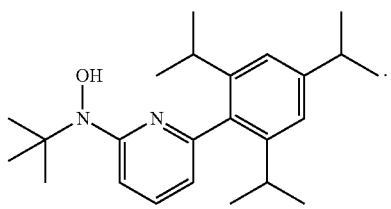 [SMILES: CC(C)c1cc(C(C)C)c(-c2cccc(N(O)C(C)(C)C)n2)c(C(C)C)c1]

In a 250 mL flask equipped with PTFE-coated stir bar, a THF (100 mL) solution 2-bromo-6-(2,4,6-triisopropylphenyl)-pyridine (1.00 g, 2.78 mmol) was cooled to −30° C. To this mixture a 2.8 M hexane solution of n-butyllithium (1.1 mL, 3.05 mmol, 1.1 equiv.) was added via syringe and the mixture was allowed to stir at −30° C. for 1 hour. Then, a −30° C. THF solution (20 mL) of 2-methyl-2-nitroso propane dimer (1.00 g, 5.74 mmol, 2 equiv.) was added. The solution was allowed to react for 3 hours. Solid trimethylammonium chloride (0.40 g, 4.16 mmol, 1.5 equiv.) was then added in one portion. The resulting mixture was allowed to react for 16 h before it was concentrated to a solid residue under reduced pressure. The residue was then dissolved in benzene (50 mL) and filtered through a medium porosity fritted funnel packed with Celite. The filtrate was concentrated to a solid under reduced pressure, suspended in pentane (30 mL) and filtered. The solids were dried and the product collected. Yield: 0.35 g, 0.94 mmol, 34.2%. $^1$H NMR (400.1 MHz, benzene-$d_6$, 20° C.): δ=7.88 (s, 1H, NOH), 7.20 (s, 2H, m-Ar), 7.06 (dd, 1H, J=8 Hz, p-Py), 6.82 (d, 1H, J=8 Hz, m-Py), 6.73 (d, 1H, J=8 Hz, m-Py), 2.86 (septet, 1H, p-iPr), 2.73 (septet, 2H, o-iPr), 1.29 (s, 9H, t-Bu), 1.27 (d, 6H, p-iPr CH$_3$), 1.18 (dd, 12H, o-iPr) ppm. $^{13}$C{$^1$H} NMR (120.2 MHz, benzene-$d_6$, 20° C.): δ=161.7, 157.4, 149.3, 141.7, 136.7, 121.0, 119.9, 114.9, 62.1, 35.0, 30.92, 27.0 (tBu, {24.7, 24.4, 24.2} (iPr CH$_3$) ppm.

Example 6

Synthesis of N-(6-(tert-butoxy)pyridin-2-yl)-N-(tert-butyl)hydroxylamine

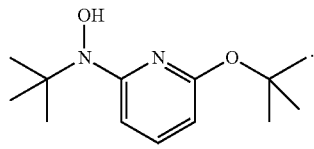 [SMILES: CC(C)(C)Oc1cccc(N(O)C(C)(C)C)n1]

In a flask equipped with PTFE-coated stir bar, a THF (60 mL) solution 2-bromo-6-(t-butoxy)-pyridine (1.00 g, 4.34 mmol) was cooled to −30° C. To this mixture a 2.7 M hexane solution of n-butyllithium (1.95 mL, 5.22 mmol, 1.2 equiv.) was added via syringe over 10 minutes and the mixture was allowed to react for 4 hours while warming to 0° C. A 0° C. THF solution (20 mL) of 2-methyl-2-nitroso propane dimer (0.45 g, 2.57 mmol, 0.59 equiv) was added. The solution was allowed to react for 16 hours at 0° C. The mixture was then concentrated to a solid residue under reduced pressure. It was then combined with benzene (50 mL) and trimethylammonium chloride (0.67 g, 7.00 mmol, 1.6 equiv). The resulting mixture was allowed to react for 6 hours before it was concentrated to a solid residue under reduced pressure. The residue was then combined with pentane (50 mL) and filtered through a medium porosity fritted funnel packed with Celite. The filtrate was concentrated to a solid under reduced pressure, suspended in a minimal amount of pentane (<15 mL) and filtered. The solids were dried and the product collected. Yield: 0.20 g, 0.84 mmol, 19.3% $^1$H NMR (400.1 MHz, benzene-$d_6$, 20° C.): δ=7.74 (s, 1H, NOH), 7.03 (t, 1H, J=8 Hz, p-Py), 6.76 (d, 1H, J=8 Hz, m-Py), 6.36 (d, 1H, J=8, m-Py), 1.54 (s, 9H, O-t-Bu), 1.25 (s, 9H, t-Bu) ppm. $^{13}$C{$^1$H} NMR (120.2 MHz, benzene-$d_6$, 20° C.) δ=162.1, 160.5, 139.2, 109.7, 108.8, 79.14 (0-C(CH$_3$)$_3$), 61.58 (t-Bu C(CH$_3$)$_3$), 29.01 (O-t-Bu), 26.8 (t-Bu) ppm.

Example 7

Synthesis of N-(tert-butyl)-N-(6-methylpyridin-2-yl)hydroxylamine

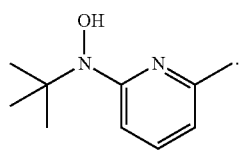

In a round bottom flask equipped with a PTFE coated magnetic stirbar, a THF solution of 2-bromo-6-methyl pyridine (2.00 g, 12.0 mmol, 80 mL, 1.0 equiv.) was cooled to −30° C. A hexane solution of n-butyl lithium (2.68 M, 4.8 mL, 1.1 equiv) was added dropwise over 15 minutes. The resulting mixture was allowed to stir at −30° C. for 2 hours. A THF solution at 2-methyl-2-nitrosopropane dimer (1.20 g, 6.9 mmol, 20 mL, 0.59 equiv) was cooled to 0° C. then added. The resulting mixture was allowed to slowly warm to 20-23° C. where it was allowed to react for 16 hours. The resulting yellow/orange product mixture was concentrated to a solid residue. It was then stirred in pentane and filtered through a medium porosity fritted funnel. The orange filter cake was collected, dissolved in benzene (100 mL) and combined with trimethylammonium chloride (1.67 g, 17.0 mmol. 1.5 equiv). The resulting mixture was then filtered through a medium porosity fritted funnel packed with Celite. The resulting filtrate was concentrated to a semi-solid residue. The residue was suspended in −30° C. pentane and filtered the resulting filter-cake was washed with additional portions of −30° C. pentane (3×10 mL) to afford the pure product. Yield: 0.70 g, 4.0 mmol, 33.4% $^1$H (400.1 MHz, benzene-$d_6$, 20° C.): δ=8.30 (s, 1H, NOH), 6.95 (dd, 1H, J=8.3 Hz, 7.3 Hz), 6.76 (d, 1H, J=8.3 Hz), 6.34 (d, 1H, J=7.3 Hz), 2.21 (s, 3H, Me), 1.30 (s, 9H, t-Bu) ppm. $^{13}$C{$^1$H} NMR (120.2 MHz, benzene-$d_6$, 20° C.) δ=162.0, 155.4, 137.0, 117.8, 113.8, 61.8 (t-Bu), 27.1 (t-Bu), 23.9 (Me) ppm.

Example 8

Synthesis of N-mesityl-N-(6-methylpyridin-2-yl)hydroxylamine

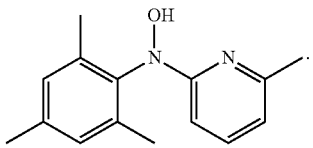

In a round-bottom flask equipped with PTFE coated magnetic stir bar, a THF solution of 2-bromo-6-methylpyridiene (3.02 g, 17.6 mmol, 60 mL) was cooled to −40° C. A hexane solution of n-butyl lithium (2.78 M, 6.95 mL, 1.1 equiv.) was added dropwise. The resulting mixture was allowed to stir at −20° C. for 2 hours. A THF solution at 2,4-6-nitrosobenzene dimer (2.62 g, 8.79 mmol, 60 mL, 0.50 equiv.) was cooled to −40° C. then added, dropwise to the reaction mixture. The resulting mixture was allowed to slowly warm to 20-23° C. where it was allowed to react for 4 hours. The resulting mixture was concentrated to a solid residue. It was then stirred in pentane (50 mL) and filtered through a medium porosity fritted funnel. The light brown filter cake was collected, and combined with benzene (100 mL) and with trimethylammonium chloride (2.5 g, 26.4 mmol. 1.5 equiv). This mixture was stirred for 2 hours at 20-23° C. The mixture was then concentrated to a solid residue, then extracted with pentane and filtered through Celite. The filtrate was concentrated to a solid to afford the desired product. Yield: 0.50 g, 2.1 mmol, 11.7%. $^1$H (400.1 MHz, benzene-$d_6$, 20° C.): δ=12.42 (s, 1H, NOH), 6.85 (app. t, 1H, J=7 Hz, p-Py), 6.78 (s, 2H, m-Mes), 6.15 (d, 1H, m-Py), 5.84 (d, 1H, m-Py), 2.19 (s, 6H, o-Mes), 2.17 (s, 3H, Me), 2.12 (s, 3H, p-Mes) ppm. $^{13}$C{$^1$H} NMR (120.2 MHz, benzene-d$_6$, 20° C.) δ=159.6, 156.9, 139.4, 138.2, 137.8, 137.7, 129.9, 112.9, 103.9, 23.4, 21.1, 18.1 ppm.

Synthesis of the Catalysts

Example 10

Synthesis of Bis(N-(tert-butyl)-N-(6-(o-tolyl)pyridin-2-yl)hydroxylaminato) Zirconium Dichloride A C$_6$H$_6$ solution (5 mL) of N-(tert-butyl)-N-(6-(o-tolyl)pyridin-2-yl)hydroxylamine (0.150 g, 0.585 mmol, 1 equiv.) was slowly added over 1 minute to a yellow C$_6$H$_6$ solution (10 mL) of ZrBz$_2$Cl$_2$(Et$_2$O) (0.122 g, 0.293 mmol, 0.5 equiv.). The resulting mixture was heated to 50° C. and allowed to react for 1.5 hours. It was then cooled to room temperature (20-25° C.) and concentrated to a solid under reduced pressure. The resulting solid was triturated in pentane (10 mL) for 20 minutes at room temperature then re-concentrated to a solid under reduced pressure. This solid was then suspended in additional pentane (10 mL) and filtered. The resulting orange filter cake was washed with additional pentane, then dried under reduced pressure. Yield: 0.118 g, 0.175 mmol. 60.0%. $^1$H NMR (400.1 MHz, benzene-d$_6$, 20° C.): δ=7.36 (br d, 1H, J=8 Hz, o-tol), 7.12 (d, 1H, J=8 Hz, m-tol), 7.07-7.02 (m, 2H, p-tol, m-tol), 6.77 (t, 1H, J=8 Hz, p-Py), 6.60 (d, 1H, J=8 Hz, m-Py), 6.27 (d, 1H, J=8 Hz, m-Py), 2.04 (s, 3H, o-tol CH$_3$), 1.32 (s, 9H, t-Bu) ppm. $^{13}$C{$^1$H}NMR (120.2 MHz, benzene-d$_6$, 20° C.): δ=161.9, 159.6, 139.1, 138.1, 136.6, 130.2, 129.6, 128.6, 125.3, 120.4, 112.5, 61.9, 28.0, 20.3 ppm.

Example 11

Synthesis of Bis(N-(tert-butyl)-N-(6-(2,4,6-triisopropylphenyl)pyridin-2-yl)hydroxylaminato) Zirconium Dichloride A C$_6$H$_6$ solution (5 mL) of (N-(tert-butyl)-N-(6-(2,4,6-triisopropylphenyl)pyridin-2-yl)hydroxylamine (0.118 g, 0.318 mmol, 2 equiv.) was slowly added over 1 minute to a yellow C$_6$H$_6$ solution (10 mL) of ZrBz$_2$Cl$_2$(Et$_2$O) (0.067 g, 0.159 mmol, 1 equiv.). The resulting mixture was heated to 50° C. and allowed to react for 1.5 hours. It was then cooled to room temperature and concentrated to a solid under reduced pressure. The resulting solid was triturated in pentane (10 mL) for 20 minutes at room temperature then re-concentrated to a solid under reduced pressure. This solid was then suspended in additional pentane (10 mL) and filtered. The resulting orange filter cake was washed with additional pentane, then dried under reduced pressure. Yield: 0.056 g, 0.062 mmol. 39.2%. $^1$H NMR (400.1 MHz, benzene-d$_6$, 20° C.): δ=7.23 (s, 2H, m-Tripp), 7.11 (s, 2H, m-Tripp), 6.92 (t, 2H, J=8 Hz, p-Py), 6.82-6.80 (m, 4H, m-Py), 2.93-2.81 (m, 4H, o-Tripp iPr), 2.67 (septet, 2H, p-Tripp iPr), 1.55 (m, 6H, iPr), 1.32 (m, 6H, iPr), 1.27 (s, 18H, t-Bu), 1.07-1.04 (br m, 24H, iPr) ppm.

Example 12

Synthesis of Bis(N-(tert-butyl)-N-(6-(2,4,6-trimethylphenyl)pyridin-2-yl)hydroxylaminato) Zirconium Dichloride In a scintillation vial kept in darkness at room temperature (20-23° C.), an Et$_2$O solution of N-(tert-butyl)-N-(6-(2,4,6-trimethylphenyl)pyridine-2-hydroxylamine (0.061 g, 0.216 mmol, 10 mL, 2 equiv.) was combined with an Et$_2$O solution of ZrBz$_2$Cl$_2$(Et$_2$O) (0.045 g, 0.108, 5 mL) and allowed to react for 18 hours. The mixture was then concentrated to a solid under nitrogen flow. The solid residue was then dried in vacuo. Yield: 0.075 g, 0.098 mmol, 91.4% $^1$H NMR (400.1 MHz, benzene-d$_6$, 20° C.) δ=7.42 (t, 2H, J=8 Hz, p-Py), 7.05 (d, 2H, J=8 Hz m-Py), 6.93 (s, 2H, m-Mes), 6.79 (s, 2H, m-Mes), 6.75 (d, 2H, J=8 Hz), 2.35 (s, 6H, o-Mes), 2.22 (s, 6H, o-Mes), 1.77 (s, 6H, p-Mes), 1.35 (s, 18H, t-Bu) ppm. Ligand dynamics are evident from inequivalent o-Mes groups.

Example 13

Synthesis of Bis(N-(tert-butyl)-N-(6-(3,5-dimethylphenyl)pyridin-2-yl)hydroxylaminato) Zirconium Dichloride A C$_6$H$_6$ solution (5 mL) of N-(tert-butyl)-N-(6-(3,5-dimethylphenyl)pyridin-2-yl)hydroxylamine (0.177 g, 0.655 mmol, 2 equiv.) was slowly added over 1 minute to a yellow C$_6$H$_6$ solution (10 mL) of ZrBz$_2$Cl$_2$(Et$_2$O) (0.137 g, 0.327 mmol, 1 equiv.). The resulting mixture was heated to 50° C. and allowed to react for 1.5 hours. It was then cooled to room temperature and concentrated to a solid under reduced pressure. The resulting solid was triturated in pentane (10 mL) for 20 minutes at room temperature then re-concentrated to a solid under reduced pressure. This solid was then suspended in additional pentane (10 mL) and filtered. The resulting orange filter cake was washed with additional pentane, then dried under reduced pressure. Yield: 0.153 g, 0.218 mmol, 66.7%. $^1$H NMR (400.1 MHz, benzene-d$_6$, 20° C.): δ=7.38 (s, 4H o-Ar), 6.82 (s, 2H, p-Ar), 6.72 (t, 2H, J=8 Hz, p-Py), 6.58 (d, 2H, J=8 Hz, m-Py), 6.41 (d, 2H, J=8 Hz, m-Py), 2.21 (s, 12H, m-Ar CH$_3$) 1.41 (s, 18H, t-Bu) ppm.

Example 14

Synthesis of Bis(N-(tert-butyl)-N-(6-(methyl)pyridin-2-yl)hydroxylaminato) Zirconium Dichloride A C$_6$H$_6$ solution of N-(tert-butyl)-N-(6-(methyl)pyridin-2-yl)hydroxylamine (0.248 g, 1.38 mmol, 2 equiv., 5 mL)) was slowly added to a stirred C$_6$H$_6$ solution of ZrBz$_2$Cl$_2$(Et$_2$O) (0.288 g, 0.688 mmol, 5 mL). The mixture was heated to 40° C. and allowed to react for 2.5 hours. The mixture was then concentrated to a solid residue. The residue was suspended in pentane to and filtered. The resulting yellow filter cake was washed with additional portions of pentane (5×3 mL) then dried under reduced pressure. Yield 0.172 g, 0.312 mmol, 45.4%. $^1$H NMR (400.1 MHz, benzene-d$_6$, 20° C.): δ=6.70 (t, 1H, J=8 Hz, p-Py), 6.57 (d, 1H, J=8 Hz, m-Py), 6.06 (d, 1H, J=8 Hz, m-Py), 2.71 (s, 3H, Me), 1.40 (s, 9H, t-Bu) ppm.

Example 15

Synthesis of Bis(N-(tert-butyl)-N-(6-(phenyl)pyridin-2-yl)hydroxylaminato) Zirconium Dichloride A C$_6$H$_6$ solution of N-(tert-butyl)-N-(6-(phenyl)pyridin-2-yl)hydroxylamine (0.228 g, 0.941 mmol, 2 equiv., 5 mL) was added to a stirred C$_6$H$_6$ solution of ZrBz$_2$Cl$_2$(Et$_2$O) (0.197 g, 0.471 mmol, 5 mL). The mixture was heated to 40° C. and allowed to react for 2.5 hours. The mixture was then concentrated to a solid residue. The residue was suspended in pentane to and filtered. The resulting yellow filter cake was washed with additional portions of pentane (5×3 mL) then dried under reduced pressure. Yield 0.160 g, 0.753 mmol, 80.0%. A mixture of isomers was obtained. $^1$H NMR (400.1 MHz, benzene-d$_6$, 20° C.): δ=7.88 (d), 7.69 (t), 7.55-7.50, 7.23-7.20 (m), 7.08 (d), 6.87 (d), 6.82-6.75 (m), 1.44 (s, t-Bu), 1.33 (s, t-Bu) ppm.

Example 16

Synthesis of Bis(N-(tert-butyl)-N-(6-(methyl)pyridin-2-yl)hydroxylaminato) Zirconium Dimethyl A Et$_2$O solution of (Bis(N-(tert-butyl)-N-(6-(methyl)pyridin-2-yl)hydroxylaminato) zirconium dichloride (0.024 g, 0.043 mmol, 10 mL) was cooled to −30° C. and allowed equilibrate for 10 minutes. A 1.6 M Et$_2$O solution of MeLi (0.092 mmol, 58 µL) was then added via syringe. The reaction mixture was allowed to react for 1 hour at −30° C. before it was warmed to 23° C. and concentrated to a solid under reduced pressure. $^1$H NMR (400.1 MHz, benzene-d$_6$, 20° C.): δ=6.76 (dd, 2H, J=8 Hz, p-Py), 6.63 (d, 2H, J=8 Hz, m-Py), 5.91 (d, 2H, J=8 Hz, m-Py), 2.37 (s, 6H, o-Me), 1.49 (s, 18H, t-Bu), 0.66 (s, 6H, Zr-Me) ppm.

General Procedure for Polymerization and Polymer Characterization (Table 1)

Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TNOAL (neat) was used.

Ethylene polymerization was carried out in a parallel, pressure reactor, as generally described in U.S. Pat. Nos. 6,306,658; 6,455,316; 6,489,168; WO 2000/009255; and Murphy et al. (2003) *J. Am. Chem. Soc.*, v.125, pp. 4306-4317 each of which is fully incorporated herein by reference to the extent not inconsistent with this specification. The following describes the procedure used to screen the catalysts shown in Table 1. The desired temperatures, pressures, quantities of chemicals used (e.g. precatalysts, activators, scavengers, chain transfer agents, etc.) will vary from experiment to experiment, and specific values are given in Table 1 where data are presented.

A pre-weighed glass vial insert and disposable stirring paddle were fitted to each reaction vessel of the reactor, which contains 48 individual reaction vessels. The reactor was then closed and each vessel was individually heated to the desired temperature and pressurized to a predetermined pressure (typically 120 psi). If the experiment was a copolymerization, the monomer, e.g. 1-octene, was then injected into each reaction vessel through a valve, followed by enough solvent (typically isohexane or toluene) to bring the total reaction volume, including the subsequent additions, to the desired volume (typically 5 mL). The contents of the vessel were then stirred at 800 rpm. A solution of scavenger (typically an organoaluminum reagent in isohexane or toluene) was then added along with additional solvent (typically 500 microliters). Where indicated, a solution of an additional scavenger or chain transfer agent was then added along with a solvent chaser (typically 500 microliters). An activator solution in toluene (typically 1 molar equivalent relative to the precatalyst complex) was then injected into the reaction vessel along with additional solvent (typically 500 microliters). Then a toluene solution of the precatalyst complex was added along with additional solvent (typically 500 microliters).

The reaction was then allowed to proceed until either a set amount of pressure had been taken up by the polymerization (typically 30 psi for reactions performed at 120 psi). Ethylene pressure was maintained in each reaction vessel at the pre-set level by computer control. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and Rapid-DSC to determine Tm.

$^1$H NMR data was collected at room temperature in a 5 mm probe using a Bruker spectrometer with a $^1$H frequency of at least 400 MHz. Data was recorded using a maximum pulse width of 45° C., 8 seconds between pulses and signal averaging 120 transients. NMR data were recorded on Bruker 400 MHz and 500 MHz NMR Spectrometers. $^1$H and $^{13}$C{1H} chemical shifts are reported in ppm relative to SiMe4 ($^1$H and $^{13}$C{1H} δ=0.0 ppm) using residual protio resonances. ATR-FTIR data were recorded on a Bruker Alpha IR instrument using a single-bounce Diamond ATR crystal. Solution FTIR data were recorded on a Bruker Tensor 27 IR instrument using an air-free solution cell equipped with KBr windows.

Gel Permeation Chromatography (Rapid-GPC)

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with IR4 detector and calibrated using polystyrene standards (Polymer Laboratories: Polystyrene Calibration Kit S-M-10: Mp (peak Mw) between 5,000 and 3,390,000). Samples (250 µL of a polymer solution in TCB were injected into the system) were run at an eluent flow rate of 2.0 mL/minute (135° C. sample temperatures, 165° C. oven/columns) using three Polymer Laboratories: PLgel 10 µm Mixed-B 300×7.5 mm columns in series. No column spreading corrections were employed. Numerical analyses were performed using Automation Studio software available from Freeslate. The molecular weights obtained are relative to linear polystyrene standards.

Differential Scanning Calorimetry (Rapid-DSC)

Rapid Differential Scanning Calorimetry ("Rapid DSC") measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

All molecular weights are reported in g/mol unless otherwise noted.

The results obtained for the polymerization using catalysts are illustrated in Table 1. Polymerizations were conducted in parallel polymerization reactors as generally described above. For the data presented in Table 1, polymerizations were allowed to run for 1 hour (3600 s) or until 50 PSIG of measured ethylene uptake occurred. Total liquid volume for each polymerization was 5 mL using isohexane as the solvent. Catalysts were introduced as toluene solutions (100 µL, 0.2 mmol/L) and were activated using 5 wt. % methylalumoxane in toluene (110 µL). Co-monomer, if present, was used in the quantities specified.

| Entry | Ex. | Temp (° C.) | Pressure (PSIG) | Yield (mg) | Reaction Time (s) | Activity (g/mmol h) | Mn (g/mol) | Mw (g/mol) | Mz (g/mol) | Mw/Mn | Tm (° C.) | Comonomer | Comonomer Micromoles |
|---|---|---|---|---|---|---|---|---|---|---|---|---|---|
| 1 | Ex. 10 | 70 | 200 | 23 | 3601 | 1150 | | | | | 136.1 | None | 0 |
| 2 | Ex. 10 | 70 | 200 | 28 | 3601 | 1400 | 580248 | 2495565 | 5568682 | 4.3 | 137.0 | None | 0 |
| 3 | Ex. 10 | 100 | 200 | 21 | 3600 | 1050 | 659365 | 2221137 | 5261268 | 3.4 | 136.5 | None | 0 |
| 4 | Ex. 10 | 100 | 200 | 22 | 3600 | 1100 | 340596 | 2200630 | 5924735 | 6.5 | 136.5 | None | 0 |
| 5 | Ex. 10 | 70 | 200 | 11 | 3601 | 550 | 667803 | 2651955 | 6598429 | 4.0 | 133.8 | 1-Hexene | 400 |
| 6 | Ex. 10 | 70 | 200 | 14 | 3600 | 700 | | | | | 132.3 | 1-Hexene | 400 |
| 7 | Ex. 10 | 100 | 200 | 10 | 3600 | 500 | 234029 | 1911820 | 6485586 | 8.2 | 130.4 | 1-Hexene | 400 |
| 8 | Ex. 10 | 100 | 200 | 10 | 3601 | 500 | 352367 | 1896008 | 5369824 | 5.4 | 132.6 | 1-Hexene | 400 |
| 9 | Ex. 10 | 70 | 200 | 1 | 3601 | 50 | | | | | | 1-Hexene | 1200 |
| 10 | Ex. 10 | 70 | 200 | 2 | 3601 | 100 | | | | | | 1-Hexene | 1200 |
| 11 | Ex. 10 | 100 | 200 | 3 | 3601 | 150 | | | | | | 1-Hexene | 1200 |
| 12 | Ex. 10 | 100 | 200 | 4 | 3601 | 200 | | | | | | 1-Hexene | 1200 |
| 13 | Ex. 13 | 70 | 200 | 1 | 739 | 244 | | | | | | None | 0 |
| 14 | Ex. 13 | 70 | 200 | 10 | 3601 | 500 | 994720 | 2698461 | 5541705 | 2.7 | 136.5 | None | 0 |
| 15 | Ex. 13 | 100 | 200 | 17 | 3600 | 850 | 770138 | 2339356 | 5408831 | 3.0 | 136.3 | None | 0 |
| 16 | Ex. 13 | 100 | 200 | 21 | 3601 | 1050 | 213201 | 1950153 | 5725044 | 9.1 | 135.4 | None | 0 |
| 17 | Ex. 13 | 70 | 200 | 4 | 3601 | 200 | | | | | | 1-Hexene | 400 |
| 18 | Ex. 13 | 70 | 200 | 5 | 3600 | 250 | | | | | | 1-Hexene | 400 |
| 19 | Ex. 13 | 100 | 200 | 6 | 3601 | 300 | | | | | | 1-Hexene | 400 |
| 20 | Ex. 13 | 100 | 200 | 7 | 3601 | 350 | | | | | | 1-Hexene | 400 |
| 21 | Ex. 13 | 70 | 200 | 0 | 1642 | 0 | | | | | | 1-Hexene | 1200 |
| 22 | Ex. 13 | 70 | 200 | 0 | 3601 | 0 | | | | | | 1-Hexene | 1200 |
| 23 | Ex. 13 | 100 | 200 | 2 | 3600 | 100 | | | | | | 1-Hexene | 1200 |
| 24 | Ex. 13 | 100 | 200 | 2 | 3601 | 100 | | | | | | 1-Hexene | 1200 |
| 25 | Ex. 12 | 70 | 200 | 25 | 3600 | 1250 | 1059391 | 2685720 | 5558672 | 2.5 | 135.8 | None | 0 |
| 26 | Ex. 12 | 70 | 200 | 26 | 3601 | 1300 | 563569 | 2529888 | 5669036 | 4.5 | 137.0 | None | 0 |
| 27 | Ex. 12 | 100 | 200 | 31 | 3601 | 1550 | 221840 | 1679861 | 5444758 | 7.6 | 136.8 | None | 0 |
| 28 | Ex. 12 | 100 | 200 | 35 | 3601 | 1750 | 1126227 | 2694515 | 5625533 | 2.4 | 136.6 | None | 0 |
| 29 | Ex. 12 | 70 | 200 | 14 | 3600 | 700 | 596729 | 2417063 | 5768067 | 4.1 | 133.4 | 1-Hexene | 400 |
| 30 | Ex. 12 | 70 | 200 | 15 | 3601 | 750 | 1225993 | 3096717 | 7846732 | 2.5 | 133.6 | 1-Hexene | 400 |
| 31 | Ex. 12 | 100 | 200 | 6 | 1130 | 956 | | | | | | 1-Hexene | 400 |
| 32 | Ex. 12 | 100 | 200 | 16 | 3601 | 800 | 88831 | 1519129 | 5385818 | 17.1 | 132.1 | 1-Hexene | 400 |
| 33 | Ex. 12 | 70 | 200 | 4 | 3601 | 200 | | | | | | 1-Hexene | 1200 |
| 34 | Ex. 12 | 70 | 200 | 4 | 3601 | 200 | | | | | | 1-Hexene | 1200 |
| 35 | Ex. 12 | 100 | 200 | 6 | 3600 | 300 | | | | | | 1-Hexene | 1200 |
| 36 | Ex. 12 | 100 | 200 | 8 | 3602 | 400 | | | | | | 1-Hexene | 1200 |
| 37 | Ex. 11 | 70 | 200 | 33 | 3600 | 1650 | 937608 | 2735206 | 5943261 | 2.9 | 135.8 | None | 0 |
| 38 | Ex. 11 | 70 | 200 | 39 | 3600 | 1950 | 1153642 | 2729408 | 5459356 | 2.4 | 136.8 | None | 0 |
| 39 | Ex. 11 | 100 | 200 | 31 | 3200 | 1744 | 771505 | 2365589 | 5558576 | 3.1 | 136.2 | None | 0 |
| 40 | Ex. 11 | 100 | 200 | 36 | 3601 | 1800 | 267747 | 1789388 | 5405215 | 6.7 | 135.4 | None | 0 |
| 41 | Ex. 11 | 70 | 200 | 18 | 3600 | 900 | 325511 | 2388683 | 6229449 | 7.3 | 132.1 | 1-Hexene | 400 |
| 42 | Ex. 11 | 70 | 200 | 20 | 3600 | 1000 | 834214 | 2590453 | 5578356 | 3.1 | 132.6 | 1-Hexene | 400 |
| 43 | Ex. 11 | 100 | 200 | 14 | 3600 | 700 | 184098 | 1770591 | 5773322 | 9.6 | 132.4 | 1-Hexene | 400 |
| 45 | Ex. 11 | 70 | 200 | 0 | 618 | 0 | | | | | | 1-Hexene | 1200 |
| 46 | Ex. 11 | 70 | 200 | 5 | 3600 | 250 | | | | | | 1-Hexene | 1200 |
| 47 | Ex. 11 | 100 | 200 | 4 | 3600 | 200 | | | | | | 1-Hexene | 1200 |
| 48 | Ex. 11 | 100 | 200 | 5 | 3601 | 250 | | | | | | 1-Hexene | 1200 |

Comparative polymerization performance is provided in Table 2 versus a metallocene comparative, bis(1-butyl,3-methylcyclopentadienyl)zirconium(IV) dichloride (C1). Polymerizations were conducted in a parallel polymerization reactor as generally described above. For the data presented in Table 2, polymerizations were allowed to run for 1 hour (3600 s) or until 50 PSIG of measured ethylene uptake occurred. Polymerizations were conducted at 75° C. and 85 PSIG ethylene. Catalysts were either activated with 5 wt. % methylaluminoxane in toluene (500 equiv.) or alkylated in situ with a combination of tri-n-octylaluminum (20 equiv.) and N,N-dimethylanilinium tetrakis(pentafluorophenyl)borate. Total liquid volume for each polymerizations was 5 mL using isohexane as the solvent. Catalysts were introduced as toluene solutions (100 µL, 0.5 mmol/L). Co-monomer, if present, was used in the quantities specified in Table 2.

| Catalyst Example | Temperature (° C.) | Pressure (PSIG) | Yield (mg) | quench time (s) | Activity (g/mmol h) | Mn (g/mol) | Mw(g/mol) | Mz(g/mol) | PDI (Mw/Mn) | Tm (° C.) | Co-monomer | Co-monomer Microliters |
|---|---|---|---|---|---|---|---|---|---|---|---|---|
| C1 | 75 | 85 | 66 | 73 | 64918 | 165,136.64 | 328,837.02 | 739,456.81 | 1.991 | 124.668 | 1-Octene | 100 |
| C1 | 75 | 85 | 70 | 74 | 67833 | 151,601.63 | 315,701.37 | 783,715.59 | 2.082 | 124.713 | 1-Octene | 100 |
| C1 | 75 | 85 | 70 | 207 | 24383 | 197,836.16 | 401,324.00 | 974,421.50 | 2.029 | 126.166 | 1-Octene | 100 |
| C1 | 75 | 85 | 76 | 154 | 35648 | 265,005.79 | 479,072.30 | 1,016,273.95 | 1.808 | 126.36 | 1-Octene | 100 |
| C1 | 75 | 85 | 96 | 43 | 159630 | 152,831.51 | 450,996.44 | 1,502,532.04 | 2.951 | 122.405 | 1-Octene | 100 |
| C1 | 75 | 85 | 91 | 38 | 174720 | 133,274.04 | 420,345.29 | 1,703,596.93 | 3.154 | 122.555 | 1-Octene | 100 |
| C1 | 75 | 85 | 96 | 35 | 198621 | 202,046.60 | 432,130.57 | 1,027,393.34 | 2.139 | 123.364 | 1-Octene | 100 |
| C1 | 75 | 85 | 91 | 40 | 164211 | 162,880.48 | 406,214.76 | 1,164,089.11 | 2.494 | 123.743 | 1-Octene | 100 |
| C1 | 75 | 85 | 73 | 90 | 58726 | 233,302.68 | 435,143.89 | 928,020.94 | 1.865 | 136.761 | None | 0 |
| C1 | 75 | 85 | 76 | 101 | 54178 | 241,193.90 | 460,580.89 | 988,219.11 | 1.91 | 136.93 | None | 0 |
| C1 | 75 | 85 | 83 | 116 | 51651 | 232,697.66 | 484,403.97 | 1,100,032.43 | 2.082 | 137.166 | None | 0 |

-continued

| Catalyst Example | Temperature (° C.) | Pressure (PSIG) | Yield (mg) | quench time (s) | Activity (g/ mmol h) | Mn (g/mol) | Mw(g/mol) | Mz(g/mol) | PDI (Mw/Mn) | Tm (° C.) | Co-monomer | Co-monomer Microliters |
|---|---|---|---|---|---|---|---|---|---|---|---|---|
| C1 | 75 | 85 | 74 | 105 | 50937 | 210,087.11 | 417,466.43 | 944,882.30 | 1.987 | 137.245 | None | 0 |
| C1 | 75 | 85 | 94 | 43 | 156667 | 258,141.99 | 843,934.97 | 4,574,582.34 | 3.269 | 135.378 | None | 0 |
| C1 | 75 | 85 | 90 | 40 | 162000 | 274,237.23 | 841,073.86 | 4,034,575.09 | 3.067 | 135.387 | None | 0 |
| C1 | 75 | 85 | 89 | 41 | 154783 | 269,927.73 | 701,871.27 | 2,222,009.90 | 2.6 | 135.638 | None | 0 |
| C1 | 75 | 85 | 95 | 47 | 145842 | 336,330.34 | 967,068.95 | 4,713,203.75 | 2.875 | 135.868 | None | 0 |
| Ex. 10 | 75 | 85 | 3 | 1800 | 120 | | | | | | 1-Octene | 100 |
| Ex. 10 | 75 | 85 | 4 | 1800 | 160 | | | | | | 1-Octene | 100 |
| Ex. 10 | 75 | 85 | 4 | 1801 | 160 | | | | | | 1-Octene | 100 |
| Ex. 10 | 75 | 85 | 4 | 1801 | 160 | | | | | | 1-Octene | 100 |
| Ex. 10 | 75 | 85 | 19 | 1559 | 878 | 1,096,972.93 | 1,818,113.14 | 4,356,438.05 | 1.657 | 122.974 | 1-Octene | 100 |
| Ex. 10 | 75 | 85 | 25 | 1800 | 1000 | 1,193,200.70 | 2,644,788.50 | 5,159,907.71 | 2.217 | 126.788 | 1-Octene | 100 |
| Ex. 10 | 75 | 85 | 15 | 1801 | 600 | 1,568,826.04 | 2,739,218.12 | 5,281,046.80 | 1.746 | 127.463 | 1-Octene | 100 |
| Ex. 10 | 75 | 85 | 17 | 1801 | 680 | 1,866,003.73 | 3,157,721.16 | 5,408,889.93 | 1.692 | 128.269 | 1-Octene | 100 |
| Ex. 10 | 75 | 85 | 4 | 1800 | 160 | | | | | | None | 0 |
| Ex. 10 | 75 | 85 | 5 | 1800 | 200 | | | | | | None | 0 |
| Ex. 10 | 75 | 85 | 6 | 1802 | 240 | | | | | | None | 0 |
| Ex. 10 | 75 | 85 | 11 | 1801 | 440 | 889,645.57 | 1,323,230.94 | 3,401,600.02 | 1.487 | 136.948 | None | 0 |
| Ex. 10 | 75 | 85 | 22 | 1800 | 880 | 1,605,367.36 | 2,824,659.94 | 5,251,431.14 | 1.76 | 135.41 | None | 0 |
| Ex. 10 | 75 | 85 | 23 | 1801 | 920 | 421,572.54 | 2,184,169.04 | 5,293,454.14 | 5.181 | 135.525 | None | 0 |
| Ex. 10 | 75 | 85 | 19 | 1800 | 760 | 1,738,561.31 | 2,946,687.65 | 5,314,153.22 | 1.695 | 135.543 | None | 0 |
| Ex. 10 | 75 | 85 | 24 | 1801 | 960 | 1,832,778.97 | 3,050,719.27 | 5,249,035.37 | 1.665 | 135.944 | None | 0 |
| Ex. 14 | 75 | 85 | 5 | 1800 | 200 | | | | | | 1-Octene | 100 |
| Ex. 14 | 75 | 85 | 6 | 1801 | 240 | | | | | | 1-Octene | 100 |
| Ex. 14 | 75 | 85 | 130 | 1801 | 5196 | 254,679.83 | 501,986.38 | 1,107,802.23 | 1.971 | 124.044 | 1-Octene | 100 |
| Ex. 14 | 75 | 85 | 27 | 1801 | 1080 | 411,355.75 | 673,174.92 | 1,305,181.46 | 1.636 | 124.434 | 1-Octene | 100 |
| Ex. 14 | 75 | 85 | 12 | 1801 | 480 | 546,321.05 | 1,703,798.37 | 5,131,600.74 | 3.119 | 125.094 | 1-Octene | 100 |
| Ex. 14 | 75 | 85 | 12 | 1802 | 480 | 1,748,925.80 | 3,067,888.86 | 5,448,019.38 | 1.754 | 127.457 | 1-Octene | 100 |
| Ex. 14 | 75 | 85 | 13 | 1800 | 520 | 1,809,585.96 | 3,029,198.41 | 5,166,582.17 | 1.674 | 127.556 | 1-Octene | 100 |
| Ex. 14 | 75 | 85 | 11 | 1800 | 440 | 1,778,984.04 | 3,078,756.07 | 5,408,749.80 | 1.731 | 127.986 | 1-Octene | 100 |
| Ex. 14 | 75 | 85 | 2 | 1802 | 80 | | | | | | None | 0 |
| Ex. 14 | 75 | 85 | 2 | 1801 | 80 | | | | | | None | 0 |
| Ex. 14 | 75 | 85 | 2 | 1801 | 80 | | | | | | None | 0 |
| Ex. 14 | 75 | 85 | 2 | 1802 | 80 | | | | | | None | 0 |
| Ex. 14 | 75 | 85 | 14 | 1801 | 560 | 723,104.55 | 2,137,681.36 | 5,106,486.47 | 2.956 | 135.717 | None | 0 |
| Ex. 14 | 75 | 85 | 17 | 1800 | 680 | 1,725,101.74 | 2,975,589.49 | 5,227,832.91 | 1.725 | 136.116 | None | 0 |
| Ex. 14 | 75 | 85 | 13 | 1801 | 520 | 1,570,534.61 | 2,781,311.41 | 5,231,931.26 | 1.771 | 136.271 | None | 0 |
| Ex. 14 | 75 | 85 | 19 | 1801 | 760 | 1,824,692.38 | 3,003,030.06 | 5,032,255.86 | 1.646 | 136.776 | None | 0 |

Overall, catalysts, catalyst systems, and processes of the present disclosure can provide polyolefins with ultra-high Mn (e.g., 1,000,000 g/mol), Mw values of 2,000,000 g/mol or greater, PDI (e.g., about 1.5-5). Additionally, catalysts, catalyst systems, and processes of the present disclosure can provide polyolefins with increased Mw and Mn, also with broader PDI relative to conventional metallocene systems. As indicated by polymer melting temperatures ($T_m$ ° C.), the catalysts, catalysts systems, and processes of the present disclosure can provide polyethylenes with melting temperatures.

Compounds of the present disclosure include tautomeric, geometric or stereoisomeric forms of the compounds. The present disclosure considers all such compounds, including cis- and trans-geometric isomers (Z- and E-geometric isomers), R- and S-enantiomers, diastereomers, d-isomers, 1-isomers, atropisomers, epimers, conformers, rotamers, mixtures of isomers and racemates thereof are embraced by the present disclosure.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula I(a), I(b) or I(c):

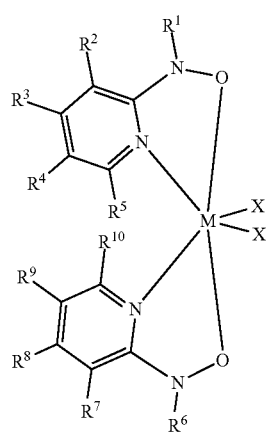

Formula I(a)

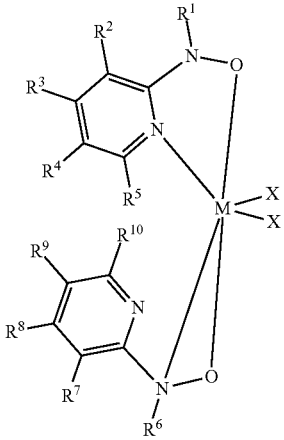

Formula I(b)

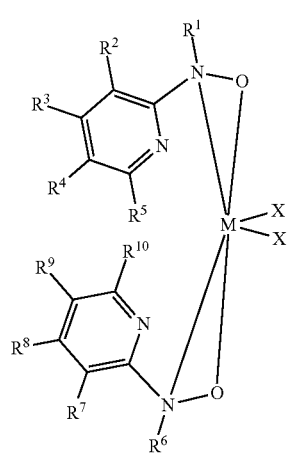

Formula I(c)

wherein:

M is Ti, Zr, or Hf;

$R^1$ and $R^6$ are independently selected from the group consisting of hydrocarbyl, substituted hydrocarbyl, silyl, and substituted silyl groups;

$R^2$, $R^3$, $R^4$, $R^5$, $R^7$, $R^8$, $R^9$, and $R^{10}$ are independently selected from the group consisting of hydrogen, hydrocarbyl, substituted hydrocarbyl, alkoxy, silyl, amino, aryloxy, halogen and phosphino; wherein any two adjacent R groups may be joined to form a saturated or unsaturated hydrocarbyl, substituted hydrocarbyl, or heterocyclic ring, wherein the ring has 5, 6, 7, or 8 ring atoms and wherein substitutions on the ring can join to form additional rings; and each X is independently an anionic leaving group; wherein any two adjacent X groups may be joined together to form a dianionic group.

2. The catalyst compound of claim 1, wherein $R^1$ and $R^6$ of Formula I(a), I(b) or I(c) are independently selected from the group consisting of alkyl, cycloalkyl and aryl.

3. The catalyst compound of claim 1, wherein $R^1$ and $R^6$ of Formula I(a), I(b) or I(c) are independently selected from the group consisting of alkyl and aryl.

4. The catalyst compound of claim 1, wherein $R^1$ and $R^6$ of Formula I(a), I(b) or I(c) are independently selected from the group consisting of t-butyl, 3,5-dimethylphenyl, 2,3,4,5,6-pentamethylphenyl, and 2,4,6-triisopropylphenyl.

5. The catalyst compound of claim 1, wherein $R^2$, $R^3$, $R^4$, $R^5$, $R^7$, $R^8$, $R^9$, and $R^{10}$ of Formula I(a), I(b) or I(c) are independently selected from the group consisting of hydrogen, alkyl, aryl, cycloalkyl, alkoxy and cycloalkoxy.

6. The catalyst compound of claim 1, wherein $R^2$, $R^3$, $R^4$, $R^5$, $R^7$, $R^8$, $R^9$, and $R^{10}$ of Formula I(a), I(b) or I(c) are independently selected from the group consisting of hydrogen, methyl, t-butyl, phenyl, 1-methylphenyl, t-butoxy, 3,5-dimethylphenyl, 2,3,4,5,6-pentamethylphenyl and 2,4,6-triisopropylphenyl.

7. The catalyst compound of claim 1, wherein the catalyst compound is selected from the group consisting of:

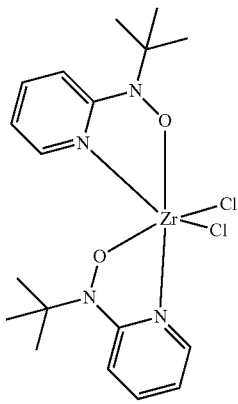

1

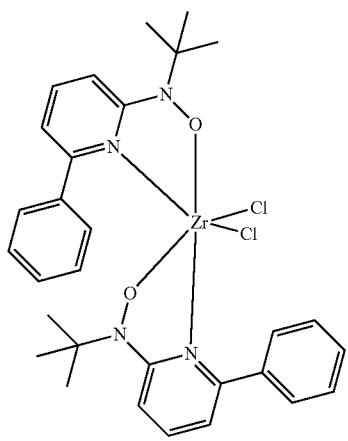
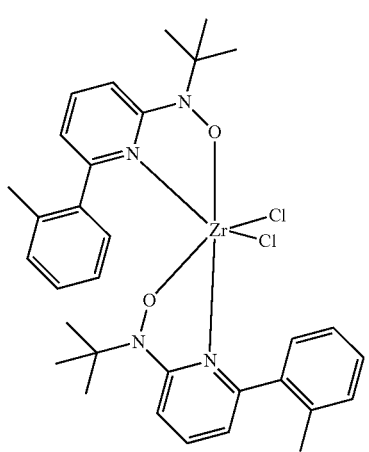
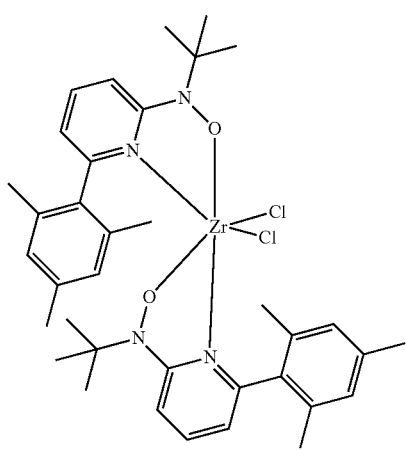
2
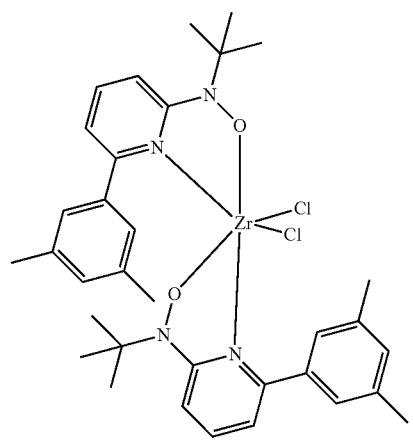
3
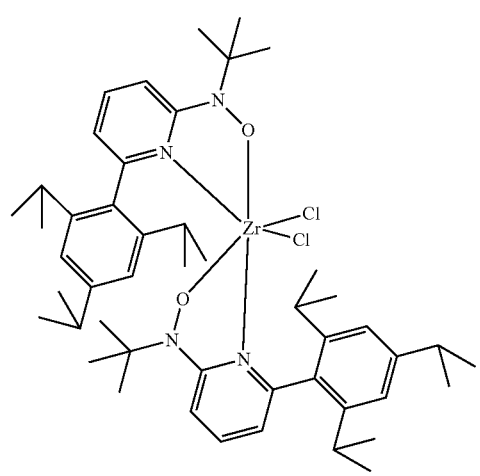
4
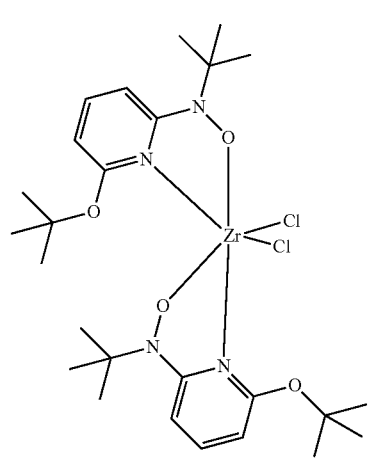

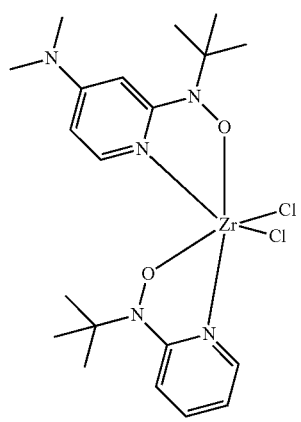
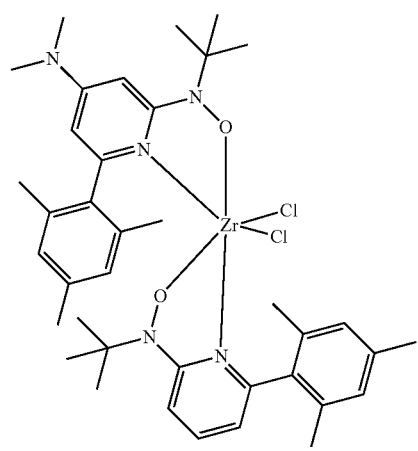
8
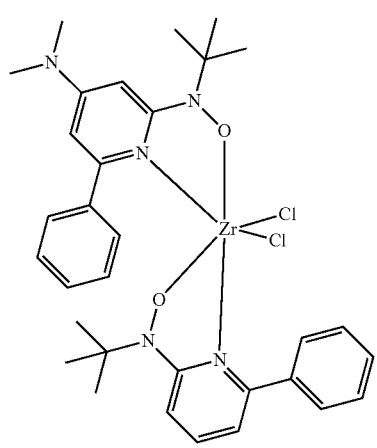
9
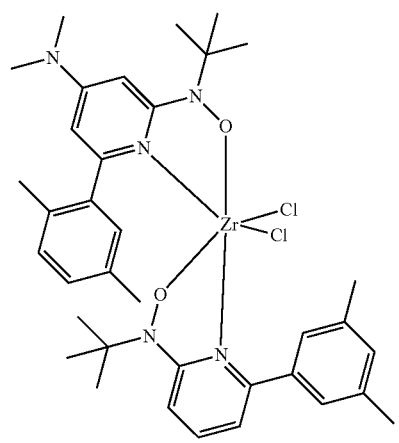
11
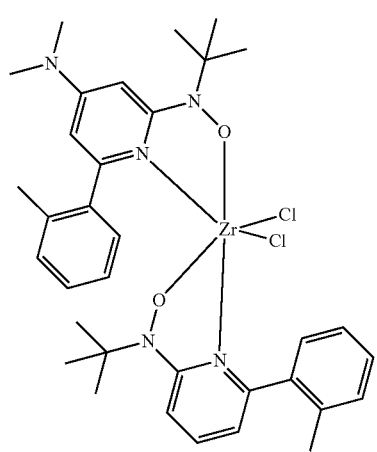
10
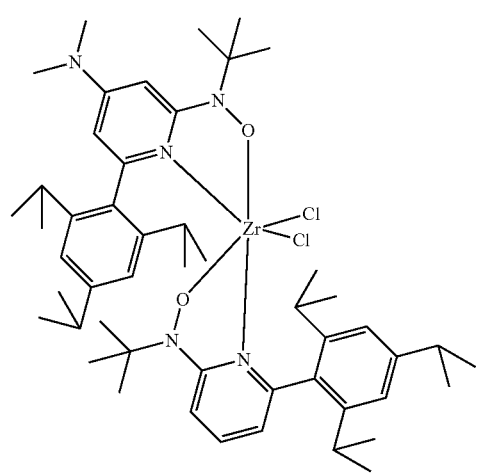
12
13

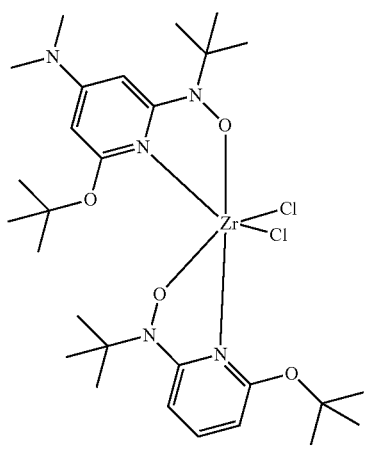
14
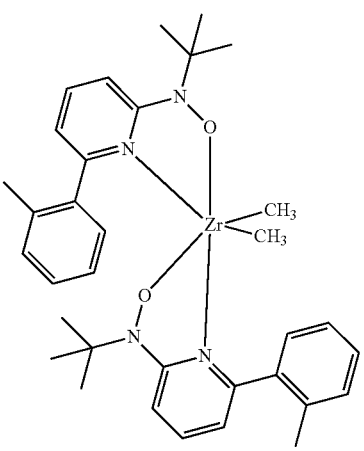
17
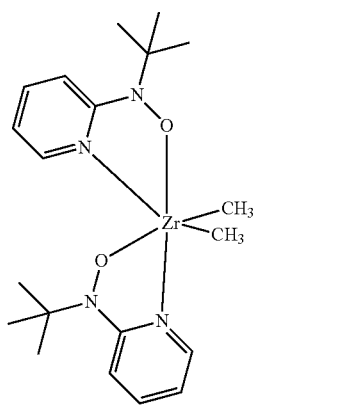
15
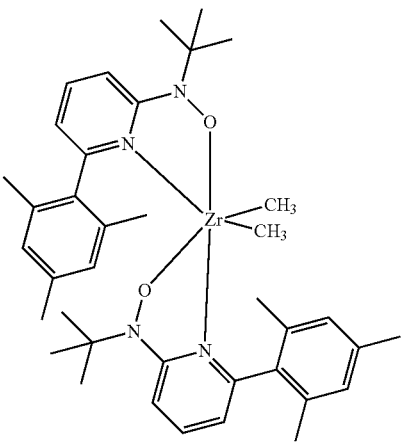
18
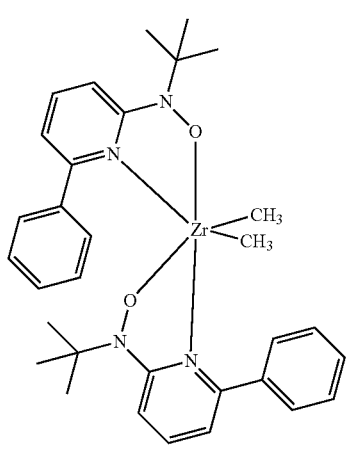
16
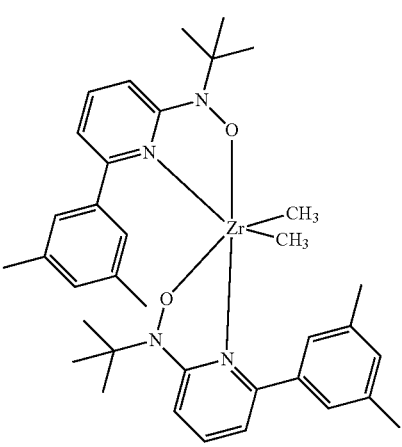
19

20
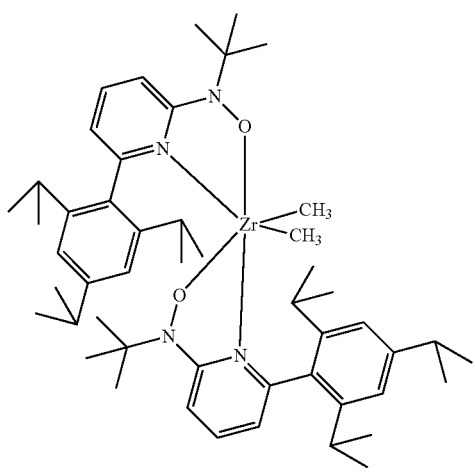
21
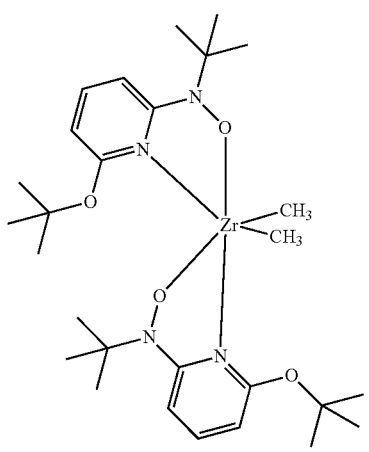
22
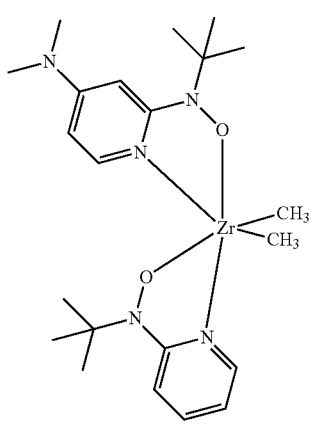
23
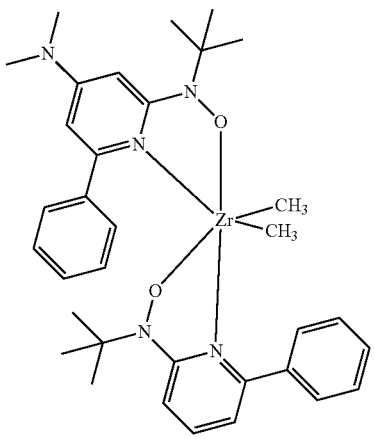
24
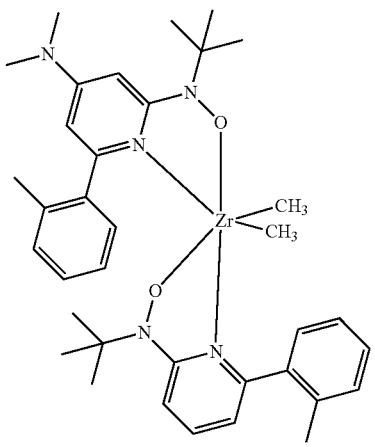
25
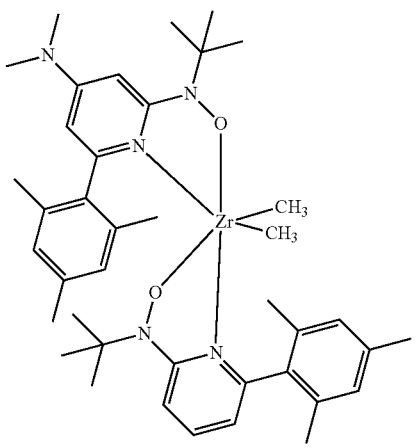

-continued
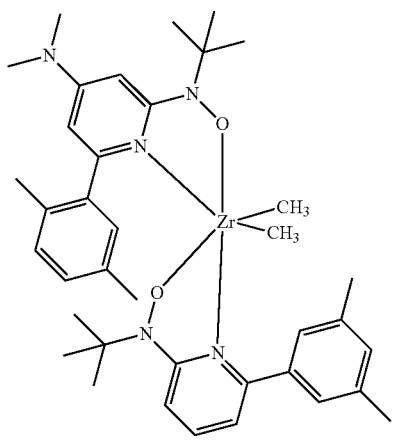
26
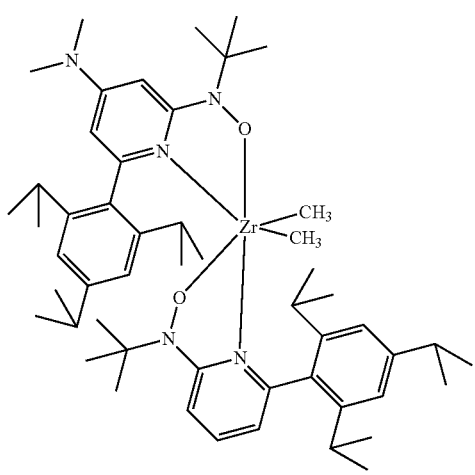
27
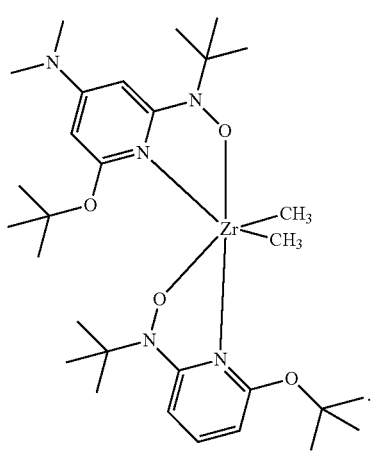
28
8. The catalyst compound of claim 1, wherein the catalyst compound is selected from the group consisting of:
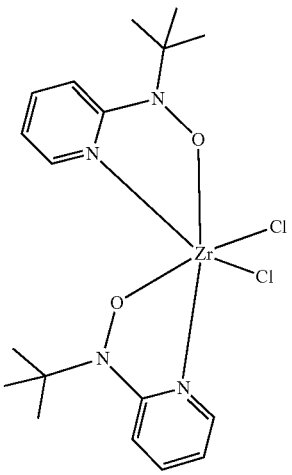
1
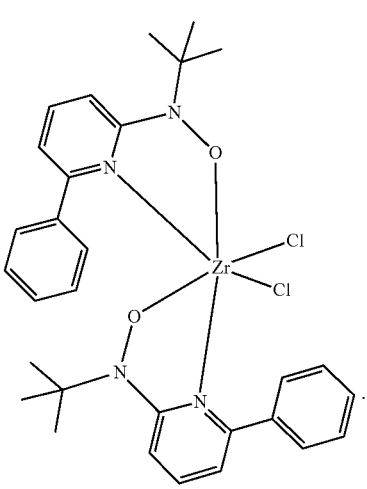
2
9. The catalyst compound of claim 1, wherein the catalyst compound is selected from the group consisting of:
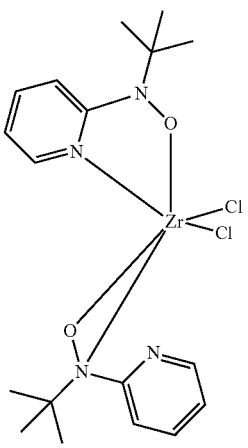
29

30
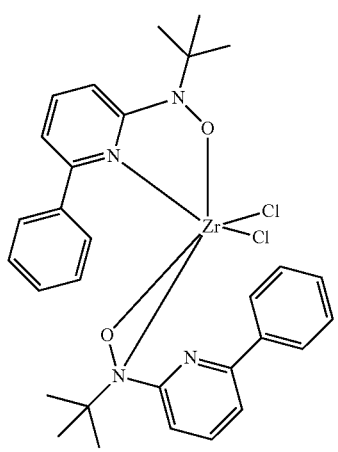
31
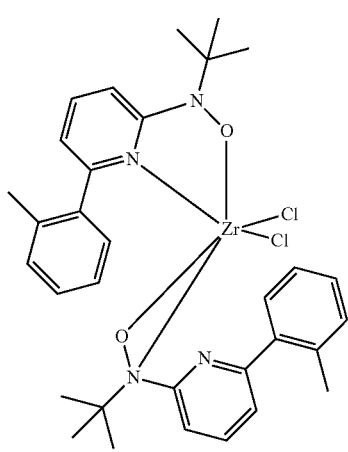
32
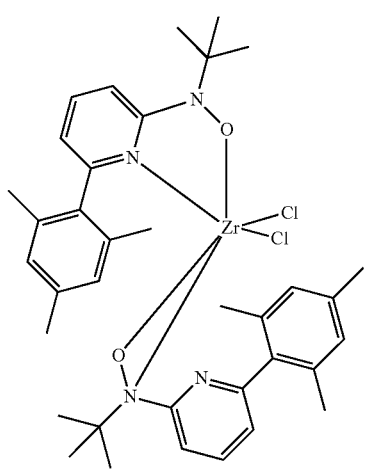
33
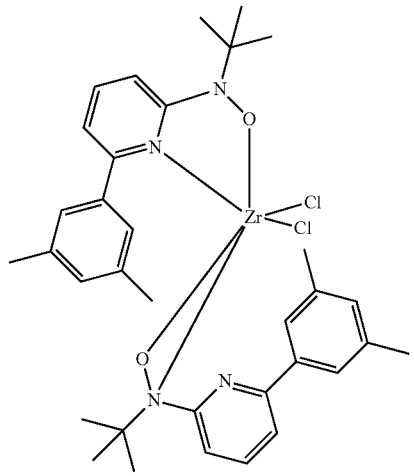
34
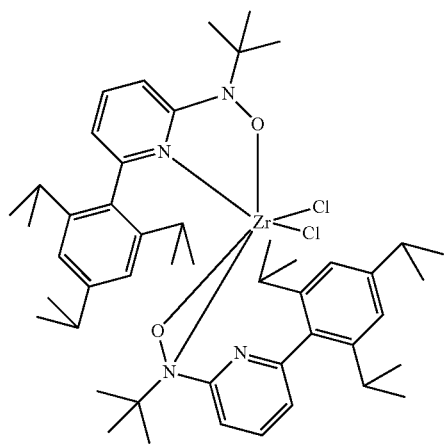
35
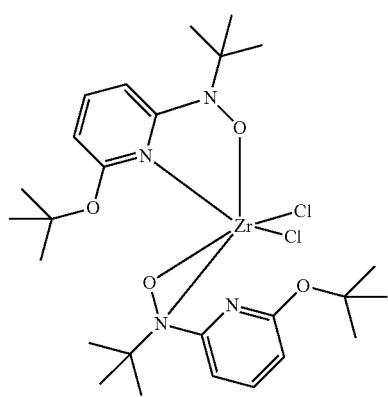

36
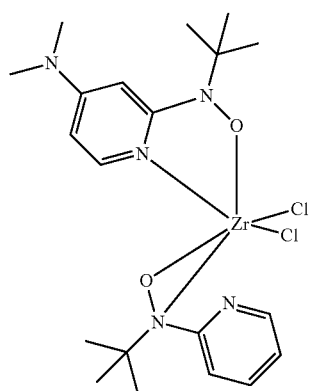
37
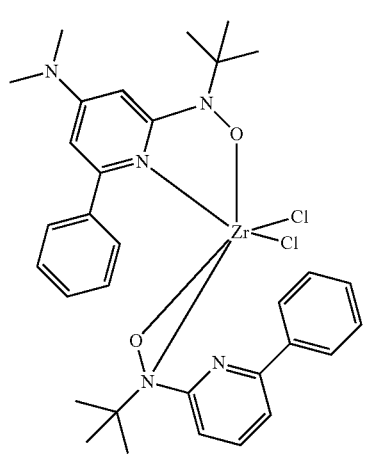
38
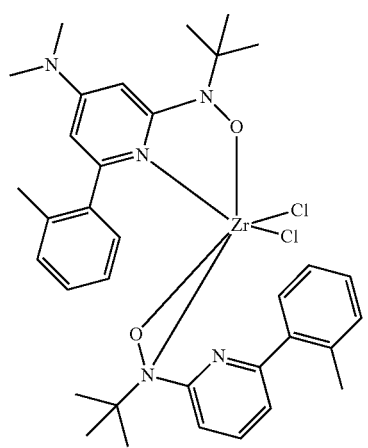
39
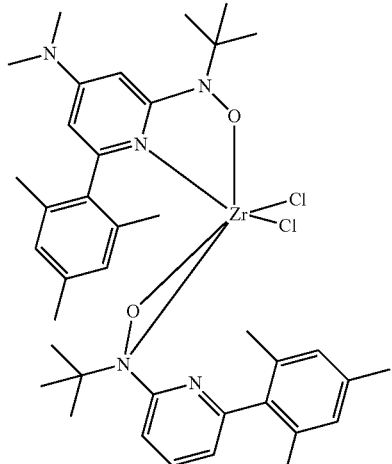
40
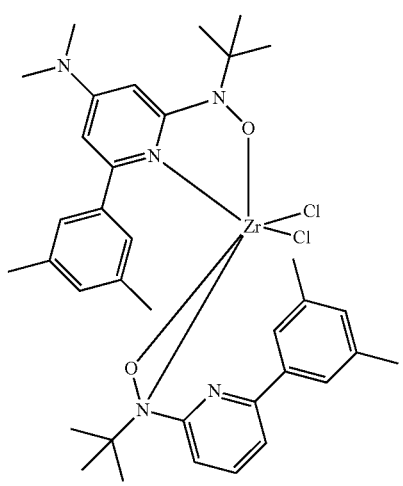
41
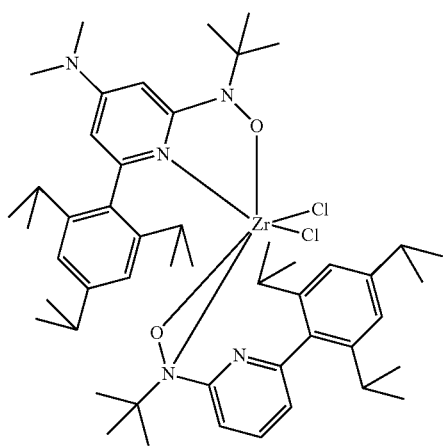

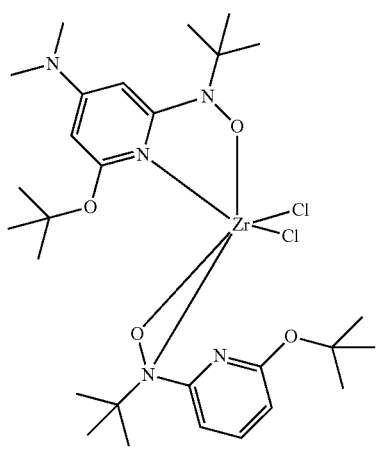
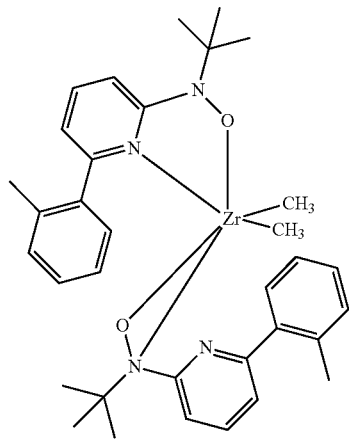
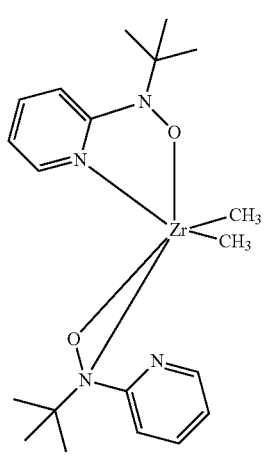
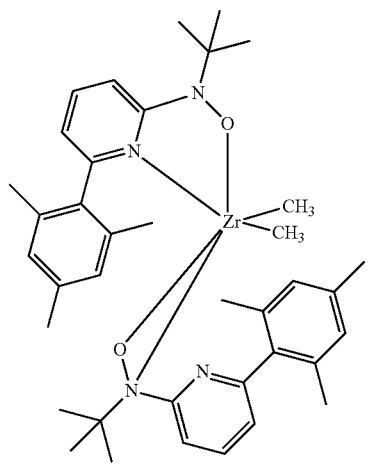
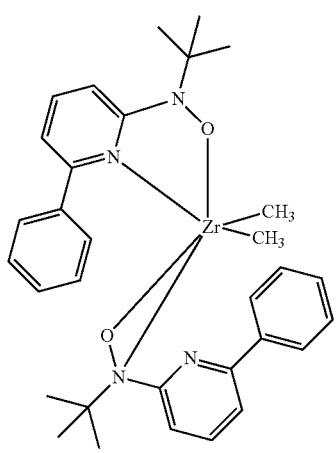
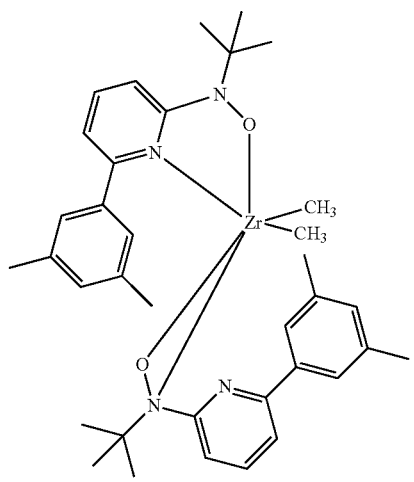

-continued
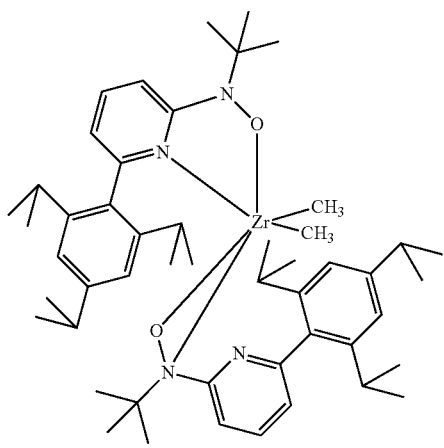
48
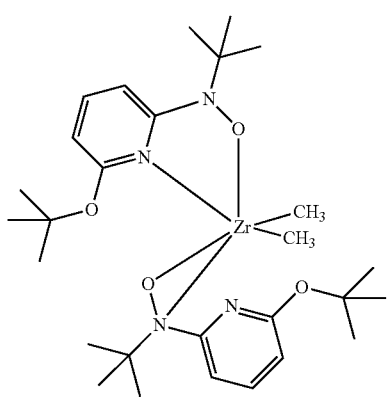
49
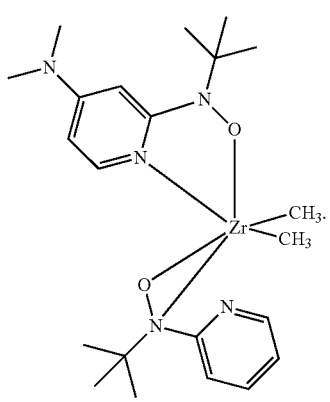
10. The catalyst compound of claim 1, wherein the catalyst compound is selected from the group consisting of:
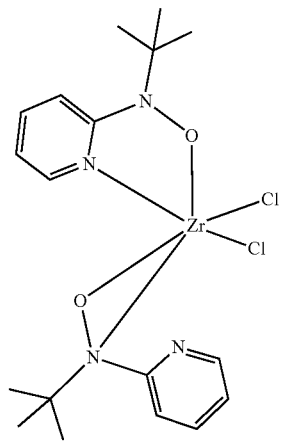
29
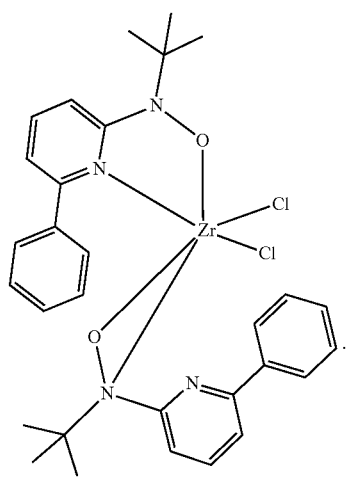
30
11. The catalyst compound of claim 1, wherein the catalyst compound is selected from the group consisting of:
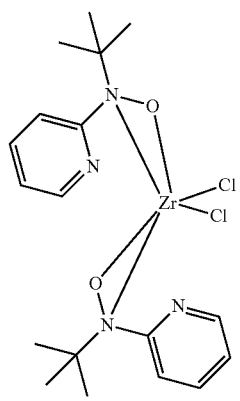
51

52
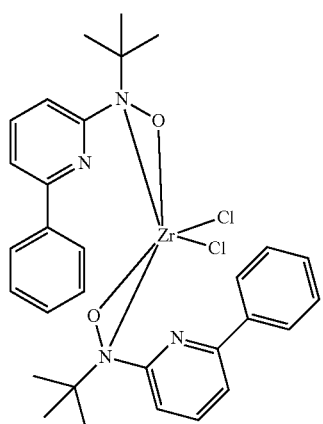
53
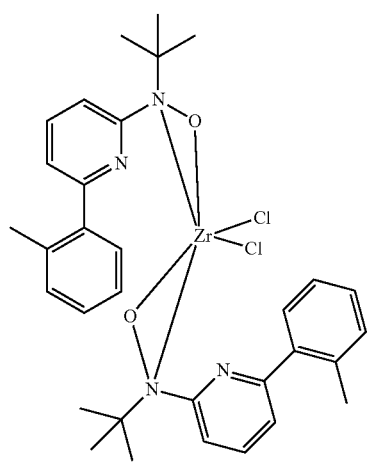
54
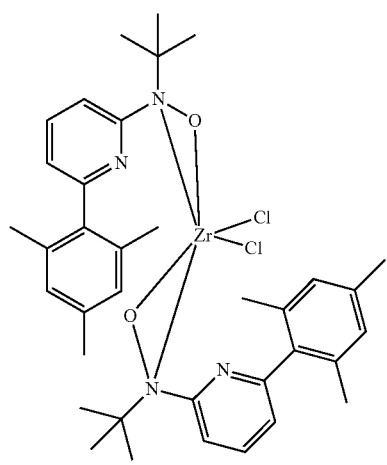
55
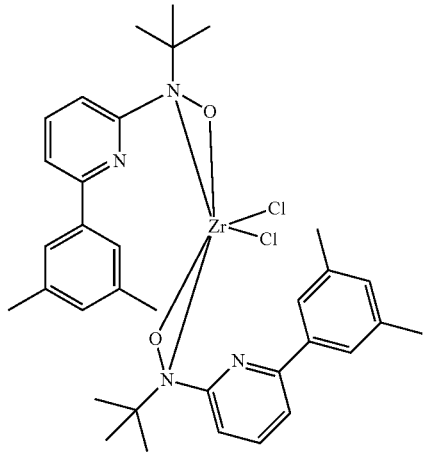
56
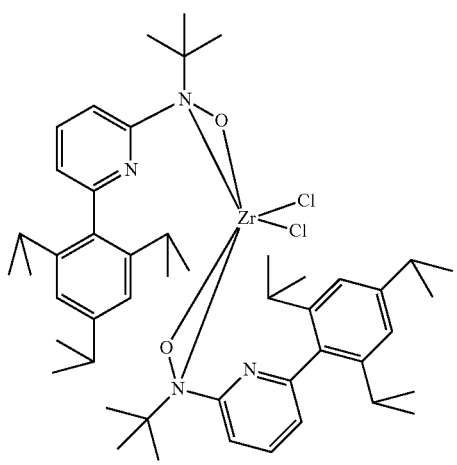
57
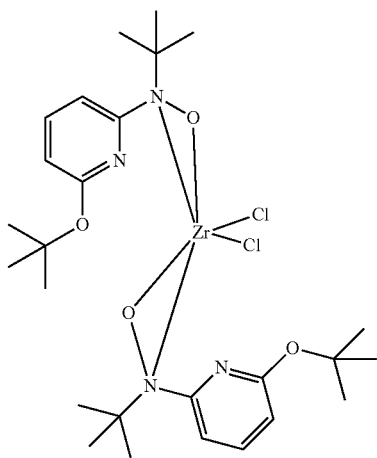

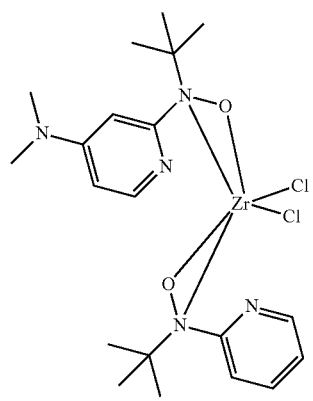
58
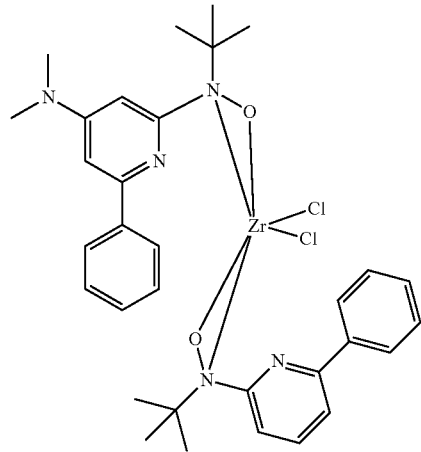
59
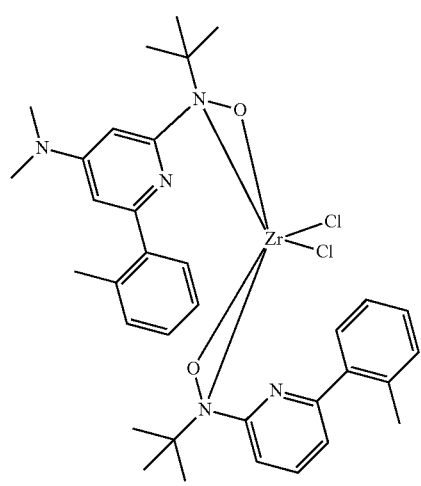
60
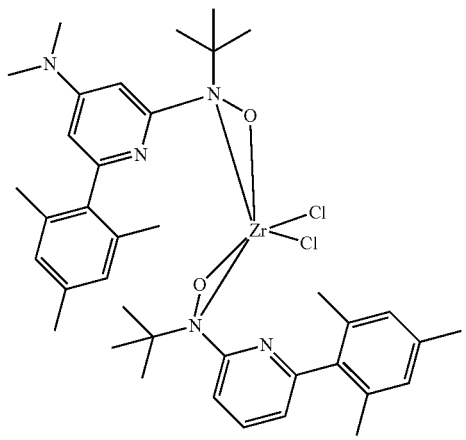
61
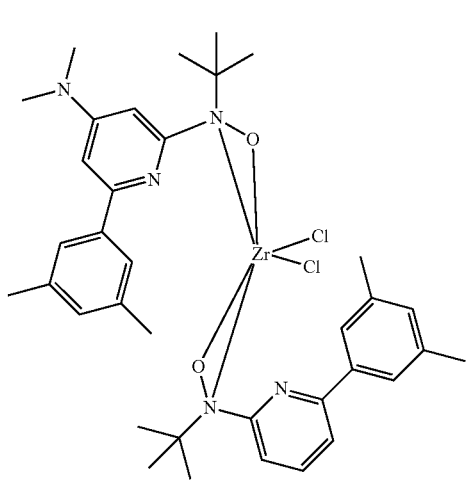
62
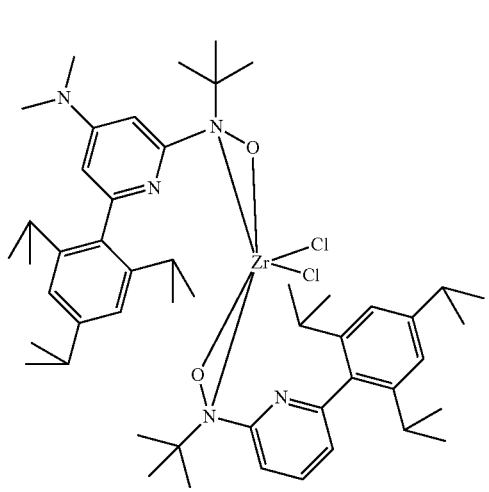
63

64
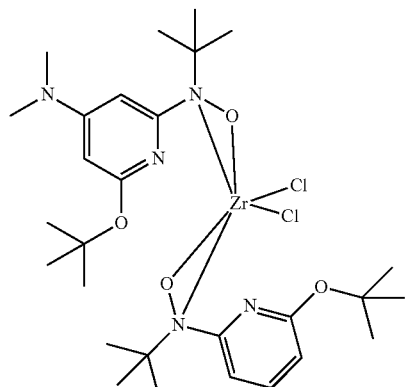
67
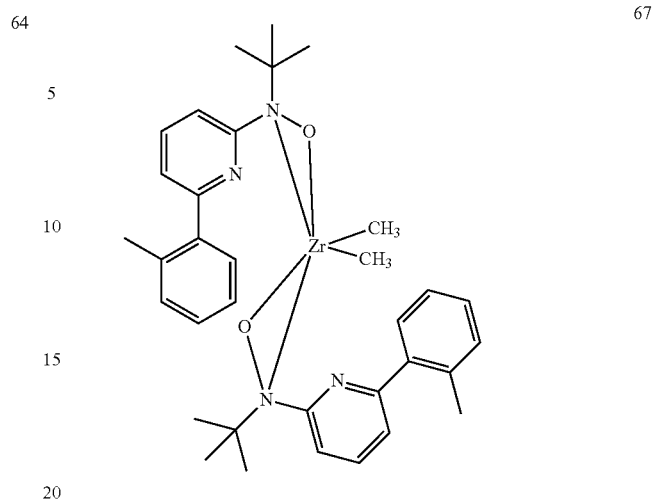
65
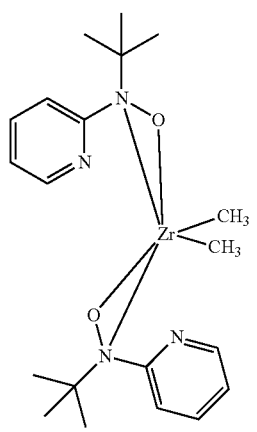
68
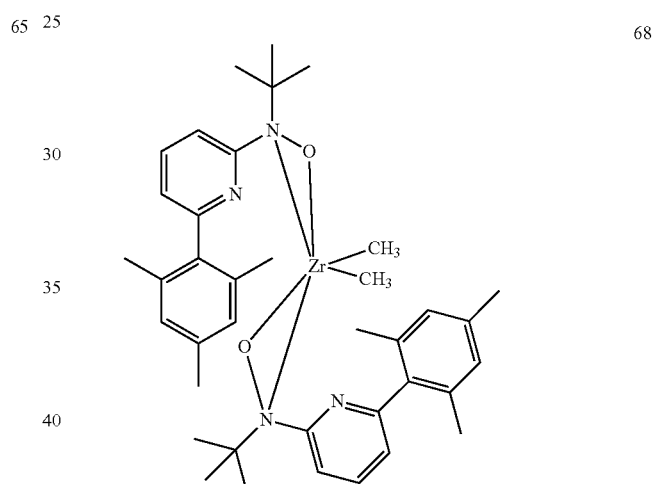
66
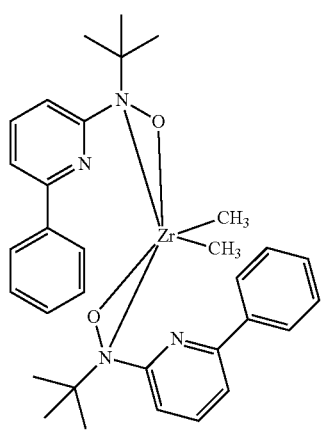
69
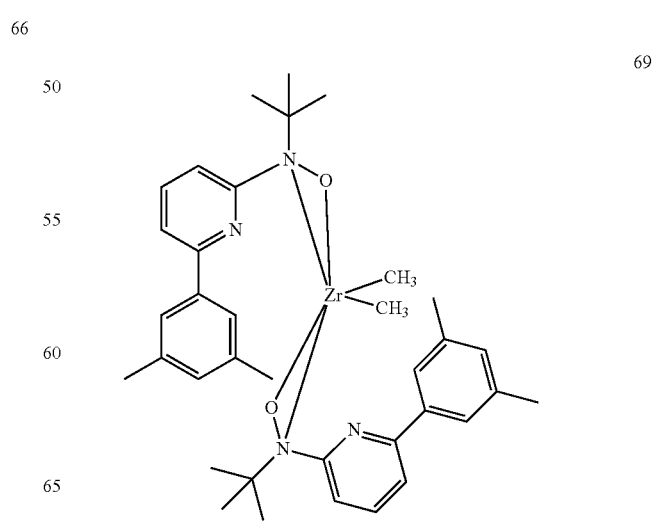

-continued
70
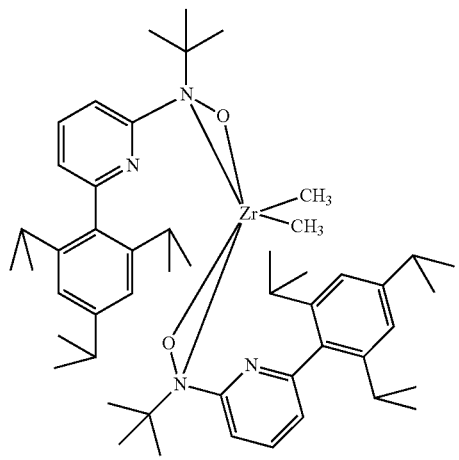
71
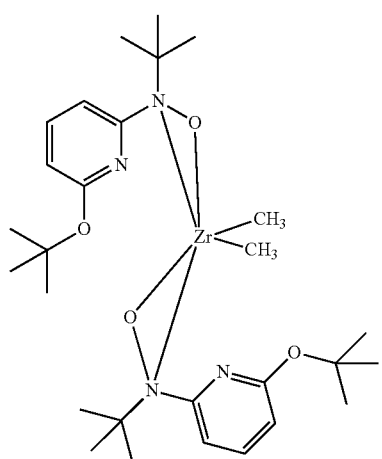
72
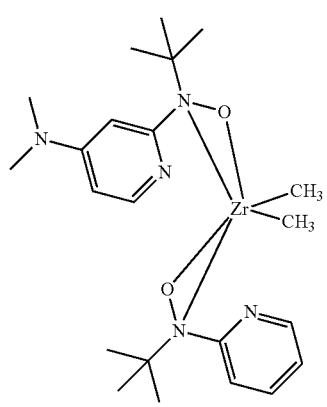
-continued
73
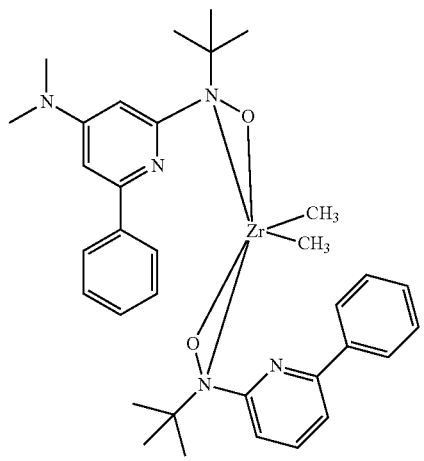
74
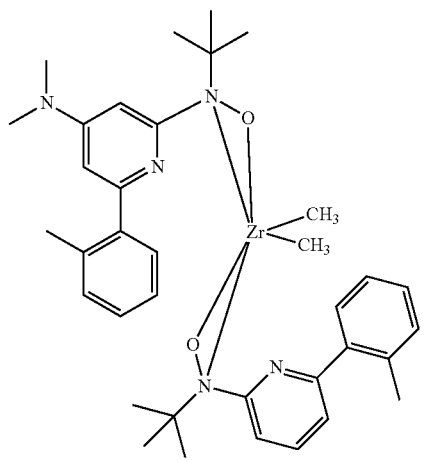
75
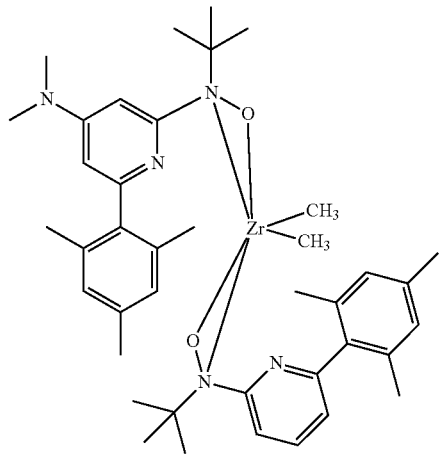

76

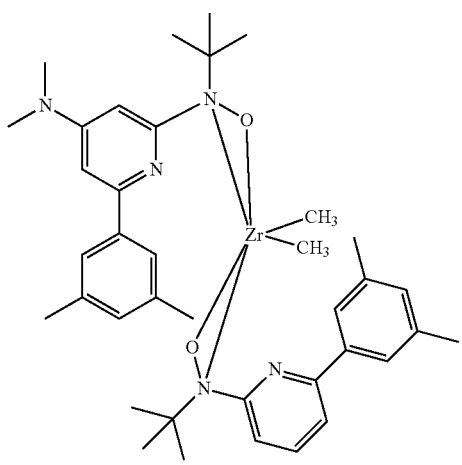

77

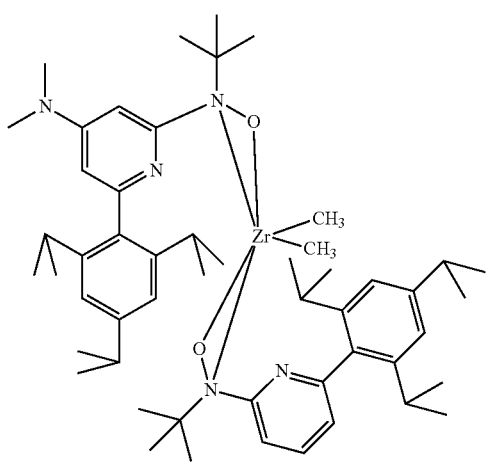

78

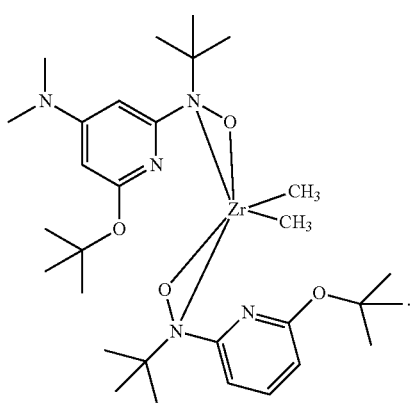

12. The catalyst compound of claim 1, wherein the catalyst compound is selected from the groan consisting of:

51

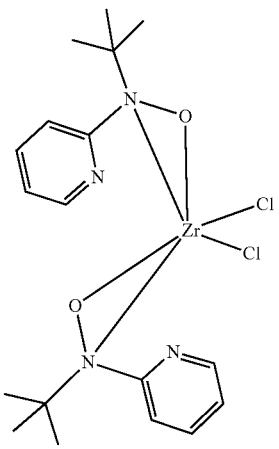

52

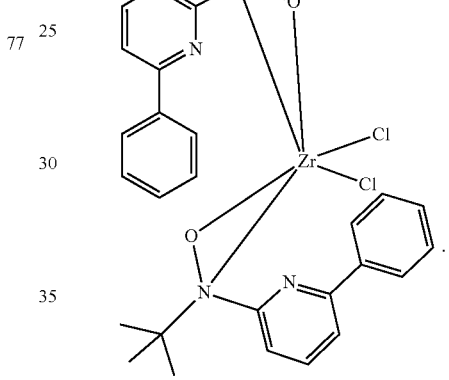

13. A process for the production of an ethylene alpha-olefin copolymer comprising:
polymerizing ethylene and at least one $C_3$-$C_{20}$ alpha-olefin by contacting the ethylene and the at least one $C_3$-$C_{20}$ alpha-olefin with a catalyst system including the catalyst compound of claim 1, in at least one polymerization reactor at a reactor pressure of from 2 MPa to 200 MPa and a reactor temperature of from 10° C. to 250° C. to form an ethylene alpha-olefin copolymer.

14. The process of claim 13, wherein the ethylene alpha-olefin copolymer has an Mw value of 1,000,000 g/mol or greater.

15. The process of claims 13, wherein the ethylene alpha-olefin copolymer has an Mw value of from 1,000,000 g/mol to 8,000,000 g/mol.

16. The process of claim 13, wherein the ethylene alpha-olefin copolymer has an Mw/Mn value of 4 or less.

17. The process of claim 13, wherein the ethylene alpha-olefin copolymer has an Mw/Mn value of from 1 to 2.

18. The process of claim 13, wherein the ethylene alpha-olefin copolymer has a comonomer content of from 1 wt % to 8 wt %.

19. The catalyst compound of claim 1, wherein M is Zr.

20. The catalyst compound of claim 1, wherein:
M is Zr or Hf;
$R^1$ and $R^6$ of Formula I(a), I(b) or I(c) are independently selected from the group consisting of alkyl and aryl; and $R^2$, $R^3$, $R^4$, $R^5$, $R^7$, $R^8$, $R^9$, and $R^{10}$ of Formula I(a), I(b) or I(c) are independently selected from the group consisting of hydrogen, alkyl, aryl, cycloalkyl, alkoxy and cycloalkoxy.

\* \* \* \* \*